(12) United States Patent
Freeman et al.

US009139770B2

(10) Patent No.: US 9,139,770 B2
(45) Date of Patent: Sep. 22, 2015

(54) SILICONE LIGANDS FOR STABILIZING QUANTUM DOT FILMS

(71) Applicant: Nanosys, Inc., Palo Alto, CA (US)

(72) Inventors: William P. Freeman, San Mateo, CA (US); Paul T. Furuta, Sunnyvale, CA (US); Wendy Guo, Cupertino, CA (US); Robert Dubrow, San Carlos, CA (US); J. Wallace Parce, Palo Alto, CA (US)

(73) Assignee: Nanosys, Inc., Milpitas, CA (US)

( * ) Notice: Subject to any disclaimer, the term of this patent is extended or adjusted under 35 U.S.C. 154(b) by 159 days.

(21) Appl. No.: 13/803,596

(22) Filed: Mar. 14, 2013

(65) Prior Publication Data

US 2013/0345458 A1    Dec. 26, 2013

Related U.S. Application Data

(60) Provisional application No. 61/663,234, filed on Jun. 22, 2012.

(51) Int. Cl.
| | |
|---|---|
| C07F 7/10 | (2006.01) |
| C09K 11/88 | (2006.01) |
| C08G 77/38 | (2006.01) |
| C08G 77/388 | (2006.01) |
| C09K 11/02 | (2006.01) |

(52) U.S. Cl.
CPC .............. *C09K 11/883* (2013.01); *C08G 77/38* (2013.01); *C08G 77/388* (2013.01); *C09K 11/025* (2013.01)

(58) Field of Classification Search
CPC .................................................. C07F 7/1836
USPC ....................................................... 556/421
See application file for complete search history.

(56) References Cited

U.S. PATENT DOCUMENTS

| | | |
|---|---|---|
| 2,381,366 A | 8/1945 | Patnode |
| 4,093,777 A | 6/1978 | Heine et al. |
| 4,181,753 A | 1/1980 | Fischer |
| 4,258,080 A | 3/1981 | Sonoda et al. |
| 4,263,339 A | 4/1981 | Fischer |
| 5,023,139 A | 6/1991 | Birnboim et al. |
| 5,124,278 A | 6/1992 | Bohling et al. |
| 5,126,204 A | 6/1992 | Tono et al. |
| 5,196,229 A | 3/1993 | Chau |
| 5,230,957 A | 7/1993 | Lin |
| 5,260,957 A | 11/1993 | Hakimi et al. |
| 5,262,357 A | 11/1993 | Alivisatos et al. |
| 5,330,791 A | 7/1994 | Aihara et al. |
| 5,376,307 A | 12/1994 | Hagiwara et al. |
| 5,396,148 A | 3/1995 | Endo et al. |
| 5,505,928 A | 4/1996 | Alivisatos et al. |
| 5,518,808 A | 5/1996 | Bruno et al. |
| 5,532,023 A | 7/1996 | Vogel et al. |
| 5,537,000 A | 7/1996 | Alivisatos et al. |
| 5,645,752 A | 7/1997 | Weiss et al. |
| 5,707,139 A | 1/1998 | Haitz |
| 5,744,233 A | 4/1998 | Opitz et al. |
| 5,751,018 A | 5/1998 | Alivisatos et al. |
| 5,777,433 A | 7/1998 | Lester et al. |
| 5,853,887 A | 12/1998 | Yoshimoto et al. |
| 5,882,779 A | 3/1999 | Lawandy |
| 5,892,084 A | 4/1999 | Janeiro et al. |
| 5,958,591 A | 9/1999 | Budd |
| 5,985,173 A | 11/1999 | Gray et al. |
| 5,990,479 A | 11/1999 | Weiss et al. |
| 6,084,250 A | 7/2000 | Justel et al. |
| 6,114,038 A | 9/2000 | Castro et al. |
| 6,147,363 A | 11/2000 | Udagawa |
| 6,153,123 A | 11/2000 | Hampden-Smith et al. |
| 6,179,912 B1 | 1/2001 | Barbera-Guillem et al. |
| 6,180,029 B1 | 1/2001 | Hampden-Smith et al. |
| 6,207,229 B1 | 3/2001 | Bawendi et al. |
| 6,207,392 B1 | 3/2001 | Weiss et al. |
| 6,225,198 B1 | 5/2001 | Alivisatos et al. |
| 6,251,303 B1 | 6/2001 | Bawendi et al. |
| 6,278,135 B1 | 8/2001 | Srivastava et al. |
| 6,294,800 B1 | 9/2001 | Duggal et al. |
| 6,306,610 B1 | 10/2001 | Bawendi et al. |
| 6,306,736 B1 | 10/2001 | Alivisatos et al. |
| 6,319,426 B1 | 11/2001 | Bawendi et al. |
| 6,322,901 B1 | 11/2001 | Bawendi et al. |
| 6,326,144 B1 | 12/2001 | Bawendi et al. |

(Continued)

FOREIGN PATENT DOCUMENTS

| | | |
|---|---|---|
| WO | 99/27584 A1 | 6/1999 |
| WO | 03/054953 A1 | 7/2003 |

(Continued)

OTHER PUBLICATIONS

Park et al., Nano Letters (2010), 10(7), 2310-2317.*
Park et al., Nano Letters 10: 2310-17 (2010).*
International Search Report and Written Opinion for PCT/US2013/045244, mailed Nov. 14, 2013, 12 pages.
Akcora, P. et al., "Structural and magnetic characterization of norbornene-deuterated norbornene dicarboxylic acid diblock copolymers doped with iron oxide nanoparticles" Polymer (2005) 46(14):5194-5201.

(Continued)

*Primary Examiner* — Porfirio Nazario Gonzalez
*Assistant Examiner* — Kofi Adzamli
(74) *Attorney, Agent, or Firm* — Sterne, Kessler, Goldstein & Fox P.L.L.C.

(57) ABSTRACT

Siloxane polymer ligands for binding to quantum dots are provided. The polymers include a multiplicity of amine or carboxy binding ligands in combination with long-alkyl chains providing improved stability for the ligated quantum dots. The ligands and coated nanostructures of the present invention are useful for close packed nanostructure compositions, which can have improved quantum confinement and/or reduced cross-talk between nano structures.

34 Claims, 9 Drawing Sheets

(56) References Cited

U.S. PATENT DOCUMENTS

| | | | |
|---|---|---|---|
| 6,344,520 B1 | 2/2002 | Greene |
| 6,353,073 B1 | 3/2002 | Biggs et al. |
| 6,423,551 B1 | 7/2002 | Weiss et al. |
| 6,426,513 B1 | 7/2002 | Bawendi et al. |
| 6,429,583 B1 | 8/2002 | Levinson et al. |
| 6,440,213 B1 | 8/2002 | Alivisatos et al. |
| 6,444,143 B2 | 9/2002 | Bawendi et al. |
| 6,468,808 B1 | 10/2002 | Nie et al. |
| 6,482,672 B1 | 11/2002 | Hoffman et al. |
| 6,501,091 B1 | 12/2002 | Bawendi et al. |
| 6,573,535 B2 | 6/2003 | Hori et al. |
| 6,576,291 B2 | 6/2003 | Bawendi et al. |
| 6,602,671 B1 | 8/2003 | Bawendi et al. |
| 6,607,829 B1 | 8/2003 | Bawendi et al. |
| 6,617,583 B1 | 9/2003 | Bawendi et al. |
| 6,660,281 B1 | 12/2003 | Nakanishi et al. |
| 6,682,596 B2 | 1/2004 | Zehnder et al. |
| 6,696,299 B1 | 2/2004 | Empedocles et al. |
| 6,699,723 B1 | 3/2004 | Weiss et al. |
| 6,711,426 B2 | 3/2004 | Benaron et al. |
| 6,713,586 B2 | 3/2004 | Greene |
| 6,727,065 B2 | 4/2004 | Weiss et al. |
| 6,734,465 B1 | 5/2004 | Taskar et al. |
| 6,774,361 B2 | 8/2004 | Bawendi et al. |
| 6,781,166 B2 | 8/2004 | Lieber et al. |
| 6,783,855 B1 | 8/2004 | Dobson et al. |
| 6,788,453 B2 | 9/2004 | Banin et al. |
| 6,803,719 B1 | 10/2004 | Miller et al. |
| 6,815,064 B2 | 11/2004 | Treadway et al. |
| 6,819,692 B2 | 11/2004 | Bawendi et al. |
| 6,821,337 B2 | 11/2004 | Bawendi et al. |
| 6,855,202 B2 | 2/2005 | Alivisatos et al. |
| 6,855,551 B2 | 2/2005 | Bawendi et al. |
| 6,861,155 B2 | 3/2005 | Bawendi et al. |
| 6,864,626 B1 | 3/2005 | Schlamp et al. |
| 6,870,311 B2 | 3/2005 | Mueller et al. |
| 6,884,478 B2 | 4/2005 | Alivisatos et al. |
| 6,890,777 B2 | 5/2005 | Bawendi et al. |
| 6,914,265 B2 | 7/2005 | Bawendi et al. |
| 6,918,946 B2 | 7/2005 | Korgel et al. |
| 6,921,496 B2 | 7/2005 | Anderson et al. |
| 6,927,069 B2 | 8/2005 | Weiss et al. |
| 6,933,535 B2 | 8/2005 | Steigerwald et al. |
| 6,949,206 B2 | 9/2005 | Whiteford et al. |
| 6,984,369 B1 | 1/2006 | Alivisatos et al. |
| 7,049,148 B2 | 5/2006 | Bawendi et al. |
| 7,060,243 B2 | 6/2006 | Bawendi et al. |
| 7,091,656 B2 | 8/2006 | Murazaki et al. |
| 7,175,778 B1 | 2/2007 | Bhargava et al. |
| 7,267,875 B2 | 9/2007 | Whiteford et al. |
| 7,326,908 B2 | 2/2008 | Sargent et al. |
| 7,332,701 B2 | 2/2008 | Van Arendonk et al. |
| 7,374,807 B2 | 5/2008 | Parce et al. |
| 7,432,642 B2 | 10/2008 | Murazaki |
| 7,598,314 B2 | 10/2009 | Lee et al. |
| 7,645,397 B2 | 1/2010 | Parce et al. |
| 7,834,121 B2 | 11/2010 | Mowrer et al. |
| 8,071,079 B2 | 12/2011 | DeCaire et al. |
| 2002/0066401 A1 | 6/2002 | Peng et al. |
| 2002/0071952 A1 | 6/2002 | Bawendi et al. |
| 2002/0105004 A1 | 8/2002 | Hori et al. |
| 2002/0130311 A1 | 9/2002 | Lieber et al. |
| 2003/0010987 A1 | 1/2003 | Banin et al. |
| 2003/0066998 A1 | 4/2003 | Lee |
| 2003/0142944 A1 | 7/2003 | Sundar et al. |
| 2003/0145779 A1 | 8/2003 | Alivisatos et al. |
| 2003/0175004 A1 | 9/2003 | Garito et al. |
| 2003/0185771 A1 | 10/2003 | Kamei et al. |
| 2003/0226498 A1 | 12/2003 | Alivisatos et al. |
| 2004/0004982 A1 | 1/2004 | Eisler et al. |
| 2004/0007169 A1 | 1/2004 | Ohtsu et al. |
| 2004/0017834 A1 | 1/2004 | Sundar et al. |
| 2004/0023010 A1 | 2/2004 | Bulovic et al. |
| 2004/0033270 A1 | 2/2004 | Kropf et al. |
| 2004/0178390 A1 | 9/2004 | Whiteford et al. |
| 2004/0245912 A1 | 12/2004 | Thurk et al. |
| 2005/0161666 A1 | 7/2005 | Park et al. |
| 2005/0179364 A1 | 8/2005 | Murazaki |
| 2005/0234416 A1 | 10/2005 | Kropf et al. |
| 2006/0001119 A1 | 1/2006 | Liu et al. |
| 2006/0040103 A1 | 2/2006 | Whiteford et al. |
| 2006/0060862 A1 | 3/2006 | Bawendi et al. |
| 2006/0068154 A1 | 3/2006 | Parce et al. |
| 2006/0110279 A1 | 5/2006 | Han et al. |
| 2006/0157686 A1 | 7/2006 | Jang et al. |
| 2007/0034833 A1* | 2/2007 | Parce et al. ............ 252/301.36 |
| 2007/0185261 A1 | 8/2007 | Lee et al. |
| 2007/0213492 A1 | 9/2007 | Mowrer et al. |
| 2008/0090947 A1 | 4/2008 | Shin et al. |
| 2008/0118755 A1 | 5/2008 | Whiteford et al. |
| 2010/0006005 A1 | 1/2010 | Roesch et al. |
| 2010/0140551 A1 | 6/2010 | Parce et al. |
| 2010/0276638 A1 | 11/2010 | Liu et al. |
| 2010/0278770 A1 | 11/2010 | Arditty et al. |
| 2011/0189102 A1 | 8/2011 | Kairdolf et al. |
| 2014/0275598 A1* | 9/2014 | Freeman et al. ............ 556/419 |

FOREIGN PATENT DOCUMENTS

| | | |
|---|---|---|
| WO | 03/092081 A1 | 11/2003 |
| WO | 2005/022120 A2 | 3/2005 |
| WO | 2005/023923 A2 | 3/2005 |
| WO | 2008/013780 A2 | 3/2008 |

OTHER PUBLICATIONS

Alivisatos, A.P. "Semiconductor clusters, nanocrystals, and quantum dots" Science (1996) 271:933-937.

Battaglia, D. et al., "Formation of high quality InP and InAs nanocrystals in a noncoordinating solvent" Nano Lett (2002) 2(9):1027-1030.

Beachley, O.T. Jr. et al., "Reagents based on cyclopentadienyl derivatives of the group 14 elements for the synthesis of indium(I) derivatives. Crystal and molecular structure of In($C_5H_4SiMe_3$)" Organometallics (1990) 9:2488-2492.

Beachley, O.T. Jr. et al., "Chemistry of In($C_5H_5$)$_3$ and some heteroleptic organoindium (III) derivatives. Crystal and molecular structures of In($C_5H_5$)$_3$, In($C_5H_5$)$_3$In•PPh$_3$, Me$_3$CCH$_2$)$_2$In($C_5H_5$)" Organometallics (2002) 21:4632-4640.

Beletskaya, I.P. et al., "New approach to phosphinoalkynes based on Pd- and Ni-catalyzed cross-coupling of terminal alkynes with chlorophosphanes" Org. Lett (2003) 5(23):4309-4311.

Bharali, D.J. et al., "Folate-receptor-medicated delivery of InP quantum dots for bioimaging using confocal and two-photon microscopy" J. Am. Chem. Soc. (2005) 127:11367-11371.

Boeckman, R.K. Jr. et al., "Cyclic vinyl ether carbanions I: synthetic equivalents of β-acylvinyl and substituted acyl anions" Tet Lett (1977) 48:4187-4190.

Boeckman, R.K. Jr. et al., "Cyclic vinyl ether carbanions II: preparation and applications of the synthesis of carbonyl compounds" Tetrahedron (1981) 37(23):3997-4006.

Bradley, D.C et al., "A penta-indium oxo alkoxide cluster with a central 5-co-ordinate oxygen. Preparation and x-ray crystal structure of (InOPr$^i$)$_5$(μ$_2$-OPr$^i$)$_4$(μ$_3$-OPr$^i$)$_4$(μ$_5$-O)" J. Chem. Soc. Chem. Commun (1987) 18:1258-1259.

Bradley, D.C. et al., "Pentanuclear oxoalkoxide clusters of scandium, yttrium, indium and ytterbium, x-ray crystal structures of [M$_5$(μ$_5$-O)(μ$_3$-OPr$^i$)$_4$(μ$_2$-Opr$^i$)$_4$(OPr$^i$)$_5$] (M=In, Yb)" Polyhedron (1990) 9(5):719-726.

Bullen et al., "The effects of chemisoprtion on the luminescence of CdSe quantum dots" Langmuir (2006) 22:3007-3013.

Cao, L. et al., "Luminescence enhancement of core-shell ZnS:Mn/ZnS nanoparticles" Appl Phys Lett (2002) 80(23):4300-4302.

Cao, YW. et al., "Colloidal synthesis and properties of InAs/InP and InAs/CdSe core/shell nanocrystals" Mat. Res. Soc. Symp. Proc. (2000) 571:75-80.

Cao, YW. et al., "Growth and Properties of Semiconductor Core/Shell Nanocrystals with InAs Cores" J. Am. Chem. Soc. (2000) 122:9692-9702.

(56) References Cited

OTHER PUBLICATIONS

Chen, H-S et al., "Colloidal ZnSe, ZnSe/ZnS, and ZnSe/ZnSeS quantum dots synthesized from ZnO" J. Phys. Chem. B. (2004) 108:17119-17123.
Clay, R.T. et al., "Synthesis of metal nanoclusters within microphase-separated diblock copolymers: ICP-AES analysis of metal ion uptake" Supramolecular Science (1997) 4(1-2):113-119.
Clay, R.T. et al., "Synthesis of Cu and CuO nanoclusters within microphase-separated diblock copolymers" New J. Chem. (1998) 22(7):745-748.
Dabbousi, B.O. et al., "(CdSe)ZnS core-shell quantum dots: Synthesis and characterization of a size series of highly luminescent nanocrystallites" J. Phys. Chem. B (1997) 101:9463-9475.
Ebenstein et al., "Fluorescence quantum yield of CdSe/ZnS nanocrystals investigated by correlated atomic-force and single-particle fluorescence microscopy" Appl Phys Lett (2002) 80(21):4033-4035.
Farina V. et al., "Large rate accelerations in the stille reaction with tri-2-furylphosphine and triphenylarsine as palladium ligands: mechanistic and synthetic implications" J. Am. Chem. Soc. (1991) 113:9585-9595.
Franks, S. et al., "The preparation and properties of tertiary phosphines and tertiary phosphine oxides with long alkyl chains" J. Chem. Soc. Perkin (1979) 1:3029-3033.
Gelest, Inc. Catalog "Reactive silicones: forging new polymer links" (2004) pp. 25-27.
Guzelian, A.A. et al., "Colloidal chemical synthesis and characterization of InAs nanocrystal quantum dots" Appl. Phy. Lett (1996) 69(10): 1432-1434.
Guzelian, A.A. et al., "Synthesis of size-selected, surface passivated InP nanocrystals" J. Phys. Chem. (1996) 100:7212-7219.
Haubold, S. et al., "Strongly luminescent InP/ZnS core-shell nanoparticles" Chem. Phys. Chem. (2001) 5:331-334.
Hines, M.A. et al., "Bright UV-blue luminescent colloidal ZnSe nanocrystals" J. Phys. Chem. B. (1998) 102(19):3655-3657.
Hirai, T. et al., "Effects of thiols on photocatlytic properties of nano-CdS-polythiourethane composite particles," J. Chem Eng. Jap. (1998) 31(6):1003-1006.
Hirai, T. et al., "Composite nano-CdS-polyurethane transparent films" J. Mater. Chem. (1999) 9:1217-1219.
Hirai, T. et al., "Preparation of semiconductor nanoparticle polyurea composites using reverse micellar systems via an in situ diisocyanate polymerization" J. Phys. Chem. (1999) 103:10120-10126.
Hirai, T. et al., "Preparation of nano-CdS-polyurethane composites via in situ polymerization in reverse micellar systems" J. Mater. Chem. (2000) 10:2234-2235.
Ji, H-L et al., "Scope and diastereoselectivity of intramolecular [4+2] diels-alder cycloadditions within the coordination sphere of $[(\eta C_5H_5)Ru(DMPP)_{3-n}(dienophile)_n]PF_6$" Organometallics (1992) 11:1840-1855.
Kane, R.S. et al., "Synthesis of doped ZnS nanoclusters within block copolymer nanoreactors" Chem. Mat. (1999) 11(1):90-93.
Korgel, B.A. et al., "Controlled synthesis of mixed core and layered (Zn,Cd)S and (Hg,Cd)S nanocrystals within phosphatidylcholine vesicles" Langmuir (2000) 16:3588-3594.
Kost, D. et al., "The barrier to carbon-phosphorus bond rotation in tribenzoylphosphine. An experimental reinvestigation" Tet Lett (1979) 22:1983-1986.
Kyprianidou-Leodidou, T. et al., "Size variation of PbS particles in high-refractive-index nanocomposites" J. Phys. Chem. (1994) 98:8992-8997.
Lee et al., "Full color emission from II-VI semiconductor quantum dot-polymer composites" Adv Mater (2000) 12(15):1102-1105.
Lehmann, U. et al., "Palladium-catalyzed cross-coupling reactions between dihydrophyranylindium reagents and aryl halides. Synthesis of C-Arl glycals" Org. Lett (2003) 5(14):2405-2408.
Li, S.L. et al., "High quality ZnSe and ZnS nanocrystals formed by activating zinc carboxylate precursors" Nano Lett (2004) 4(11):2261-2264.

Li, Y. et al., "White-light-emitting diodes using semiconductor nanocrystals" Microchem Acta (2007) 159:207-215.
Lu, C. et al., "High refractive index thin films of ZnS/polythiourethane nanocomposites" J. Mater. Chem. (2003) 13:526-530.
Lucey, D.W. et al., "Monodispersed InP quantum dots prepared by colloidal chemistry in a noncoordinating solvent" Chem. Mater. (2005) 17:3754-3762.
Macdonell, G.D. et al., "The barrier to carbon-phosphorus bond rotation in triaroylphosphines" Tet Lett (1978) 10:857-860.
Malik, M.A. et al., "Synthesis and characterization of CdSe/CdS Core-shell and CdSe/CdS composites" Mat. Res. Soc. Symp. Proc. (2000) 581:291-296.
Malik, M.A. et al., "Synthesis and characterization of Mn doped CdS quantum dots from a single source precursor" Mat. Res. Soc. Symp. Proc. (2000) 581:133-138.
Manna, L. et al., "Shape control of colloidal semiconductor nanocrystals" J. Clus. Sci (2002) 13(4):521-532.
Mews, A. et al., "Preparation, characterization and photophysics of the quantum dot quantum well system CdS/HgS/CdS" J. Phys. Chem. (1994) 98:934-941.
Mews, A. et al., "Structural and spectroscopic investigations of CdS/HgS/CdS quantum-dot quantum wells" Phys. Rev. B. (1996) 53(20):R13242-R13245.
Micic, O.I. et al., "Synthesis and characterization of InP, GaP, and GaInP2 quantum dots" J. Phys. Chem. (1995) 99:7754-7759.
Micic, O.I. et al., "Core-shell quantum dots of lattice-matched ZnCdSe2 chells on InP cores: experiment and theory" J. Phys. Chem. B (2000) 104:12149-12156.
Miinea, L.A. et al., "Indium fluoroalkoxide compounds" Inorg. Chem. (1999) 38:4447-4454.
Mulligan, R.F. et al., "Synthesis of self-assembled metal-oxide nanostructures in diblock copolymer matrix and integration onto semiconductor surfaces" Mat. Res. Soc. Symp. Proc. (2001) 642:J2.11/1-J2.11/5.
Mulligan, R.F. et al., "Synthesis and characterization of ZnO nanostructures templates using diblock copolymers" J Appl Polymer Sci (2003) 89:1058-1061.
Murray, C.B. et al., "Synthesis and Characterization of Nearly Monodisperse CdE (E+S, Se, Te) Semiconductor Nanocrystallites" J. Am. Chem. Soc. (1993) 115:8706-8715.
Ogata, S. et al., "New preparation method for organic-inorganic layered compounds by organo derivatization reaction of Zn(OH)2 with carboxylic acids" J. Mat. Chem. (2000) 10(2):321-327.
Peng, X. et al., "Epitaxial growth of highly luminescent CdSe/CdS core/shell nanocrystals with photostability and electronic accessibility" J. Am. Chem. Soc. (1997) 119:7019-7029.
Peng, X. et al., "Shape control of CdSe nanocrystals" Nature (2000) 404:59-61.
Puntes, V.F. et al., "Colloidal nanocrystal shape and size control: The case of cobalt" Science (2001) 291:2115-2117.
Qi, L. et al., "Synthesis and characterization of mixed CdS—ZnS nanoparticles in reverse micelles" Colloids and Surfaces (1996) 111:195-202.
Reid, E.E. et al., Organic Chemistry of Bivalent Sulfer, New York, Chemical Publishing Co., Inc. (1985) vol. 1, p. 33.
Robinson, H.D. et al., "Lateral coupling of self-assembled quantum dots studied by near-field spectroscopy" Mat. Res. Soc. Symp. Proc. (2000) 571:89-94.
Schiefer, M. et al., "Neutral and ionic aluminum, gallium, and indium compounds carrying two or three terminal ethynyl groups" Inorg. Chem. (2003) 42:4970-4976.
Shiojiri, S. et al., "Immobilization of semiconductor nanoparticles formed in reverse micelles into polyurea via in situ polymerization of diisocyanates" Chem. Commun. (1998) 1439-1440.
Shiojiri, S. et al., "Thiol-mediated immobilization of photocatalytic metal sulfide ultrafine particles formed in reverse micellar systems in polythiourethane" J. Chem. Eng. Jap. (1998) 31(3):425-433.
Smith, et al. "Minimizing the hydrodynamic size of quantum dots with multifunctional multidentate polymer ligands" JACS (2008) 130(34):11278-11279.

(56) References Cited

OTHER PUBLICATIONS

Sohn, B.H. et al., "Processible optically transparent block copolymer films containing superparamagnetic iron oxide nanoclusters" Chem. Mat. (1997) 9(1):264-269.

Son, S.U. et al., "Facile synthesis of various phosphine-stabilized monodisperse palladium nanoparticles through the understanding of coordination of chemistry of nanoparticles" Nano Lett (2004) 4(6):1147-1151.

Talapin, D.V. et al. "Etching of colloidal InP nanocrystals with fluorides: photochemical nature of the process resulting in high photoluminescence efficiency" J. Phys. Chem. B. (2002) 106:12659-12663.

Technical Data Sheet for ZnO-350 from Sumitomo Osaka Cement 1995.

Tolbert, S.H. et al., "High-pressure structural transformation in semiconductor nanocrystals" Annu. Rev. Phys. Chem. (1995) 46:595-625.

Wells, R.L. et al. "Use of Tris(trimethylsilyl)arsine to prepare gallium arsenide and indium arsenide" Chem. of Mat. (1989) 1:4-6.

Xu, L. et al. "Reduced photo-instability of luminescence spectrum of core-shell CdSe/CdS nanocrystals" J. Mater. Sci (2000) 35:1375-1378.

Xu, S. et al. "Rapid synthesis of high-quality InP nanocrystals" J. Am. Chem. Soc. (2006) 128:1054-1055.

Yang, Y. et al., "Organic reactions in aqueous media, cyclopentadienylindium(I) as the first example of organoindium(I) reagent for carbon—carbon bond formation and the demonstration of one-pot tandem addition/intramolecular diels—alder reaction in aqueous media" J. Am. Chem. Soc. (2000) 122:402-403.

* cited by examiner

Where R = Octadecyl

SILICONE LIGANDS FOR STABILIZING QUANTUM DOT FILMS

CROSS-REFERENCES TO RELATED APPLICATIONS

This application claims priority to U.S. Provisional Application No. 61/663,234, filed Jun. 22, 2012, which is incorporated in its entirety herein for all purposes.

BACKGROUND OF THE INVENTION

High performance down-converting phosphor technologies will play a prominent role in the next generation of visible light emission, including high efficiency solid-state white lighting (SSWL). In addition, such technologies are also applicable to near infrared (NIR) and infrared (IR) light emitting technologies. Down-conversion from ultraviolet (UV) or blue light emitting semiconductor light emitting diodes (LEDs) into blue, red and green wavelengths offers a fast, efficient and cost-effective path for delivering commercially attractive white light sources. Unfortunately, existing rare-earth activated phosphors or halophosphates, which are currently the primary source for solid-state down-conversion, were originally developed for use in fluorescent lamps and cathode ray tubes (CRTs), and therefore have a number of critical shortfalls when it comes to the unique requirements of SSWL. As such, while some SSWL systems are available, poor power efficiency (<20 light lumens/watt (lm/W)), poor color rendering (Color Rendering Index (CRI)<75) and extremely high costs (>$200/kilolumen (klm)) limit this technology to niche markets such as flashlights and walkway lighting.

Furthermore, LEDs often suffer from reduced performance as a result of internal reflection of photons at the chip/coating interface. Typically, LEDs are encapsulated or coated in a polymeric material (which may comprise phosphors) to provide stability to the light-emitting chip. Currently these coatings are made by using an inorganic or organic coating that has a very different refractive index than the base material (i.e., the chip), which results in a detrimental optical effect due to the refractive index mismatch at the interface between the two materials. In addition, the temperature of the LED can reach in excess of 100° C. To allow for the expansion and contraction that can accompany this temperature rise, a compliant polymeric layer (e.g., silicone) is often placed in contact with the chip. In order to provide additional stability to the LED, this compliant layer is often further coated with a hard shell polymer.

The resulting LED structure suffers loss of light at the chip/compliant polymer interface due to the lower refractive index of the polymer coating in relation to the LED. However, if the refractive index of the compliant layer is increased, even greater loss will occur due at the high refractive index/low refractive index interface between the compliant polymer and the hard shell polymer due to internal reflection.

There are several critical factors which result in poor power efficiencies when using traditional inorganic phosphors for SSWL. These include: total internal reflection at the LED-chip and phosphor layer interface resulting in poor light extraction from the LED into the phosphor layer; poor extraction efficiency from the phosphor layer into the surroundings due to scattering of the light generated by the phosphor particles as well as parasitic absorption by the LED chip, metal contacts and housing; broad phosphor emission in the red wavelength range resulting in unused photons emitted into the near-IR; and poor down-conversion efficiency of the phosphors themselves when excited in the blue wavelength range (this is a combination of absorption and emission efficiency). While efficiencies improve with UV excitation, additional loss due to larger Stokes-shifted emission and lower efficiencies of LEDs in the UV versus the blue wavelength range makes this a less appealing solution overall.

As a result, poor efficiency drives a high effective ownership cost. The cost is also significantly impacted from the laborious manufacturing and assembly process to construct such devices, for example the heterogeneous integration of the phosphor-layer onto the LED-chip during packaging (DOE and Optoelectronics Industry Development Association "Light emitting diodes (LEDs) for general illumination," Technology Roadmap (2002)). Historically, blue LEDs have been used in conjunction with various band edge filters and phosphors to generate white light. However, many of the current filters allow photon emission from the blue end of the spectrum, thus limiting the quality of the white LED. The performance of the devices also suffer from poor color rendering due to a limited number of available phosphor colors and color combinations that can be simultaneously excited in the blue. There is a need therefore for efficient nanocomposite filters that can be tailored to filter out specific photon emissions in the visible (especially the blue end), ultraviolet and near infrared spectra.

While some development of organic phosphors has been made for SSWL, organic materials have several insurmountable drawbacks that make them unlikely to be a viable solution for high-efficiency SSWL. These include: rapid photo-degradation leading to poor lifetime, especially in the presence of blue and near-UV light; low absorption efficiency; optical scattering, poor refractive index matching at the chip-interface, narrow and non-overlapping absorption spectra for different color phosphors making it difficult or impossible to simultaneously excite multiple colors; and broad emission spectra. There exists a need therefore for polymeric layers that aid production of high quality, high intensity, white light. Surprisingly, the present invention meets this and other needs.

BRIEF SUMMARY OF THE INVENTION

In some embodiments, the present invention provides a quantum dot binding-ligand having a siloxane polymer including a plurality of monomer repeat units. The quantum dot binding-ligand also includes a plurality of amine or carboxy binding groups each covalently attached to one of the monomer repeat units, thereby forming a first population of monomer repeat units. The quantum dot binding-ligand also includes a plurality of solubilizing groups each covalently attached to one of the monomer repeat units, thereby forming a second population of monomer repeat units.

In some embodiments, the quantum dot binding ligand has the structure of formula I:

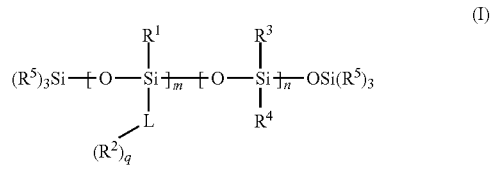

wherein each $R^1$ can independently be $C_{1-20}$ alkyl, $C_{1-20}$ heteroalkyl, $C_{2-20}$ alkenyl, $C_{2-20}$ alkynyl, cycloalkyl or aryl, each optionally substituted with one or more $-Si(R^{1a})_3$ groups;

each $R^{1a}$ can independently be $C_{1-6}$ alkyl, cycloalkyl or aryl; each L can independently be $C_{3-8}$ alkylene, $C_{3-8}$ heteroalkylene, $C_{3-8}$ alkylene-O—$C_{2-8}$ alkylene, $C_{3-8}$ alkylene-(C(O)NH—$C_{2-8}$ alkylene)$_q$, $C_{3-8}$ heteroalkylene-(C(O)NH—$C_{2-8}$ alkylene)$_q$, or
$C_{3-8}$ alkylene-O—$C_{1-8}$ alkylene-(C(O)NH—$C_{2-8}$ alkylene)$_q$; each $R^2$ can independently be $NR^{2a}R^{2b}$ or C(O)OH; each of $R^{2a}$ and $R^{2b}$ can independently be H or $C_{1-6}$ alkyl; each $R^3$ can independently be $C_{1-20}$ alkyl, $C_{2-20}$ alkenyl, $C_{2-20}$ alkynyl, cycloalkyl or aryl; each $R^4$ can independently be $C_{8-20}$ alkyl, $C_{8-20}$ heteroalkyl, cycloalkyl or aryl, each optionally substituted with one or more —Si($R^{1a}$)$_3$ groups; each $R^5$ can independently be $C_{1-20}$ alkyl, $C_{2-20}$ alkenyl, $C_{2-20}$ alkynyl, -L-($R^2$)$_q$, cycloalkyl or aryl; subscript m is an integer from 5 to 50; subscript n is an integer from 0 to 50; and subscript q is an integer from 1 to 10, wherein when subscript n is 0, then $R^1$ can be $C_{8-20}$ alkyl, $C_{8-20}$ heteroalkyl, $C_{8-20}$ alkenyl, $C_{8-20}$ alkynyl, cycloalkyl or aryl, each optionally substituted with one or more —Si($R^{1a}$)$_3$ groups.

In some embodiments, the present invention provides a method of making a quantum dot binding-ligand of formula Ib:

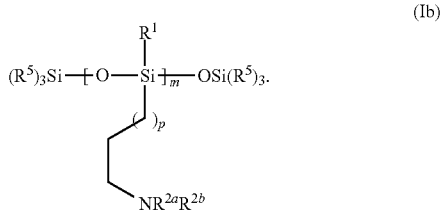

The method of making the quantum dot binding-ligand of formula I includes forming a reaction mixture having water and a compound of formula II:

to afford a compound of formula III:

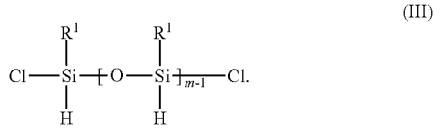

The method also includes forming a reaction mixture of ($R^5$)$_3$SiOM and the compound of formula III, to afford a compound of formula IV:

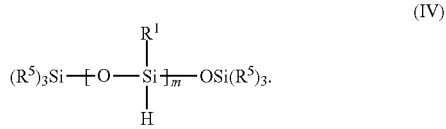

The method also includes forming a reaction mixture of the compound of formula IV, a catalyst, and $CH_2$=$CH(CH_2)_p$$NR^{2a}R^{2b}$, thereby forming the compound of formula I. For formulas Ib, II, III and IV, each $R^1$ can independently be $C_{8-20}$ alkyl, $C_{8-20}$ alkenyl, $C_{8-20}$ alkynyl, cycloalkyl or aryl; each $R^{2a}$ and $R^{2b}$ can independently be H or $C_{1-6}$ alkyl; each $R^5$ can independently be $C_{1-20}$ alkyl, $C_{2-20}$ alkenyl, $C_{2-20}$ alkynyl, $C_{3-8}$ alkyl-$NR^{2a}R^{2b}$, cycloalkyl or aryl; subscript m can be an integer from 5 to 50; M can be hydrogen or a cation; and subscript p can be an integer of from 1 to 6.

In some embodiments, the present invention provides a composition of a quantum dot binding-ligand of the present invention, and a first population of light emitting quantum dots (QDs).

BRIEF DESCRIPTION OF THE DRAWINGS

The accompanying drawings, which are incorporated herein and form a part of the specification, illustrate the present invention and, together with the description, further serve to explain the principles of the invention and to enable a person skilled in the pertinent art to make and use the invention.

DETAILED DESCRIPTION OF THE INVENTION

I. General

Figure 1:
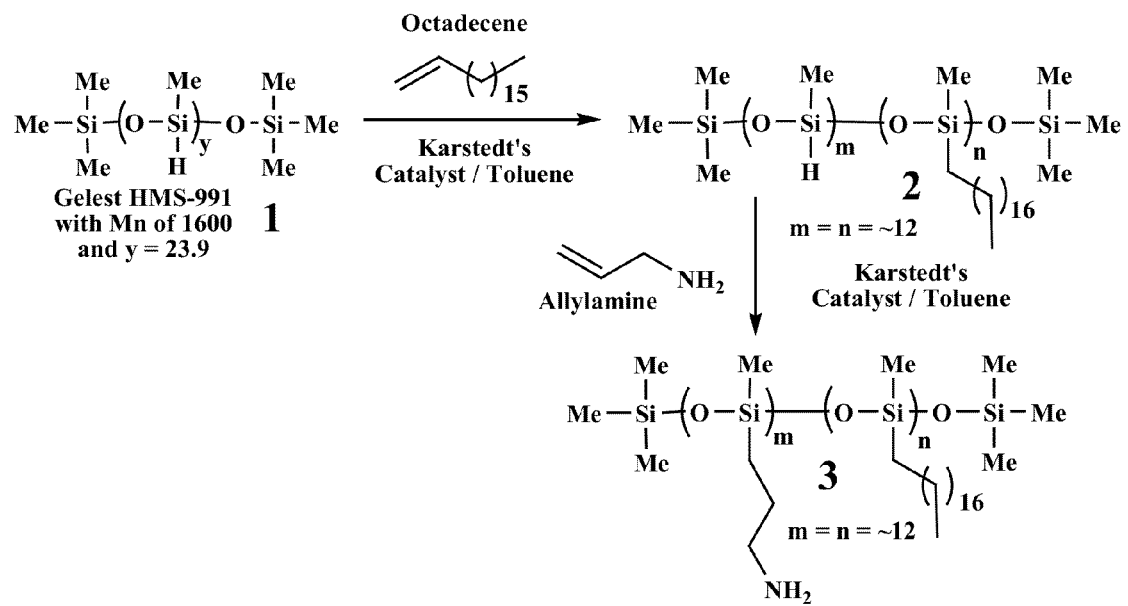
FIG. 1 shows the synthesis of one type of quantum dot binding-ligand of the present invention by partial hydrosilylation of a commercially available siloxane with an alkene, followed by hydrosilylation of the remaining silane groups with an alkene-amine.

The present invention provides siloxane amine waxes (SAW) for binding to quantum dots. The ligands provide greater stability for the quantum dots due to a plurality of amine or carboxy binding groups.

II. Definitions

"Siloxane polymer" or "polysiloxanes" refers to a polymer having a monomer repeat unit of the formula: —Si($R_2$)O—. The R groups of the siloxane polymer can be the same or different, and can be any suitable group, including, but not limited to, hydrogen, alkyl, alkenyl, alkynyl, cycloalkyl, heterocycloalkyl, aryl and heteroaryl. When both R groups are other than hydrogen, the siloxane polymer can be referred to as a "silicone." The siloxane polymers can be linear, branched or cyclic. The siloxane polymer can include a single type of monomer repeat unit, forming a homopolymer. Alternatively, the siloxane polymer can include two or more types of monomer repeat units to form a copolymer that can be a random copolymer or a block copolymer.

"Solubilizing group" refers to a substantially non-polar group that has a low solubility in water and high solubility in organic solvents such as hexane, pentane, toluene, benzene, diethylether, acetone, ethyl acetate, dichloromethane (methylene chloride), chloroform, dimethylformamide, and N-methylpyrrolidinone. Representative solubilizing groups include long-chain alkyl, long-chain heteroalkyl, long-chain alkenyl, long-chain alkynyl, cycloalkyl and aryl.

"Amine binding group" refers to an amine having the formula —$NR_2$. The R groups attached to the nitrogen atom can be any suitable group, including hydrogen and alkyl. Moreover, the R groups can be the same or different.

"Carboxy binding group" refers to a carboxylic acid group: C(O)OH.

"Alkyl" refers to a straight or branched, saturated, aliphatic radical having the number of carbon atoms indicated. Alkyl can include any number of carbons, such as $C_{1-2}$, $C_{1-3}$, $C_{1-4}$, $C_{1-5}$, $C_{1-6}$, $C_{1-7}$, $C_{1-8}$, $C_{1-9}$, $C_{1-10}$, $C_{1-12}$, $C_{1-14}$, $C_{1-16}$, $C_{1-18}$, $C_{1-20}$, $C_{8-20}$, $C_{12-20}$, $C_{14-20}$, $C_{16-20}$, and $C_{18-20}$. For example, $C_{1-6}$ alkyl includes, but is not limited to, methyl, ethyl, propyl, isopropyl, butyl, isobutyl, sec-butyl, tert-butyl, pentyl, isopentyl, hexyl, etc. Other alkyl groups include octane, nonane, decane, undecane, dodecane, tridecane, tetradecane, pentadecane, hexadecane, heptadecane, octadecane, nonadecane, and icosane. Alkyl groups can be substituted or unsubstituted.

"Long-chain alkyl groups" are alkyl groups, as defined above, having at least 8 carbon chain atoms. Long-chain alkyl groups can include any number of carbons, such as $C_{8-20}$, $C_{12-20}$, $C_{14-20}$, $C_{16-20}$, or $C_{18-20}$. Representative groups include, but are not limited to, octane, nonane, decane, undecane, dodecane, tridecane, tetradecane, pentadecane, hexadecane, heptadecane, octadecane, nonadecane, and icosane. Long-chain alkyl groups can also be substituted with silane groups.

"Alkylene" refers to a straight or branched, saturated, aliphatic radical having the number of carbon atoms indicated, and linking at least two other groups. The alkylene can link to 2, 3, 4, or more groups, and be divalent, trivalent, tetravalent, or multi-valent. The groups linked to the alkylene can be linked to the same atom or different atoms of the alkylene group. For instance, a straight chain alkylene can be the bivalent radical of —$(CH_2)_n$—, where n is 1, 2, 3, 4, 5 or 6. Representative alkylene groups include, but are not limited to, methylene, ethylene, propylene, isopropylene, butylene, isobutylene, sec-butylene, pentylene and hexylene. Alkylene groups can be substituted or unsubstituted.

"Alkylamine binding group" refers to an amine linked to an alkyl, as described above, and generally having the formula —$C_{1-20}$ alkyl-$NR_2$. The alkyl moiety of the alkylamine binding group is linked to the siloxane polymer of the present invention. Any suitable alkyl chain is useful. The R groups attached to the nitrogen atom can be any suitable group, including hydrogen and alkyl. Moreover, the R groups can be the same or different.

"Heteroalkyl" refers to an alkyl group of any suitable length and having from 1 to 5 heteroatoms such as N, O and S. Additional heteroatoms can also be useful, including, but not limited to, B, Al, Si and P. The heteroatoms can also be oxidized, such as, but not limited to, —S(O)— and —$S(O)_2$—. For example, heteroalkyl can include ethers (ethyleneoxy and poly(ethyleneoxy)), thioethers and alkylamines. The heteroatom portion of the heteroalkyl can replace a hydrogen of the alkyl group to form a hydroxy, thio or amino group. Alternatively, the heteroatom portion can be the connecting atom, or be inserted between two carbon atoms.

"Long-chain heteroalkyl groups" are heteroalkyl groups, as defined above, having at least 8 chain atoms. Long-chain heteroalkyl groups can include any number of chain atoms, such as $C_{8-20}$, $C_{12-20}$, $C_{14-20}$, $C_{16-20}$, or $C_{18-20}$.

"Heteroalkylene" refers to a heteroalkyl group, as defined above, linking at least two other groups. The two moieties linked to the heteroalkylene can be linked to the same atom or different atoms of the heteroalkylene.

"Alkenyl" refers to a straight chain or branched hydrocarbon having at least 2 carbon atoms and at least one double bond. Alkenyl can include any number of carbons, such as $C_2$, $C_{2-3}$, $C_{2-4}$, $C_{2-5}$, $C_{2-6}$, $C_{2-7}$, $C_{2-8}$, $C_{2-9}$, $C_{2-10}$, $C_{2-12}$, $C_{2-14}$, $C_{2-16}$, $C_{2-18}$, $C_{2-20}$, $C_{8-20}$, $C_{12-20}$, $C_{14-20}$, $C_{16-20}$, and $C_{18-20}$. Alkenyl groups can have any suitable number of double bonds, including, but not limited to, 1, 2, 3, 4, 5 or more. Examples of alkenyl groups include, but are not limited to, vinyl (ethenyl), propenyl, isopropenyl, 1-butenyl, 2-butenyl, isobutenyl, butadienyl, 1-pentenyl, 2-pentenyl, isopentenyl, 1,3-pentadienyl, 1,4-pentadienyl, 1-hexenyl, 2-hexenyl, 3-hexenyl, 1,3-hexadienyl, 1,4-hexadienyl, 1,5-hexadienyl, 2,4-hexadienyl, or 1,3,5-hexatrienyl. Alkenyl groups can be substituted or unsubstituted.

"Long-chain alkenyl groups" are alkenyl groups, as defined above, having at least 8 carbon chain atoms. Long-chain alkenyl groups can include any number of carbons, such as $C_{8-20}$, $C_{12-20}$, $C_{14-20}$, $C_{16-20}$, or $C_{18-20}$. Representative groups include, but are not limited to, octene, nonene, decene, undecene, dodecene, tridecene, tetradecene, pentadecene, hexadecene, heptadecene, octadecene, nonadecene, and icosene. The long-chain alkenyl groups can have one or more alkene groups.

"Alkynyl" refers to either a straight chain or branched hydrocarbon having at least 2 carbon atoms and at least one triple bond. Alkynyl can include any number of carbons, such as $C_2$, $C_{2-3}$, $C_{2-4}$, $C_{2-5}$, $C_{2-6}$, $C_{2-7}$, $C_{2-8}$, $C_{2-9}$, $C_{2-10}$, $C_{2-12}$, $C_{2-14}$, $C_{2-16}$, $C_{2-18}$, $C_{2-20}$, $C_{8-20}$, $C_{12-20}$, $C_{14-20}$, $C_{16-20}$, and $C_{18-20}$. Examples of alkynyl groups include, but are not limited to, acetylenyl, propynyl, 1-butyryl, 2-butyryl, isobutynyl, sec-butyryl, butadiynyl, 1-pentynyl, 2-pentynyl, isopentynyl, 1,3-pentadiynyl, 1,4-pentadiynyl, 1-hexynyl, 2-hexynyl, 3-hexynyl, 1,3-hexadiynyl, 1,4-hexadiynyl, 1,5-hexadiynyl, 2,4-hexadiynyl, or 1,3,5-hexatriynyl. Alkynyl groups can be substituted or unsubstituted.

"Long-chain alkynyl groups" are alkynyl groups, as defined above, having at least 8 carbon chain atoms. Long-chain alkynyl groups can include any number of carbons, such as $C_{8-20}$, $C_{12-20}$, $C_{14-20}$, $C_{16-20}$, or $C_{18-20}$. Representative groups include, but are not limited to, octyne, nonyne, decyne, undecyne, dodecyne, tridecyne, tetradecyne, pentadecyne, hexadecyne, heptadecyne, octadecyne, nonadecyne, and icosyne. The long-chain alkynyl groups can have one or more alkyne groups.

"Cycloalkyl" refers to a saturated or partially unsaturated, monocyclic, fused bicyclic or bridged polycyclic ring assembly containing from 3 to 12 ring atoms, or the number of atoms indicated. Cycloalkyl can include any number of carbons, such as $C_{3-6}$, $C_{4-6}$, $C_{5-6}$, $C_{3-8}$, $C_{4-8}$, $C_{5-8}$, $C_{6-8}$, $C_{3-9}$, $C_{3-10}$, $C_{3-11}$, $C_{3-12}$, $C_{6-10}$, or $C_{6-12}$ Saturated monocyclic cycloalkyl rings include, for example, cyclopropyl, cyclobutyl, cyclopentyl, cyclohexyl, and cyclooctyl. Saturated bicyclic and polycyclic cycloalkyl rings include, for example, norbornane, [2.2.2]bicyclooctane, decahydronaphthalene and adamantane. Cycloalkyl groups can also be partially unsaturated, having one or more double or triple bonds in the ring. Representative cycloalkyl groups that are partially unsaturated include, but are not limited to, cyclobutene, cyclopentene, cyclohexene, cyclohexadiene (1,3- and 1,4-isomers), cycloheptene, cycloheptadiene, cyclooctene, cyclooctadiene (1,3-, 1,4- and 1,5-isomers), norbornene, and norbornadiene. When cycloalkyl is a saturated monocyclic $C_{3-8}$ cycloalkyl, exemplary groups include, but are not limited to cyclopropyl, cyclobutyl, cyclopentyl, cyclohexyl, cycloheptyl and cyclooctyl. When cycloalkyl is a saturated monocyclic $C_{3-6}$ cycloalkyl, exemplary groups include, but are not limited to cyclopropyl, cyclobutyl, cyclopentyl, and cyclohexyl. Cycloalkyl groups can be substituted or unsubstituted.

"Alkyl-cycloalkyl" refers to a radical having an alkyl component and a cycloalkyl component, where the alkyl component links the cycloalkyl component to the point of attachment. The alkyl component is as defined above, except that the alkyl component is at least divalent, an alkylene, to link to the cycloalkyl component and to the point of attachment. In some instances, the alkyl component can be absent. The alkyl component can include any number of carbons, such as $C_{1-6}$, $C_{1-2}$, $C_{1-3}$, $C_{1-4}$, $C_{1-5}$, $C_{2-3}$, $C_{2-4}$, $C_{2-5}$, $C_{2-6}$, $C_{3-4}$, $C_{3-5}$, $C_{3-6}$, $C_{4-5}$, $C_{4-6}$ and $C_{5-6}$. The cycloalkyl component is as defined within. Exemplary alkyl-cycloalkyl groups include, but are not limited to, methyl-cyclopropyl, methyl-cyclobutyl, methyl-cyclopentyl and methyl-cyclohexyl.

"Aryl" refers to an aromatic ring system having any suitable number of ring atoms and any suitable number of rings. Aryl groups can include any suitable number of ring atoms, such as, 6, 7, 8, 9, 10, 11, 12, 13, 14, 15 or 16 ring atoms, as well as from 6 to 10, 6 to 12, or 6 to 14 ring members. Aryl groups can be monocyclic, fused to form bicyclic or tricyclic groups, or linked by a bond to form a biaryl group. Representative aryl groups include phenyl, naphthyl and biphenyl. Other aryl groups include benzyl, having a methylene linking group. Some aryl groups have from 6 to 12 ring members, such as phenyl, naphthyl or biphenyl. Other aryl groups have from 6 to 10 ring members, such as phenyl or naphthyl. Some other aryl groups have 6 ring members, such as phenyl. Aryl groups can be substituted or unsubstituted.

"Alkyl-aryl" refers to a radical having an alkyl component and an aryl component, where the alkyl component links the aryl component to the point of attachment. The alkyl component is as defined above, except that the alkyl component is at least divalent, an alkylene, to link to the aryl component and to the point of attachment. The alkyl component can include any number of carbons, such as $C_{0-6}$, $C_{1-2}$, $C_{1-3}$, $C_{1-4}$, $C_{1-5}$, $C_{1-6}$, $C_{2-3}$, $C_{2-4}$, $C_{2-5}$, $C_{2-6}$, $C_{3-4}$, $C_{3-5}$, $C_{3-6}$, $C_{4-5}$, $C_{4-6}$ and $C_{5-6}$. In some instances, the alkyl component can be absent. The aryl component is as defined above. Examples of alkyl-aryl groups include, but are not limited to, benzyl and ethyl-benzene. Alkyl-aryl groups can be substituted or unsubstituted.

"Silane" or "silyl" refers to a silicon atom having several substituents, and generally having the formula —$SiR_3$. The R groups attached to the silicon atom can be any suitable group, including, but not limited to, hydrogen, halogen and alkyl. Moreover, the R groups can be the same or different.

"Forming a reaction mixture" refers to combining at least two components in a container under conditions suitable for the components to react with one another and form a third component.

"Catalyst" refers to a transition metal catalyst capable of performing a hydrosilylation reaction. Representative catalysts include palladium and platinum catalysts such as Karstedt's catalyst. Other catalysts are useful in the present invention.

"Cation" refers to metal and non-metal ions having at least a 1+ charge. Metals useful as the metal cation in the present invention include the alkali metals, alkali earth metals, transition metals and post-transition metals. Alkali metals include Li, Na, K, Rb and Cs. Non-metal cations can be formed from a variety of groups including quaternary nitrogen groups such as ammonium ions, $R_4N^+$, wherein the R groups can be the same or different, and can be any suitable group, including, but not limited to, hydrogen, alkyl, alkenyl, alkynyl, cycloalkyl, heterocycloalkyl, aryl and heteroaryl.

"Quantum dot" or "nanocrystal" refers to nanostructures that are substantially monocrystalline. A nanocrystal has at least one region or characteristic dimension with a dimension of less than about 500 nm, and down to on the order of less than about 1 nm. As used herein, when referring to any numerical value, "about" means a value of ±10% of the stated value (e.g. about 100 nm encompasses a range of sizes from 90 nm to 110 nm, inclusive). The terms "nanocrystal," "quantum dot," "nanodot," and "dot," are readily understood by the ordinarily skilled artisan to represent like structures and are used herein interchangeably. The present invention also encompasses the use of polycrystalline or amorphous nanocrystals.

III. Quantum Dot Binding-Ligands

The present invention provides a siloxane amine wax (SAW) for binding to quantum dots (QDs) and related materials. The SAW materials of the present invention contain a waxy component (long-chain alkyl) and a plurality of amine or carboxy groups capable of binding to QDs, improving stability of the resulting ligand-QD complex.

In some embodiments, the present invention provides a quantum dot binding-ligand having a siloxane polymer including a plurality of monomer repeat units. The quantum dot binding-ligand also includes a plurality of amine or carboxy binding groups each covalently attached to one of the monomer repeat units, thereby forming a first population of monomer repeat units. The quantum dot binding-ligand also includes a plurality of solubilizing groups each covalently attached to one of the monomer repeat units, thereby forming a second population of monomer repeat units.

In some embodiments, the present invention provides a quantum dot binding-ligand having a siloxane polymer including a plurality of monomer repeat units. The quantum dot binding-ligand also includes a plurality of alkylamine binding groups each covalently attached to one of the monomer repeat units, thereby forming a first population of monomer repeat units. The quantum dot binding-ligand also includes a plurality of solubilizing or hydrophobic groups each covalently attached to one of the monomer repeat units, thereby forming a second population of monomer repeat units.

The siloxane polymer can be any siloxane polymer having a waxy component and a binding component. The waxy component can be any solubilizing or hydrophobic group. In some embodiments, the solubilizing or hydrophobic group can be a long-chain alkyl group, a long-chain alkenyl group, a long-chain alkynyl group, a cycloalkyl or an aryl.

In some embodiments, the solubilizing group or waxy component can be a long-chain alkyl. In some embodiments, each long-chain alkyl group can be octane, nonane, decane, undecane, dodecane, tridecane, tetradecane, pentadecane, hexadecane, heptadecane, octadecane, nonadecane, or icosane. In some embodiments, each long-chain alkyl group can be hexadecane, heptadecane, octadecane, nonadecane, or icosane. In some embodiments, each long-chain alkyl group can be hexadecane, octadecane, or icosane. In some embodiments, each long-chain alkyl group can be octadecane. The long-chain alkyl group can be linear or branched, and optionally substituted.

The siloxane polymer can have any suitable number of monomer repeat units. For example, the siloxane polymer can include from 5 to 100 monomer repeat units. Alternatively, the siloxane polymer can include about 5, 10, 15, 20, 25, 30, 40, 50, 60, 70, 80, 90 or 100 monomer repeat units. In some embodiments, the siloxane polymer can include from about 5 to about 50, or about 10 to about 50, or about 10 to about 25 monomer repeat units.

When there are at least two types of monomer repeat units, one type of monomer repeat can be present in a greater amount relative to the other types of monomer repeat units. Alternatively, the different types of monomer repeat units can be present in about the same amount. In some embodiments, the first population of monomer repeat units is about the same number as the second population of monomer repeat units.

Each monomer repeat unit can be the same or different. In some embodiments, there are at least two types of monomer repeat units in the siloxane polymer. In some embodiments, the siloxane polymer includes at least two types of monomer repeat units where a first type includes to the long-chain alkyl group and a second type includes to the alkylamine binding group. Other types of monomer repeat units can also be present. The siloxane polymer of the present invention can include 1, 2, 3, 4 or more different kinds of monomer repeat units. In some embodiments, the siloxane polymers of the present invention have a single type of monomer repeat unit. In other embodiments, the siloxane polymers of the present invention have two different types of monomer repeat units.

In some embodiments, each monomer repeat unit is covalently linked to both the amine or carboxy binding group and the long-chain alkyl group, such that the first and second populations of monomer repeat units are the same.

In some embodiments, each monomer repeat unit is covalently linked to both the alkylamine binding group and the long-chain alkyl group, such that the first and second populations of monomer repeat units are the same.

In some embodiments, the quantum dot binding ligand has the structure of formula I:

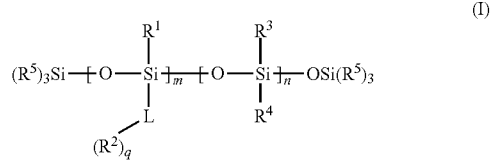

wherein each $R^1$ can independently be $C_{1-20}$ alkyl, $C_{1-20}$ heteroalkyl, $C_{2-20}$ alkenyl, $C_{2-20}$ alkynyl, cycloalkyl or aryl, each optionally substituted with one or more $-Si(R^{1a})_3$ groups; each $R^{1a}$ can independently be $C_{1-6}$ alkyl, cycloalkyl or aryl; each L can independently be $C_{3-8}$ alkylene, $C_{3-8}$ heteroalkylene, $C_{3-8}$ alkylene-O-$C_{2-8}$ alkylene, $C_{3-8}$ alkylene-(C(O)NH-$C_{2-8}$ alkylene)$_q$, $C_{3-8}$ heteroalkylene-(C(O)NH-$C_{2-8}$ alkylene)$_q$, or $C_{3-8}$ alkylene-O-$C_{1-8}$ alkylene-(C(O)NH-$C_{2-8}$ alkylene)$_q$; each $R^2$ can independently be $NR^{2a}R^{2b}$ or C(O)OH; each of $R^{2a}$ and $R^{2b}$) can independently be H or $C_{1-6}$ alkyl; each $R^3$ can independently be $C_{1-20}$ alkyl, $C_{2-20}$ alkenyl, $C_{2-20}$ alkynyl, cycloalkyl or aryl; each $R^4$ can independently be $C_{8-20}$ alkyl, $C_{8-20}$ heteroalkyl, cycloalkyl or aryl, each optionally substituted with one or more $-Si(R^{1a})_3$ groups; each $R^5$ can independently be $C_{1-20}$ alkyl, $C_{2-20}$ alkenyl, $C_{2-20}$ alkynyl, -L-$(R^2)_q$, cycloalkyl or aryl; subscript m is an integer from 5 to 50; subscript n is an integer from 0 to 50; and subscript q is an integer from 1 to 10, wherein when subscript n is 0, then $R^1$ can be $C_{8-20}$ alkyl, $C_{8-20}$ heteroalkyl, $C_{8-20}$ alkenyl, $C_{8-20}$ alkynyl, cycloalkyl or aryl, each optionally substituted with one or more $-Si(R^{1a})_3$ groups.

In some embodiments, wherein each $R^1$ can independently be $C_{1-20}$ alkyl, $C_{1-20}$ heteroalkyl, $C_{2-20}$ alkenyl, $C_{2-20}$ alkynyl, cycloalkyl or ary; each $R^{1a}$ can independently be $C_{1-6}$ alkyl, cycloalkyl or aryl; each L can independently be $C_{3-8}$ alkylene; each $R^2$ can independently be $NR^{2a}R^{2b}$ or $C(O)OH$; each of $R^{2a}$ and $R^{2b}$ can independently be H or $C_{1-6}$ alkyl; each $R^3$ can independently be $C_{1-20}$ alkyl, $C_{2-20}$ alkenyl, $C_{2-20}$ alkynyl, cycloalkyl or aryl; each $R^4$ can independently be $C_{8-20}$ alkyl, $C_{8-20}$ heteroalkyl, cycloalkyl or aryl; each $R^5$ can independently be $C_{1-20}$ alkyl, $C_{2-20}$ alkenyl, $C_{2-20}$ alkynyl, -L-$(R^2)_q$, cycloalkyl or aryl; subscript m is an integer from 5 to 50; subscript n is an integer from 0 to 50; and subscript q is an integer from 1 to 10, wherein when subscript n is 0, then $R^1$ can be $C_{8-20}$ alkyl, $C_{8-20}$ heteroalkyl, $C_{8-20}$ alkenyl, $C_{8-20}$ alkynyl, cycloalkyl or aryl.

Radical L can be any suitable linker to link the binding group $R^2$ to the siloxane polymer. In some embodiments, each L can independently be $C_{3-8}$ alkylene, $C_{3-8}$ alkylene-O—$C_{2-8}$ alkylene, $C_{3-8}$ alkylene-(C(O)NH—$C_{2-8}$ alkylene)$_2$, or $C_{3-8}$ alkylene-O—$C_{1-8}$ alkylene-(C(O)NH—$C_{2-8}$ alkylene)$_3$. In other embodiments, each L can independently be $C_{3-8}$ alkylene. In some other embodiments, each L can independently be propylene, butylene, pentylene, n-propylene-O-i-propylene, and pentylene-(C(O)NH-ethylene)$_2$. In still other embodiments, each L can independent by propylene, butylene or pentylene.

The binding group, $R^2$, can be any suitable amine or carboxylic acid. For example, $R^2$ can be a primary amine where both of $R^{2a}$ and $R^{2b}$ are H. Alternatively, $R^2$ can be a secondary amine where one of $R^{2a}$ and $R^{2b}$ is H and the other is $C_{1-6}$ alkyl. Representative secondary amines include, but are not limited to, those where $R^{2a}$ is methyl, ethyl, propyl, isopropyl, butyl, etc. Tertiary amines, where each of $R^{2a}$ and $R^{2b}$ is $C_{1-6}$ alkyl, are also useful as the binding group $R^2$. In those cases, the $R^{2a}$ and $R^{2b}$ can be the same or different. Representative tertiary amines include, but are not limited to —N(Me)$_2$, —N(Et)$_2$, —N(Pr)$_2$, —N(Me)(Et), —N(Me)(Pr), —N(Et)(Pr), among others.

In some embodiments, each -L-$(R^2)_q$ group can independently be $C_{3-8}$ alkylene-$(R^2)_{1-3}$, $C_{3-8}$ heteroalkylene-$R^2$, or $C_{3-8}$ alkylene-(C(O)NH—$C_{2-8}$ alkylene-$R^2$)$_2$. In other embodiments, each L-$(R^2)_q$ group can independently be $C_{3-8}$ alkylene-C(O)OH, $C_{3-8}$ alkylene-(C(O)OH)$_2$, $C_{3-8}$ alkylene-O—$C_{2-8}$ alkylene-(C(O)OH)$_3$, $C_{3-8}$ alkylene-$NR^{2a}R^{2b}$, or $C_{3-8}$ alkylene-(C(O)NH—$C_{2-8}$ alkylene-$NR^{2a}R^{2b}$)$_2$. In some other embodiments, each L-$(R^2)_q$ group can independently be $C_{3-8}$ alkylene-C(O)OH, $C_{3-8}$ alkylene-(C(O)OH)$_2$, or $C_{3-8}$ alkylene-$NR^{2a}R^{2b}$. In some other embodiments, each L-$(R^2)_q$ group can independently be:

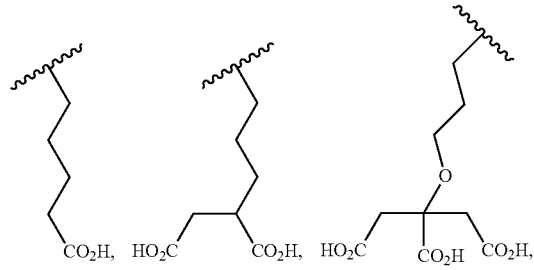

In still other embodiments, each L-$(R^2)_q$ group can independently be:

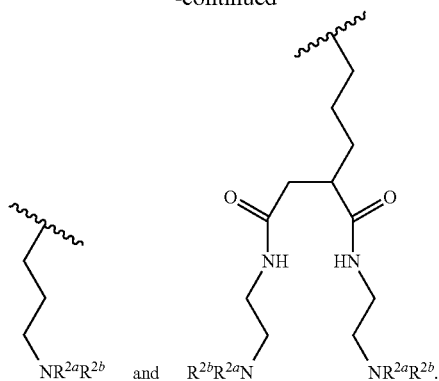

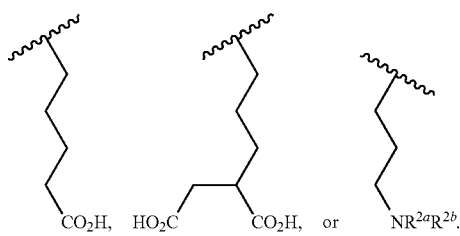

One of radicals $R^1$ and $R^4$ can be the solubilizing ligand. When subscript n is 0, $R^1$ can be the solubilizing ligand. When subscript n is greater than 1, either of $R^1$ and $R^4$ can be the solubilizing ligand. Any suitable solubilizing ligand can be used in the present invention. In some embodiments, at least one of $R^1$ and $R^4$ can be $C_{8-20}$ alkyl or $C_{8-20}$ heteroalkyl, wherein each alkyl group is optionally substituted with one —Si($R^{1a}$)$_3$ group. In other embodiments, at least one of $R^1$ and $R^4$ can be $C_{8-20}$ alkyl or $C_{8-20}$ heteroalkyl. In some other embodiments, at least one of $R^1$ and $R^4$ can be $C_{16}$ alkyl, $C_{18}$ alkyl, $C_{20}$ alkyl, or —(CH$_2$)$_2$—(OCH$_2$CH$_2$)$_3$—OCH$_3$, wherein each alkyl group is optionally substituted with one —Si($R^{1a}$)$_3$ group. In still other embodiments, at least one of $R^1$ and $R^4$ can be $C_{16}$ alkyl, $C_{18}$ alkyl, $C_{20}$ alkyl, or —(CH$_2$)$_2$—(OCH$_2$CH$_2$)$_3$—OCH$_3$.

When the alkyl group of $R^1$ or $R^4$ is substituted with the —Si($R^{1a}$)$_3$ group, the substitution can be at any point on the alkyl group, including the terminal carbon, or any other carbon in the alkyl chain. The alkyl group can be branched or unbranched. The $R^{1a}$ group can be any suitable group that promotes solubilization of the siloxane polymer. For example, each $R^{1a}$ can independently be $C_{1-6}$ alkyl, cycloalkyl or aryl. Each $R^{1a}$ can be the same or different. In some embodiments, each $R^{1a}$ can independently be $C_{1-6}$ alkyl. The alkyl groups of $R^{1a}$ can be branched or unbranched. Representative alkyl groups of $R^{1a}$ include, but are not limited to, methyl, ethyl, propyl, etc. In some embodiments, each $R^{1a}$ can be ethyl.

Radical $R^3$ can be any suitable group. In some embodiments, each $R^3$ can independently be $C_{1-20}$ alkyl, $C_{2-20}$ alkenyl, $C_{2-20}$ alkynyl, cycloalkyl or aryl. In other embodiments, each $R^3$ can independently be $C_{1-20}$ alkyl. In some other embodiments, each $R^3$ can independently be $C_{1-6}$ alkyl. In still other embodiments, each $R^3$ can independently be $C_{1-3}$ alkyl. In yet other embodiments, each $R^3$ can independently be methyl, ethyl or propyl. In still yet other embodiments, each $R^3$ can be methyl.

$R^5$ can be any suitable group. In some embodiments, each $R^5$ can independently be $C_{1-20}$ alkyl, $C_{2-20}$ alkenyl, $C_{2-20}$ alkynyl, $-L-(R^2)_q$, cycloalkyl or aryl. In other embodiments, each $R^5$ can independently be $C_{1-20}$ alkyl. In some other embodiments, each $R^5$ can independently be $C_{1-6}$ alkyl. In still other embodiments, each $R^5$ can independently be $C_{1-3}$ alkyl. In yet other embodiments, each $R^5$ can independently be methyl, ethyl or propyl. In still yet other embodiments, each $R^5$ can be methyl.

Alternatively, $R^5$ can be an amine or carboxy binding group, or a solubilizing group. In some embodiments, at least one $R^5$ can be $-L-(R^2)_q$, as defined above. In other embodiments, at least one $R^5$ can be $C_{8-20}$ alkyl. In some other embodiments, at least one $R^5$ can be $C_{12-20}$ alkyl. In still other embodiments, at least one $R^5$ can be octadecane.

When the quantum dot binding-ligands of the present invention have two types of monomer repeat units, such that subscript n is not 0, the structure can be the structure of formula I, wherein each $R^5$ can independently be $C_{1-20}$ alkyl, $C_{2-20}$ alkenyl, $C_{2-20}$ alkynyl, cycloalkyl or aryl; subscript m can be an integer from 5 to 50; and subscript n can be an integer from 1 to 50. In some embodiments, $R^1$ can independently be $C_{1-3}$ alkyl. In some embodiments, the alkyl groups of $R^4$ can be $C_{8-20}$, $C_{12-20}$, $C_{14-20}$, $C_{16-20}$, or $C_{18-20}$.

Any suitable number of subscripts m and n can be present in the quantum dot binding-ligands of the present invention. For example, the number of subscripts m and n can be from about 1 to about 100, or from about 5 to about 100, or from about 5 to about 50, or from about 10 to about 50, or from about 10 to about 25. Alternatively, the number of subscripts m and n can be about 5, 10, 15, 20, 25, 30, 40, 50, 60, 70, 80, 90 or about 100.

Any suitable ratio of subscripts m and n can be present in the quantum dot binding-ligands of the present invention. For example, the ratio of subscript m to n can be from about 10:1, 5:1, 2.5:1 2:1, 1:1, 1:2, 1:2.5, 1:5 or about 1:10. In some embodiments, the ratio of subscript m to subscript n is about 2:1. In some embodiments, the ratio of subscript m to subscript n is about 1:1. In some embodiments, the ratio of subscript m to subscript n is about 1:2.

In some embodiments, $R^1$ and $R^3$ can each independently be $C_{1-3}$ alkyl; each $R^{1a}$ can independently be $C_{1-6}$ alkyl; each $R^4$ can independently be $C_{8-20}$ alkyl or $C_{8-20}$ heteroalkyl, wherein the alkyl group can optionally be substituted with one $-Si(R^{1a})_3$ group; each $R^5$ can independently be $C_{1-3}$ alkyl; and subscript q can be an integer from 1 to 3.

In some embodiments, subscript n is other than 0. In other embodiments, the quantum dot binding ligand can have the following structure:

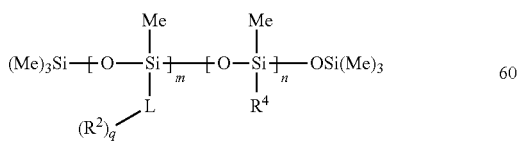

wherein subscripts m and n are each an integer from 10 to 14. In some embodiments, the quantum dot binding ligand can have any of the following structures:

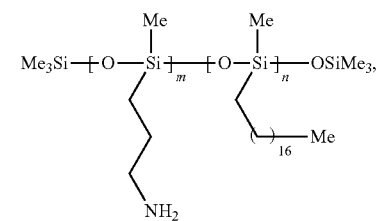

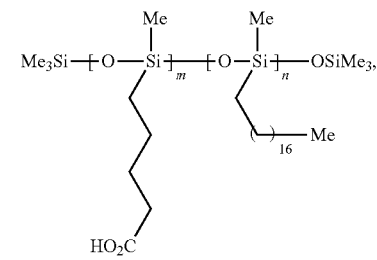

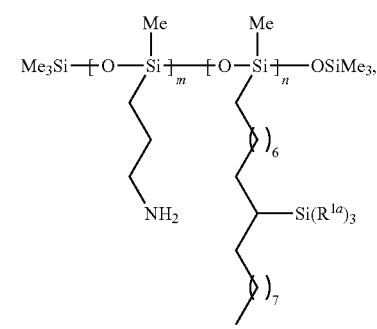

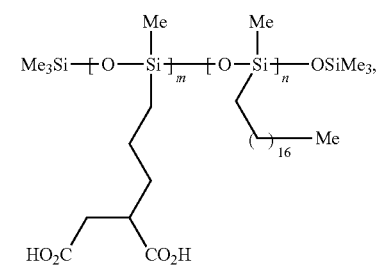

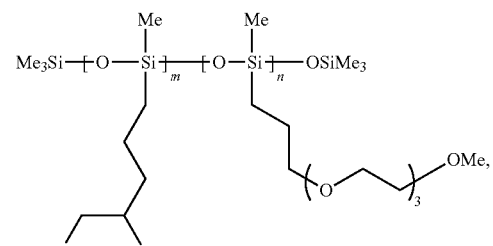

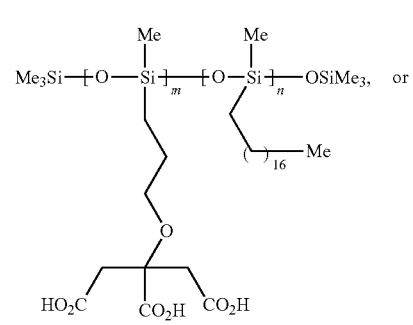

-continued

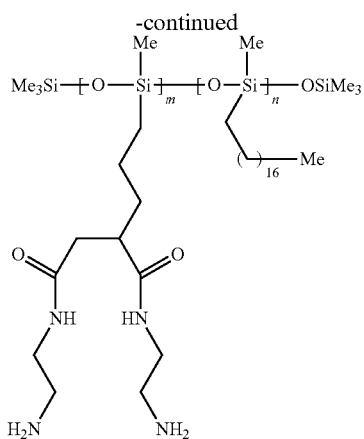

wherein each $R^{1a}$ can independently be $C_{1-6}$ alkyl, and subscripts m and n can each be an integer from 10 to 14.

In some embodiments, the quantum dot binding ligand can have any of the following structures:

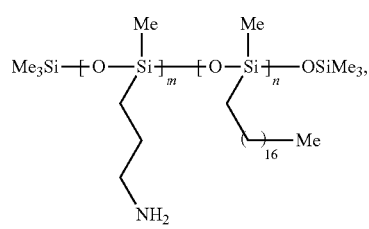

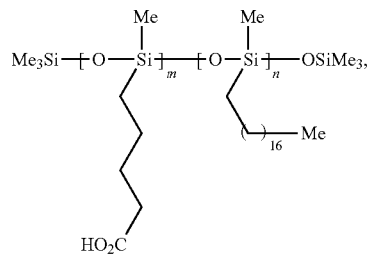

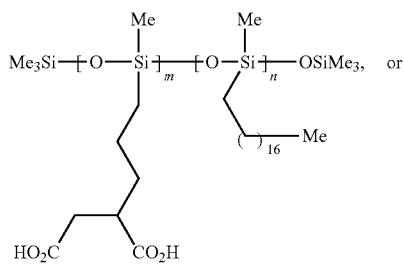

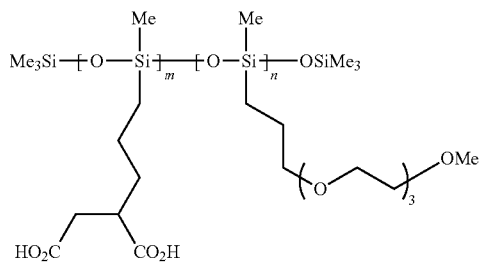

wherein each $R^{1a}$ can independently be $C_{1-6}$ alkyl, and subscripts m and n can each be an integer from 10 to 14.

In some embodiments, subscript n is 0. In other embodiments, each $R^5$ can independently be $C_{1-20}$ alkyl, $C_{2-20}$ alkenyl, $C_{2-20}$ alkynyl, cycloalkyl or aryl; subscript m can be an integer from 5 to 50; and subscript n can be 0. In some other embodiments, each $R^1$ can independently be $C_{8-20}$ alkyl or $C_{8-20}$ heteroalkyl, wherein the alkyl group can optionally be substituted with one —$Si(R^{1a})_3$ group; each $R^{1a}$ can independently be $C_{1-6}$ alkyl; each $R^5$ can independently be $C_{1-3}$ alkyl; and subscript q can be an integer from 1 to 3. In still other embodiments, each $R^1$ can independently be $C_{8-20}$ alkyl or $C_{8-20}$ heteroalkyl; each $R^{1a}$ can independently be $C_{1-6}$ alkyl; each $R^5$ can independently be $C_{1-3}$ alkyl; and subscript q can be an integer from 1 to 3.

In some embodiments, the quantum dot binding ligand has the structure:

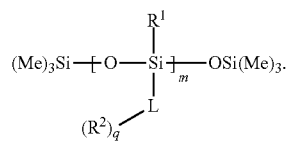

In other embodiments, $R^1$ can be $C_{8-20}$ alkyl. In some other embodiments, the quantum dot binding ligand can have any of the following structures:

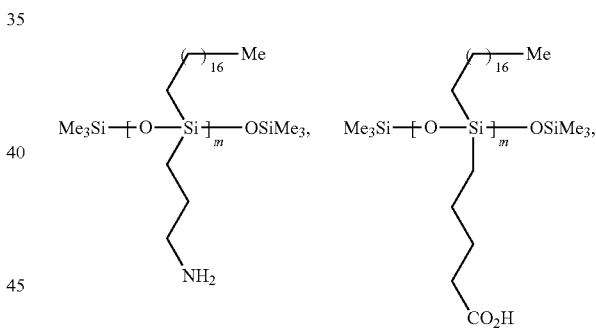

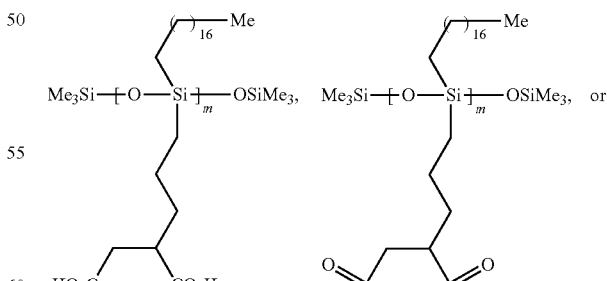

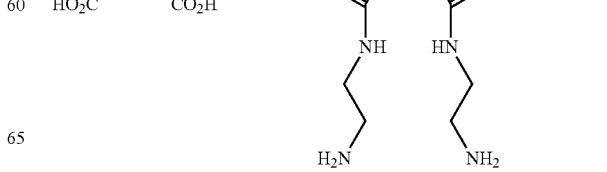

-continued

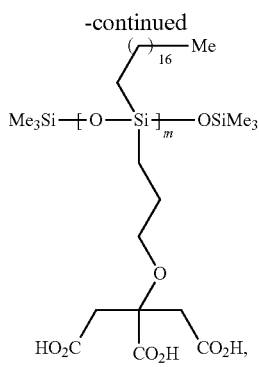

wherein subscript m is an integer from 5 to 50.

In other embodiments, $R^1$ can be $C_{8-20}$ alkyl. In some other embodiments, the quantum dot binding ligand can have any of the following structures:

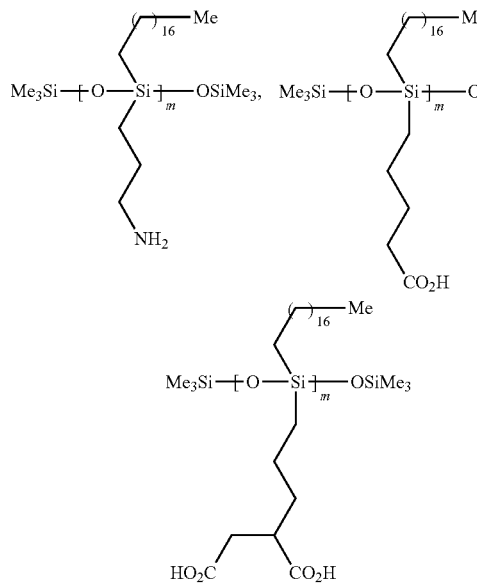

wherein subscript m is an integer from 5 to 50.

In some embodiments, the quantum dot binding ligand has the structure of formula Ia:

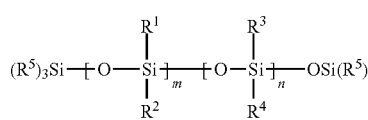 (Ia)

wherein each $R^1$ can independently be $C_{1-20}$ alkyl, $C_{2-20}$ alkenyl, $C_{2-20}$ alkynyl, cycloalkyl or ary, wherein the alkyl group is optionally substituted with one —$Si(R^{1a})_3$ group 1; each $R^2$ can independently be $C_{3-8}$ alkyl-$NR^{2a}R^{2b}$; each of $R^{2a}$ and $R^{2b}$ can independently be H or $C_{1-6}$ alkyl; each $R^3$ can independently be $C_{1-20}$ alkyl, $C_{2-20}$ alkenyl, $C_{2-20}$ alkynyl, cycloalkyl or aryl; each $R^4$ can independently be $C_{8-20}$ alkyl; each $R^5$ can independently be $C_{1-20}$ alkyl, $C_{2-20}$ alkenyl, $C_{2-20}$ alkynyl, $C_{3-8}$ alkyl-$NR^{2a}R^{2b}$, cycloalkyl or aryl; subscript m can be an integer from 5 to 50; and subscript n can be an integer from 0 to 50; wherein when subscript n is 0, then $R^1$ can be $C_{8-20}$ alkyl, $C_{8-20}$ alkenyl, $C_{8-20}$ alkynyl, cycloalkyl or aryl. In some embodiments, the alkyl groups of $R^1$ or $R^4$ can be $C_{8-20}$, $C_{12-20}$, $C_{14-20}$, $C_{16-20}$, or $C_{18-20}$.

Radical $R^5$ can be any suitable group. In some embodiments, each $R^5$ can independently be $C_{1-20}$ alkyl, $C_{2-20}$ alkenyl, $C_{2-20}$ alkynyl, $C_{3-8}$ alkyl-$NR^{2a}R^{2b}$, cycloalkyl or aryl. In some embodiments, each $R^5$ can independently be $C_{1-20}$ alkyl, $C_{2-20}$ alkenyl, $C_{2-20}$ alkynyl, cycloalkyl or aryl. In some embodiments, each $R^5$ can be $C_{1-20}$ alkyl. In some embodiments, each $R^5$ can be $C_{8-20}$ alkyl. In some embodiments, each $R^5$ can be octadecane. In some embodiments, each $R^5$ can be $C_{1-3}$ alkyl. In some embodiments, each $R^5$ can independently be methyl, ethyl or propyl. In some embodiments, each $R^5$ can be aryl. In some embodiments, each $R^5$ can be phenyl. In some embodiments, $R^5$ can be $C_{3-8}$ alkyl-$NR^{2a}R^{2b}$. In some embodiments, $R^5$ can be $C_3$ alkyl-$NR^{2a}R^{2b}$. In some embodiments, each $R^5$ can independently be octadecane or $C_3$ alkyl-$NR^{2a}R^{2b}$.

In some embodiments, the quantum dot binding-ligand can have the following structure:

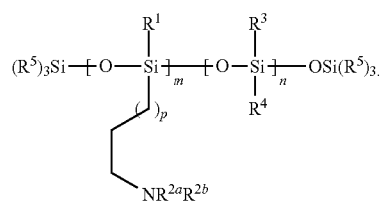

In some embodiments, the quantum dot binding-ligand of the present invention has the following structure:

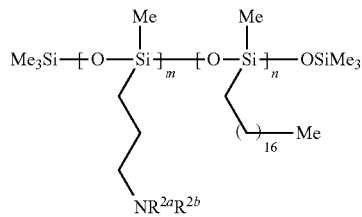

wherein subscripts m and n are each an integer from 10 to 14.

When the quantum dot binding-ligands of the present invention have a single type of monomer repeat unit, such that subscript n is 0, the structure can be the structure of formula I, wherein each $R^1$ can independently be $C_{8-20}$ alkyl, $C_{8-20}$ alkenyl, $C_{8-20}$ alkynyl, cycloalkyl or aryl. In some embodiments, each $R^1$ can independently be $C_{8-20}$ alkyl; subscript m can be an integer from 5 to 50; and subscript n can be 0. In some embodiments, the quantum dot binding-ligand of formula I can have the following structure:

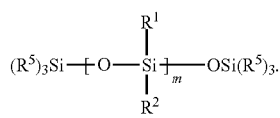

In some embodiments, the quantum dot binding-ligand of formula I can have the following structure:

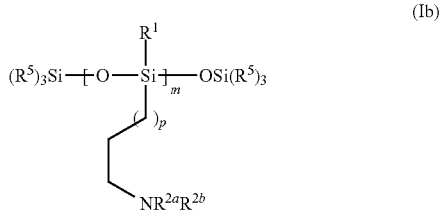

(Ib)

wherein $R^1$ can be $C_{8-20}$ alkyl; and subscript p can be an integer from 1 to 6. In some embodiments, subscript p can be 1, 2, 3, 4, 5, or 6. In some embodiments, subscript p can be 1.

In some embodiments, the quantum dot binding-ligand of formula I can have the following structure:

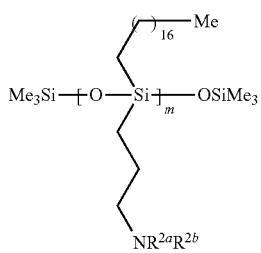

wherein subscript m can an integer from 6 to 8.

In some embodiments, each $R^5$ can independently be $C_{8-20}$ alkyl, $C_{8-20}$ alkenyl, $C_{8-20}$ alkynyl, $C_{3-8}$ alkyl-$NR^{2a}R^{2b}$, cycloalkyl or aryl. In some embodiments, each $R^5$ can independently be $C_{8-20}$ alkyl or $C_{3-8}$ alkyl-$NR^{2a}R^{2b}$. In some embodiments, the quantum dot binding-ligand can have the structure:

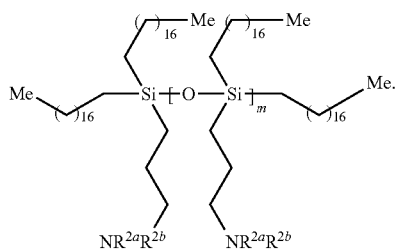

IV. Methods of Making Quantum Dot Binding-Ligands

Figure 2:
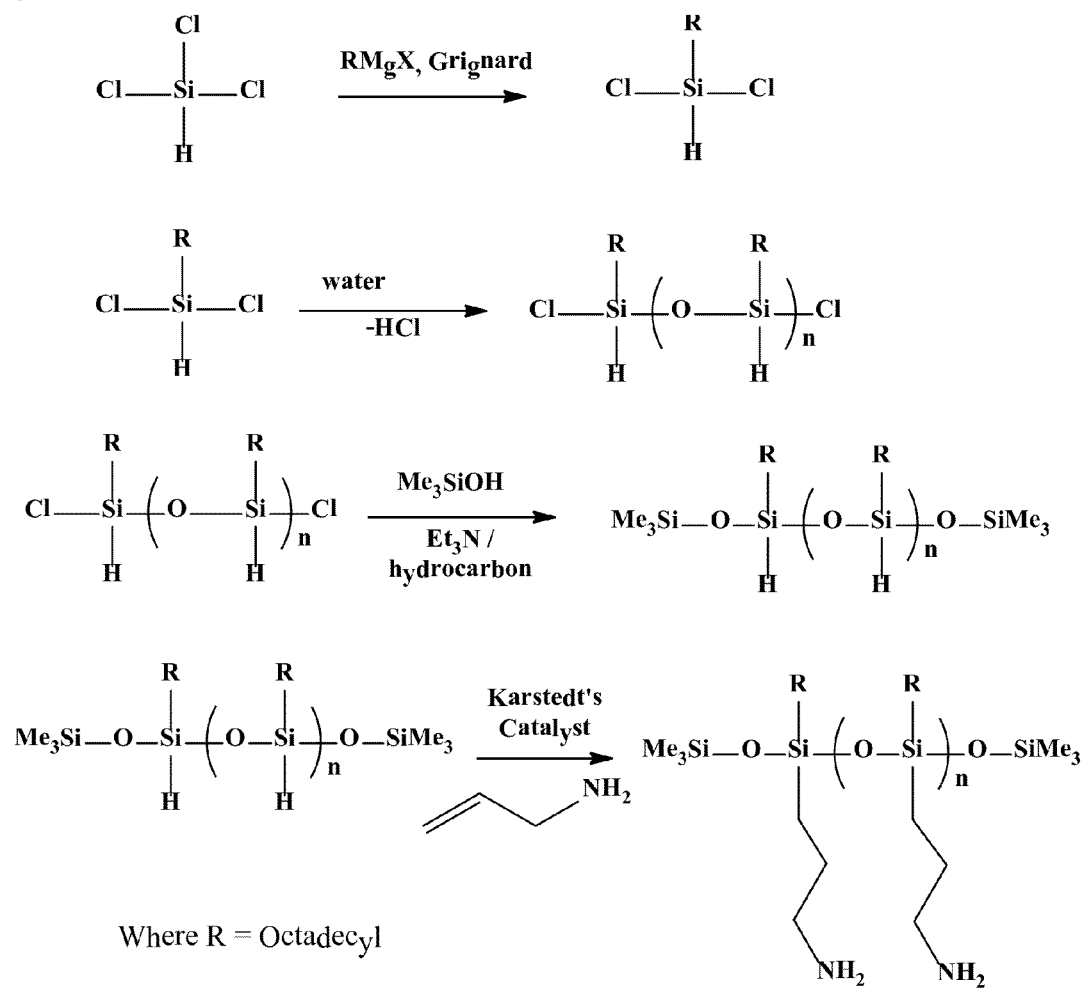
FIG. 2 shows the synthesis of another type of quantum dot binding-ligand of the present invention by condensation of a long-chain alkyl functionalized dichlorosilane (RSi(Cl)$_2$H) with water, followed by end-capping the terminal chloro groups of the siloxane polymer, and then hydrosilylation of the silane groups with a suitable alkeneamine
Figure 3:
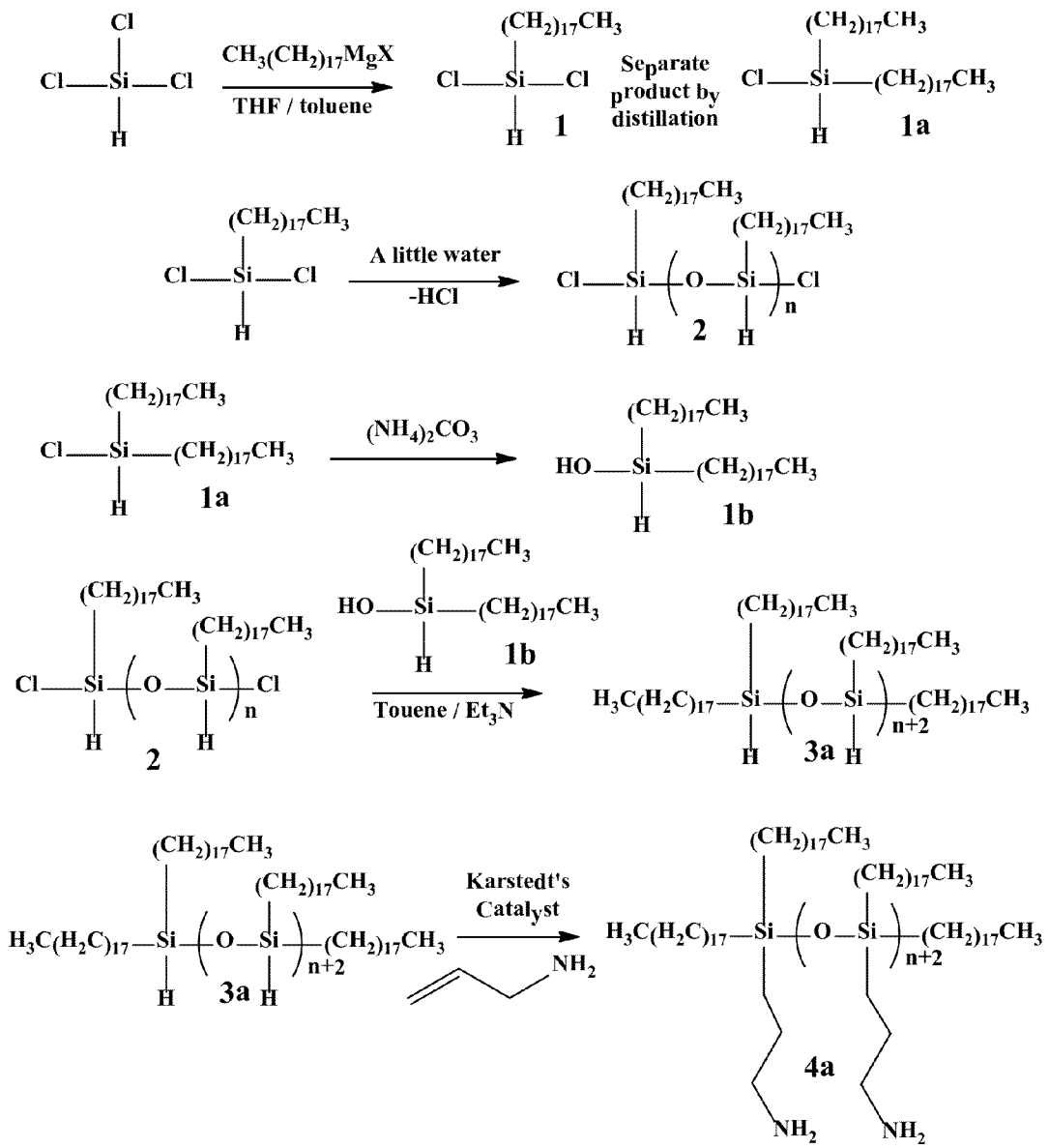
FIG. 3 shows the synthesis of another type of quantum dot binding-ligand of the present invention prepared by separating any bis-substituted chlorosilane (1a) prepared in the first step, followed by conversion to a silanol (1b), and then reaction with the siloxane polymer (2) to form the end-capped siloxane polymer (3a). The remaining silane groups are reacted with a suitable alkene and Karstedt's catalyst to prepare the final product (4a), having two additional alkyl-amine groups and four additional long-chain alkyl groups compared to the product of the scheme in FIG. 2.

The quantum dot binding-ligands of the present invention can be prepared by any suitable means known to one of skill in the art. For example, a commercially available siloxane polymer can be hydrosilylated with an alkene and an alkeneamino in sequential steps (as shown in FIG. 1) to form the quantum dot binding-ligand of formula I where subscript n is not 0. Alternatively, a siloxane polymer can be prepared by condensation of a long-chain alkyl functionalized dichlorosilane $(RSi(Cl)_2H)$ with water, followed by end-capping the terminal chloro groups of the polymer, and then hydrosilylation of the silane groups with a suitable alkeneamine (FIG. 2). FIG. 3 shows yet another method for preparing the quantum dot binding-ligands of the present invention. Following the method described in FIG. 2, any bis-substituted chlorosilane (1a) prepared in the first step is separated, converted to a silanol (1b), and then reacted with the siloxane polymer (2) to form the end-capped siloxane polymer (3a). The remaining silane groups are reacted with a suitable alkene and Karstedt's catalyst to prepare the final product (4a), having two additional alkyl-amine groups and four additional long-chain alkyl groups compared to the product of the scheme in FIG. 2. Other methods of making the quantum dot binding-ligands of the present invention are described in the remaining figures.

In some embodiments, the present invention provides a method of making a quantum dot binding-ligand of formula Ib:

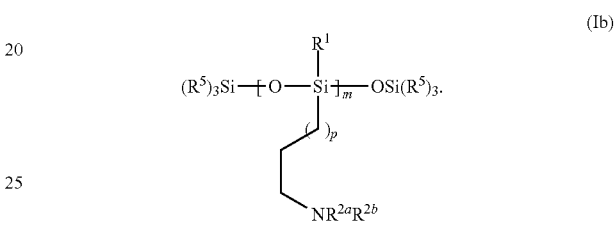

(Ib)

The method of making the quantum dot binding-ligand of formula I includes forming a reaction mixture having water and a compound of formula II:

(II)

to afford a compound of formula III:

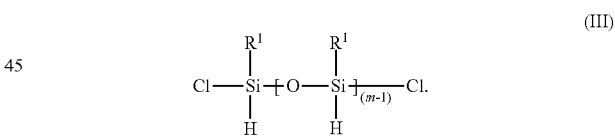

(III)

The method also includes forming a reaction mixture of $(R^5)_3SiOM$ and the compound of formula III, to afford a compound of formula IV:

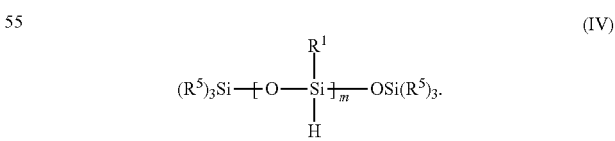

(IV)

The method also includes forming a reaction mixture of the compound of formula IV, a catalyst, and $CH_2=CH(CH_2)_p NR^{2a}R^{2b}$, thereby forming the compound of formula I. For formulas Ib, II, III and IV, each $R^1$ can independently be $C_{8-20}$ alkyl, $C_{8-20}$ alkenyl, $C_{8-20}$ alkynyl, cycloalkyl or aryl; each of $R^{2a}$ and $R^{2b}$ can independently be H or $C_{1-6}$ alkyl; each $R^5$ can independently be $C_{1-20}$ alkyl, $C_{2-20}$ alkenyl, $C_{2-20}$ alkynyl, $C_{3-8}$ alkyl-$NR^{2a}R^{2b}$, cycloalkyl or aryl; subscript m can be an integer from 5 to 50; M can be hydrogen or a cation; and subscript p can be an integer of from 1 to 6.

In some embodiments, the alkyl group of $R^1$ can be $C_{12-20}$, $C_{14-20}$, $C_{16-20}$, or $C_{18-20}$. In some embodiments, the alkyl group of $R^1$ can be $C_{18}$, octadecane.

Any suitable amount of water is useful in the methods of the present invention. For example, water can be present in an amount from about 0.01 to about 1.0 molar equivalents, or from about 0.1 to less than 1.0 equivalents, or from about 0.25 to about 0.75 equivalents, or from about 0.5 to about 0.75 equivalents. Water can also be present in an amount of about 0.1, 0.2, 0.3, 0.4, 0.5, 0.6, 0.7, 0.8, 0.9 or about 1.0 molar equivalents. In some embodiments, the water can be present in step (a) in an amount of less than about 1.0 eq. to the compound of formula II. In some embodiments, the water can be present in step (a) in an amount of from about 0.1 to about 0.75 eq. to the compound of formula II. In some embodiments, the water can be present in step (a) in an amount of from about 0.5 to about 0.75 eq. to the compound of formula II.

Any suitable nucleophile can be used to end-cap the terminal chloro groups of formula III. In some embodiments, the nucleophile can be $(R^5)_3SiOM$, where each $R^5$ is as described above and M can be hydrogen or a cation. Any suitable cation is useful for the nucleophile, including metal and non-metal cations. In some embodiments, M can be a metal cation such as $Na^+$ or $K^+$.

The catalyst of step (b) can be any catalyst suitable for performing a hydrosilylation reaction. For example, the catalyst can be a transition metal catalyst such as Karstedt's catalyst, a platinum based catalyst. In some embodiments, the catalyst can be Karstedt's catalyst.

V. Compositions

The quantum dot binding-ligands of the present invention can be complexed to a quantum dot (QD). In some embodiments, the present invention provides a composition of a quantum dot binding-ligand of the present invention, and a first population of light emitting quantum dots (QDs).

In some embodiments, the quantum dot binding-ligand can have the structure of formula I, as described above. In some embodiments, the quantum dot binding-ligand can have the structure:

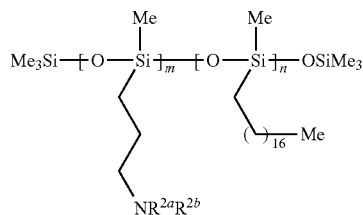

wherein subscripts m and n are each an integer from 10 to 14. In some embodiments, the quantum dot binding-ligand can have the structure of formula Ib, as described above. In some embodiments, the quantum dot binding-ligand can have the structure:

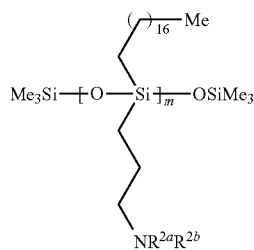

wherein subscript m is an integer from 6 to 8.

Quantum Dots

Typically, the region of characteristic dimension will be along the smallest axis of the structure. The QDs can be substantially homogenous in material properties, or in certain embodiments, can be heterogeneous. The optical properties of QDs can be determined by their particle size, chemical or surface composition; and/or by suitable optical testing available in the art. The ability to tailor the nanocrystal size in the range between about 1 nm and about 15 nm enables photoemission coverage in the entire optical spectrum to offer great versatility in color rendering. Particle encapsulation offers robustness against chemical and UV deteriorating agents.

Additional exemplary nanostructures include, but are not limited to, nanowires, nanorods, nanotubes, branched nanostructures, nanotetrapods, tripods, bipods, nanoparticles, and similar structures having at least one region or characteristic dimension (optionally each of the three dimensions) with a dimension of less than about 500 nm, e.g., less than about 200 nm, less than about 100 nm, less than about 50 nm, or even less than about 20 nm or less than about 10 nm. Typically, the region or characteristic dimension will be along the smallest axis of the structure. Nanostructures can be, e.g., substantially crystalline, substantially monocrystalline, polycrystalline, amorphous, or a combination thereof.

QDs (or other nanostructures) for use in the present invention can be produced using any method known to those skilled in the art. For example, suitable QDs and methods for forming suitable QDs include those disclosed in: U.S. Pat. No. 6,225,198, U.S. Pat. No. 6,207,229, U.S. Pat. No. 6,322,901, U.S. Pat. No. 6,872,249, U.S. Pat. No. 6,949,206, U.S. Pat. No. 7,572,393, U.S. Pat. No. 7,267,865, U.S. Pat. No. 7,374,807, US Patent Publication No. 2008/0118755, filed Dec. 9, 2005, and U.S. Pat. No. 6,861,155, each of which is incorporated by reference herein in its entirety.

The QDs (or other nanostructures) for use in the present invention can be produced from any suitable material, suitably an inorganic material, and more suitably an inorganic conductive or semiconductive material. Suitable semiconductor materials include any type of semiconductor, including group II-VI, group III-V, group IV-VI and group IV semiconductors. Suitable semiconductor materials include, but are not limited to, Si, Ge, Sn, Se, Te, B, C (including diamond), P, BN, BP, BAs, AlN, AlP, AlAs, AlSb, GaN, GaP, GaAs, GaSb, InN, InP, InAs, InSb, AlN, AlP, AlAs, AlSb, GaN, GaP, GaAs, GaSb, ZnO, ZnS, ZnSe, ZnTe, CdS, CdSe, CdSeZn, CdTe, HgS, HgSe, HgTe, BeS, BeSe, BeTe, MgS, MgSe, GeS, GeSe, GeTe, SnS, SnSe, SnTe, PbO, PbS, PbSe, PbTe, CuF, CuCl, CuBr, CuI, $Si_3N_4$, $Ge_3N_4$, $Al_2O_3$, $(Al, Ga, In)_2 (S, Se, Te)_3$, $Al_2CO_3$, and appropriate combinations of two or more such semiconductors.

In some embodiments, the semiconductor nanocrystals or other nanostructures can also include a dopant, such as a p-type dopant or an n-type dopant. The nanocrystals (or other nanostructures) useful in the present invention can also include II-VI or III-V semiconductors. Examples of II-VI or III-V semiconductor nanocrystals and nanostructures include any combination of an element from Group II, such as Zn, Cd and Hg, with any element from Group VI, such as S, Se, Te, Po, of the Periodic Table; and any combination of an element from Group III, such as B, Al, Ga, In, and Tl, with any element from Group V, such as N, P, As, Sb and Bi, of the Periodic Table. Other suitable inorganic nanostructures include metal nanostructures. Suitable metals include, but are not limited to, Ru, Pd, Pt, Ni, W, Ta, Co, Mo, Ir, Re, Rh, Hf, Nb, Au, Ag, Ti, Sn, Zn, Fe, FePt, and the like.

While any method known to the ordinarily skilled artisan can be used to create nanocrystal phosphors, suitably, a solution-phase colloidal method for controlled growth of inorganic nanomaterial phosphors is used. See Alivisatos, A. P., "Semiconductor clusters, nanocrystals, and quantum dots," Science 271:933 (1996); X. Peng, M. Schlamp, A. Kadavanich, A. P. Alivisatos, "Epitaxial growth of highly luminescent CdSe/CdS Core/Shell nanocrystals with photostability and electronic accessibility," J. Am. Chem. Soc. 30:7019-7029 (1997); and C. B. Murray, D. J. Norris, M. G. Bawendi, "Synthesis and characterization of nearly monodisperse CdE (E=sulfur, selenium, tellurium) semiconductor nanocrystallites," J. Am. Chem. Soc. 115:8706 (1993), the disclosures of which are incorporated by reference herein in their entireties. This manufacturing process technology leverages low cost processability without the need for clean rooms and expensive manufacturing equipment. In these methods, metal precursors that undergo pyrolysis at high temperature are rapidly injected into a hot solution of organic surfactant molecules. These precursors break apart at elevated temperatures and react to nucleate nanocrystals. After this initial nucleation phase, a growth phase begins by the addition of monomers to the growing crystal. The result is freestanding crystalline nanoparticles in solution that have an organic surfactant molecule coating their surface.

Utilizing this approach, synthesis occurs as an initial nucleation event that takes place over seconds, followed by crystal growth at elevated temperature for several minutes. Parameters such as the temperature, types of surfactants present, precursor materials, and ratios of surfactants to monomers can be modified so as to change the nature and progress of the reaction. The temperature controls the structural phase of the nucleation event, rate of decomposition of precursors, and rate of growth. The organic surfactant molecules mediate both solubility and control of the nanocrystal shape. The ratio of surfactants to monomer, surfactants to each other, monomers to each other, and the individual concentrations of monomers strongly influence the kinetics of growth.

In semiconductor nanocrystals, photo-induced emission arises from the band edge states of the nanocrystal. The band-edge emission from luminescent nanocrystals competes with radiative and non-radiative decay channels originating from surface electronic states. X. Peng, et al., J. Am. Chem. Soc. 30:7019-7029 (1997). As a result, the presence of surface defects such as dangling bonds provide non-radiative recombination centers and contribute to lowered emission efficiency. An efficient and permanent method to passivate and remove the surface trap states is to epitaxially grow an inorganic shell material on the surface of the nanocrystal. X. Peng, et al., J. Am. Chem. Soc. 30:7019-7029 (1997). The shell material can be chosen such that the electronic levels are type I with respect to the core material (e.g., with a larger bandgap to provide a potential step localizing the electron and hole to the core). As a result, the probability of non-radiative recombination can be reduced.

Core-shell structures are obtained by adding organometallic precursors containing the shell materials to a reaction mixture containing the core nanocrystal. In this case, rather than a nucleation-event followed by growth, the cores act as the nuclei, and the shells grow from their surface. The temperature of the reaction is kept low to favor the addition of shell material monomers to the core surface, while preventing independent nucleation of nanocrystals of the shell materials. Surfactants in the reaction mixture are present to direct the controlled growth of shell material and ensure solubility. A uniform and epitaxially grown shell is obtained when there is a low lattice mismatch between the two materials.

Exemplary materials for preparing core-shell luminescent nanocrystals include, but are not limited to, Si, Ge, Sn, Se, Te, B, C (including diamond), P, Co, Au, BN, BP, BAs, AlN, AlP, AlAs, AlSb, GaN, GaP, GaAs, GaSb, InN, InP, InAs, InSb, AlN, AlP, AlAs, AlSb, GaN, GaP, GaAs, GaSb, ZnO, ZnS, ZnSe, ZnTe, CdS, CdSe, CdSeZn, CdTe, HgS, HgSe, HgTe, BeS, BeSe, BeTe, MgS, MgSe, GeS, GeSe, GeTe, SnS, SnSe, SnTe, PbO, PbS, PbSe, PbTe, CuF, CuCl, CuBr, CuI, $Si_3N_4$, $Ge_3N_4$, $Al_2O_3$, $(Al, Ga, In)_2 (S, Se, Te)_3$, $Al_2CO_3$, and appropriate combinations of two or more such materials. Exemplary core-shell luminescent nanocrystals for use in the practice of the present invention include, but are not limited to, (represented as Core/Shell), CdSe/ZnS, InP/ZnS, PbSe/PbS, CdSe/CdS, CdTe/CdS, CdTe/ZnS, as well as others.

In some embodiments, CdSe is used as the nanocrystal material, due to the relative maturity of the synthesis of this material. Due to the use of a generic surface chemistry, it is also possible to substitute non-cadmium-containing nanocrystals. Exemplary luminescent nanocrystal materials include CdSe or ZnS, including core/shell luminescent nanocrystals comprising CdSe/CdS/ZnS, CdSe/ZnS, CdSeZn/CdS/ZnS, CdSeZn/ZnS, InP/ZnS, PbSe/PbS, CdSe/CdS, CdTe/CdS or CdTe/ZnS. Most preferably, the quantum dots of the present invention can include core-shell QDs having a core including CdSe and at least one encapsulating shell layer including CdS or ZnS. In other embodiments, InP is used as the nanocrystal material.

In some embodiments, the light emitting quantum dots can be CdSe or CdTe and quantum-dot binding ligand can include an amine binding group. In other embodiments, the light emitting quantum dots can be CdSe or CdTe and $R^2$ can be $NR^{2a}R^{2b}$. In some other embodiments, the light emitting quantum dots can be InP and quantum-dot binding ligand can include a carboxy binding group. In still other embodiments, the light emitting quantum dots can be InP and $R^2$ can be C(O)OH.

The luminescent nanocrystals can be made from a material impervious to oxygen, thereby simplifying oxygen barrier requirements and photostabilization of the QDs in the QD phosphor material. In some embodiments, the luminescent nanocrystals can be coated with one or more quantum dot binding-ligand of the present invention and dispersed in an organic polymeric matrix having one or more matrix materials, as discussed in more detail below. The luminescent nanocrystals can be further coated with one or more inorganic layers having one or more material such as a silicon oxide, an aluminum oxide, or a titanium oxide (e.g., $SiO_2$, $Si_2O_3$, $TiO_2$, or $Al_2O_3$), to hermetically seal the QDs.

Matrix Materials

Generally, the polymeric ligand is bound to a surface of the nanostructure. Not all of the ligand material in the composition need be bound to the nanostructure, however. The polymeric ligand can be provided in excess, such that some molecules of the ligand are bound to a surface of the nanostructure and other molecules of the ligand are not bound to the surface of the nanostructure.

The phosphor material of the present invention further comprises a matrix material in which the QDs are embedded or otherwise disposed. The matrix material can be any suitable host matrix material capable of housing the QDs. Suitable matrix materials will be chemically and optically compatible with back-lighting unit (BLU) components, including the QDs and any surrounding packaging materials or layers. Suitable matrix materials include non-yellowing optical materials which are transparent to both the primary and secondary light, thereby allowing for both primary and secondary light to transmit through the matrix material. In preferred embodiments, the matrix material completely surrounds the QDs and provides a protective barrier which prevents deterioration of the QDs caused by environmental conditions such as oxygen, moisture, and temperature. The matrix material can be flexible in applications where a flexible or moldable QD film is desired. Alternatively, the matrix material can include a high-strength, non-flexible material.

Preferred matrix materials will have low oxygen and moisture permeability, exhibit high photo- and chemical-stability, exhibit favorable refractive indices, and adhere to the barrier or other layers adjacent the QD phosphor material, thus providing an air-tight seal to protect the QDs. Preferred matrix materials will be curable with UV or thermal curing methods to facilitate roll-to-roll processing. Thermal curing is most preferred.

Suitable matrix materials for use in QD phosphor material of the present invention include polymers and organic and inorganic oxides. Suitable polymers for use in the matrixes of the present invention include any polymer known to the ordinarily skilled artisan that can be used for such a purpose. In suitable embodiments, the polymer will be substantially translucent or substantially transparent. Suitable matrix materials include, but are not limited to, epoxies, acrylates, norbornene, polyethylene, poly(vinyl butyral):poly(vinyl acetate), polyurea, polyurethanes; silicones and silicone derivatives including, but not limited to, amino silicone (AMS), polyphenylmethylsiloxane, polyphenylalkylsiloxane, polydiphenylsiloxane, polydialkylsiloxane, silsesquioxanes, fluorinated silicones, and vinyl and hydride substituted silicones; acrylic polymers and copolymers formed from monomers including, but not limited to, methylmethacrylate, butylmethacrylate, and laurylmethacrylate; styrene-based polymers such as polystyrene, amino polystyrene (APS), and poly(acrylonitrile ethylene styrene) (AES); polymers that are crosslinked with bifunctional monomers, such as divinylbenzene; cross-linkers suitable for cross-linking ligand materials, epoxides which combine with ligand amines (e.g., APS or PEI ligand amines) to form epoxy, and the like.

The QDs used the present invention can be embedded in a polymeric matrix (or other matrix material) using any suitable method, for example, mixing the nanocrystals in a polymer and casting a film, mixing the nanocrystals with monomers and polymerizing them together, mixing the nanocrystals in a sol-gel to form an oxide, or any other method known to those skilled in the art. As used herein, the term "embedded" is used to indicate that the luminescent nanocrystals are enclosed or encased within the polymer that makes up the majority component of the matrix. It should be noted that luminescent nanocrystals are suitably uniformly distributed throughout the matrix, though in further embodiments they can be distributed according to an application-specific uniformity distribution function.

The composition optionally includes a plurality or population of the nanostructures, e.g., with bound ligand. The composition optionally includes a solvent, in which the nanostructure(s) and ligand can be dispersed. As noted, the nanostructures and ligand can be incorporated into a matrix to form a polymer layer or nanocomposite (e.g., a silicone matrix formed from the ligand). Thus, the composition can also include a crosslinker and/or an initiator. Suitable crosslinkers include organic or polymeric compounds with two or more functional groups (e.g., two, three, or four) that can react with amine groups (or other groups on the ligand) to form covalent bonds. Such functional groups include, but are not limited to, isocyanate, epoxide (also called epoxy), succinic anhydride or other anhydride or acid anhydride, and methyl ester groups, e.g., on a silicone, hydrocarbon, or other molecule. In one class of embodiments, the crosslinker is an epoxy crosslinker, e.g., an epoxycyclohexyl or epoxypropyl crosslinker (e.g., compounds A-C or D-G in Table 1, respectively). The reactive groups on the crosslinker can be pendant and/or terminal (e.g., compounds B and D or compounds A, C, and E-G in Table 1, respectively). The crosslinker is optionally an epoxy silicone crosslinker, which can be, e.g., linear or branched. In certain embodiments, the crosslinker is a linear epoxycyclohexyl silicone or a linear epoxypropyl (glycidyl) silicone. A number of exemplary crosslinkers are listed in Table 1. Suitable crosslinkers are commercially available. For example, compounds H-K are available from Aldrich and compounds A-G are available from Gelest, Inc., e.g., with a formula weight of about 900-1100 for compound A as product no. DMS-EC13, with a formula weight of about 18,000 and a molar percentage of 3-4% for m for compound B as product no. ECMS-327, with a formula weight of about 8000, m≈6, and n≈100 for compound D as product no. EMS-622, and as product no. DMS-E09 for compound E.

TABLE 1

Exemplary crosslinkers.

A 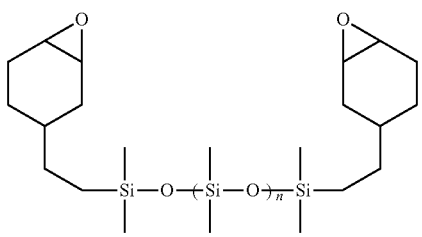

where n is a positive integer

TABLE 1-continued
Exemplary crosslinkers.
B
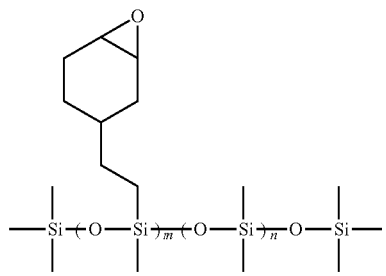
where m and n are positive integers
C
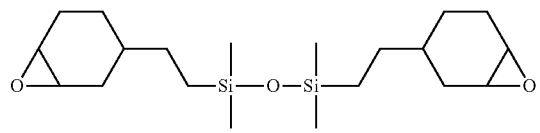 [SMILES: C[Si](C)(CCC1CCC2OC2C1)O[Si](C)(C)CCC1CCC2OC2C1]
D
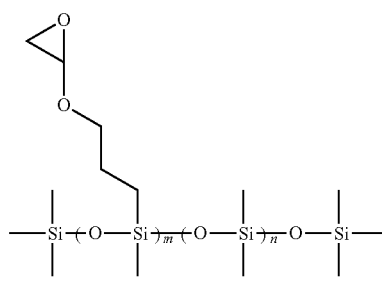
where m and n are positive integers (e.g., m ≈ 6 and n ≈ 100)
E
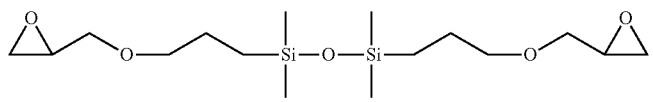 [SMILES: C[Si](C)(CCCOCC1CO1)O[Si](C)(C)CCCOCC1CO1]
F
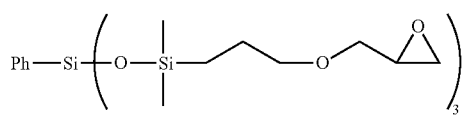
where Ph represents a phenyl group
G
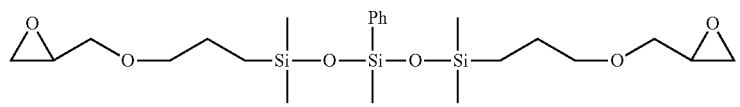
where Ph represents a phenyl group
H
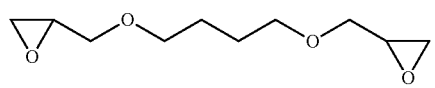 [SMILES: C(CCOCC1CO1)COCC1CO1]
1,4-butanediol diglycidyl ether
I
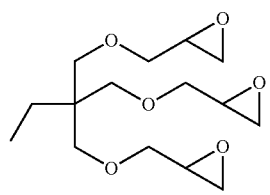 [SMILES: CCC(COCC1CO1)(COCC1CO1)COCC1CO1]
trimethylolpropane triglycidyl ether TABLE 1-continued Exemplary crosslinkers.

J
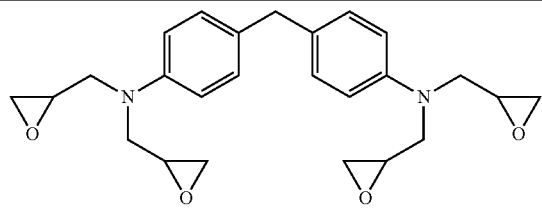
4,4'-methylenebis(N,N-diglycidylaniline)

K
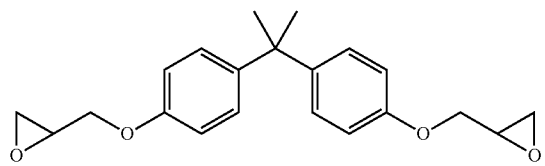 [SMILES: CC(C)(c1ccc(OCC2CO2)cc1)c1ccc(OCC2CO2)cc1]
bisphenol A diglycidyl ether

L
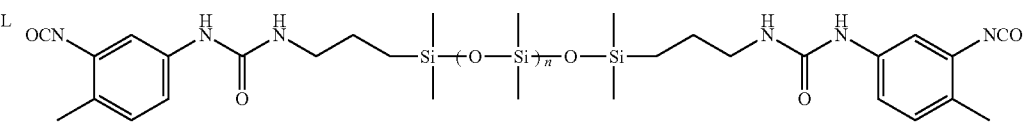

M
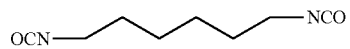
1,6-diisocyanate

N
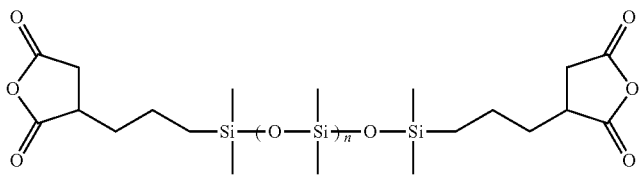
where n is a positive integer

O
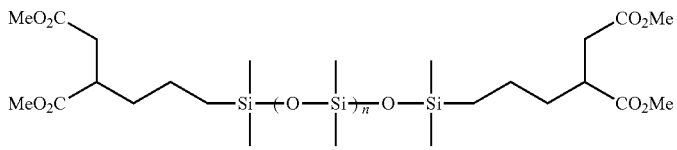
where n is a positive integer and
where Me represents a methyl group The quantum dot compositions and films prepared using the quantum dot binding-ligands of the present invention are useful in a variety of light emitting devices, quantum dot lighting devices and quantum dot-based backlighting units. Representative devices are well known to those of skill in the art and can be found, for example, in US Publication Nos. 2010/0167011 and 2012/0113672, and U.S. Pat. Nos. 7,750,235 and 8,053,972.

The quantum dot compositions of the present invention can be used to form a lighting device such as a backlighting unit (BLU). A typical BLU can include a QD film sandwiched between two barrier layers. QD films of the present invention can include a single quantum dot and a single quantum-dot binding-ligand, or a plurality of quantum dots and a plurality of quantum-dot binding-ligands. For example, a QD film of the present invention can include a cadmium quantum dot, such as CdS, CdTe, CdSe, CdSe/CdS, CdTe/CdS, CdTe/ZnS, CdSe/CdS/ZnS, CdSe/ZnS, CdSeZn/CdS/ZnS, or CdSeZn/ZnS, and a quantum-dot binding ligand having amine binding groups. The QD films of the present invention can include an InP quantum dot, such as InP or InP/ZnS, and a quantum-dot binding ligand having carboxy binding groups.

In some embodiments, the QD films of the present invention include both cadmium and indium containing quantum dots. When both cadmium and indium containing quantum dots are present, the QD film can include a first film containing the cadmium quantum dots and a second film containing the indium quantum dots. These films can then be stacked one on top of another to form a layered film. In some embodiments, a barrier film or other type of film can be stacked in between each of the cadmium and indium films. In other embodiments, the cadmium and indium quantum dots are mixed together in a single QD film with their respective quantum-dot binding-ligands.

Mixed QD films, with either a single layer or multi-layer film, have the advantage of reducing the amount of cadmium in the system. For example, the cadmium can be reduced below 300 ppm, 200, 100, 75, 50 or 25 ppm. In some embodiments, the QD film contains less than about 100 ppm cadmium. In other embodiments, the QD film contains less than about 50 ppm.

VI. Examples

General Methods

All manipulations were performed under a dry, oxygen-free, nitrogen atmosphere using standard Schlenk technique. Allylamine, 1-octadecene, polysilane (1) and Karstedt's Catalyst were handled inside the glove box. Dry toluene, allylamine (98%) and 1-octadecene (>95% by GC) were obtained from Sigma-Aldrich. Allylamine was distilled from $CaCl_2$ and stored under nitrogen before use while 1-octadecene was used without further purification. Karstedt's catalyst, 2.1 to 2.4 wt % in xylenes was obtained from Gelest and used without further purification. A 100× dilution of Karstedt's catalyst was produced by dissolving 0.10 mL of stock solution into 10 mL of toluene. (The stock solution contains 0.113 moles of platinum per mL and the 100× dilution contains 0.00113 mmoles platinum per mL solution.) The polysilane (1) or "polyMethylHydrosiloxanes, Trimethylsilyl terminated" with Mw of 1400-1800 and viscosity 15-29 Cs (PN: HMS-991) was also obtained from Gelest. The silane was purified by vacuum overnight to P<50 mtorr and then handled inside the glove box. NMR chemical shift data were recorded with a Bruker FT NMR at 400 MHz for proton or 100 MHz for $^{13}C$ {$^1H$} and are listed in ppm. IR analysis was obtained on a Nicolet 7200 FTIR equipped with an attenuated total reflectance (ATR) sampling accessory.

Water will react in the second step of the synthesis with primary amine (amine is 4× equivalents to silane in this step) to produce hydroxide ions and quaternary amine. Then at reaction temperature, hydroxide ions will catalyze re-distribution of the silicone backbone and cause the Mn (number average molecular weight) of the polymer to increase substantially. A little water will cause the Mn to increase slightly while a lot of water will cause the reaction solution to gel. Even a little Mn increase could reduce the ability of the ligand to bind nanocrystals and less efficient nanocrystal binding will reduce the stability nanocrystal/ligand complex.

Example 1

Preparation of Polymeric Silicone Amine Wax (PSAW-1:1)

This example provides a method for making polymeric silicone amine wax (PSAW) with a 1:1 ratio of alkyl amine (aminopropyl) to long-chain alkyl (octadecyl).

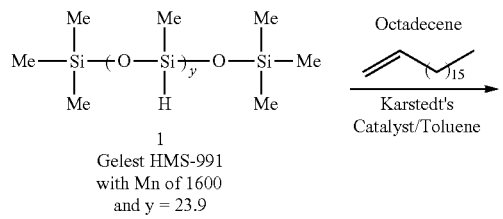

1
Gelest HMS-991
with Mn of 1600
and y = 23.9

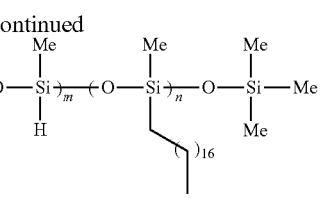

2
m = n = ~12

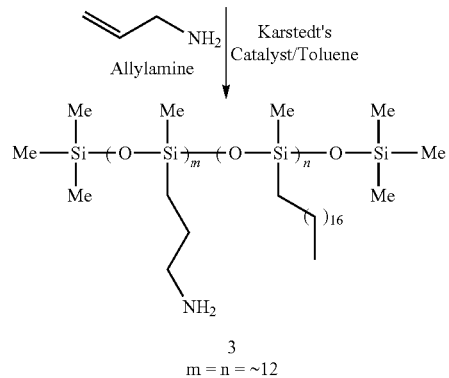

3
m = n = ~12

The apparatus was set up with a 250 mL, 3-neck RBF equipped with nitrogen inlet adapter (Teflon valve/stopper), thermocouple positioned to measure reaction solution temperature directly (with temperature controller) and short path distillation head with receiver. Additionally the distillation head was attached to a bubbler containing a one-way valve. The apparatus was configured so that upon attachment of a Schlenk line to the hose adapter, nitrogen gas could be passed into the reaction flask, across the surface of the reaction solution and out the bubbler attached to the distillation head. Also, the one way valve on the bubbler allowed vacuum to be applied to the whole apparatus, from the bubbler to the hose adapter.

After attachment to the Schlenk line, silane polymer HMS-991 (10 g, 10.2 mL, 6.25 mmoles of polymer strands with 150 mmoles of silane) was added followed by 1-octadecene (18.9 g, 24.0 mL, 75 mmoles) by syringe. The reaction apparatus was placed under vacuum until a pressure of less than 100 mtorr was reached and back flushed with nitrogen 3 times. Vacuum was applied with the valve between the distillation head and bubbler open. Then toluene (50 mL) was added, nitrogen gas flow was adjusted to slowly pass through the apparatus and out the bubbler. Also coolant was circulated through the distillation head condenser and the reaction solution temperature was set to 120 C. Distillation was continued until about half the toluene was collected or about 25 mL. Then the reaction solution was cooled to 60 C and the distillation head was replaced by a nitrogen filled reflux condenser connected to the Schlenk line. The reaction solution was heated to 100 C and Karstedt's catalyst (3.32 mL of a 100× dilution of stock solution with 0.731 mg and 0.00375 mmoles platinum or enough for 20,000 turnovers) was added by syringe. Then the reaction solution was heated at 100 C with stirring overnight. After heating the slightly amber reaction solution was sampled and the volatiles removed for NMR and IR analysis. Analysis by proton NMR indicated that the olefin had been consumed and the silane peak had been reduced in size by 50%. The next step in the synthesis was performed without isolation of intermediate 2. However, polysilane silicone wax 2 was isolated and characterized. $^1$H NMR (toluene-d$_8$, δ): 0.1 to 0.4 (broad m, 90H, SiCH$_3$), 0.7 to 1.0 (broad m, 60H, SiCH$_2$(CH$_2$)$_{16}$CH$_3$), 1.2 to 1.7 (broad m, 192H, SiCH$_2$(CH$_2$)$_{16}$CH$_3$), 5.0 to 5.2 (broad m, 12H, SiH). IR (cm$^{-1}$, diamond): 2957 sh, 2917 s, 2850 s (sp$^3$ C—H), 2168 sh, 2158 m (Si—H), 1466 (sp$^3$ C—H), 1258 s (Si—CH$_3$), 1086 sh, 1033 s (Si—O—Si) and 765 s (Si—CH$_3$).

Analysis of Starting Material Polysilane Silicone (Gelest PN:HMS-991) (1):

$^1$H NMR (neat with coaxial insert using benzene-d$_6$, δ): 0.72 to 0.96 (m, 90H, CH$_3$), 5.40 (s, 24H, silane). $^{13}$C {$^1$H} (neat with coaxial insert using benzene-d$_6$, δ): 1.6 to 2.7 (m, CH$_3$). IR (cm$^{-1}$, diamond): 2966 w (sp$^3$ C—H), 2160 m (Si—H), 1259 m (sp$^3$ C—H), 1034 s (Si—O—Si), 833 s (Si—H) and 752 s (Si—CH$_3$).

The reaction solution was then cooled to 60 C and allylamine (17.1 g, 22.5 mL, 300 mmoles) was added by syringe which instantly produced a colorless solution. Immediately following allylamine, Karstedt's catalyst (0.66 mL, 14.6 mg and 0.075 mmoles of platinum or enough for 1000 turnovers) was added by syringe. The reaction solution temperature was then set to 80 C and the solution heated for 2 h. A sample was prepared for analysis by vacuum transfer of volatiles. Proton NMR indicated a significant reduction of the Si—H peak with lumpy resonances integrating to about 0.25 of the analysis of intermediate 2. Therefore, since other peaks obscure integration in the Si—H region, FTIR analysis was used to provide an accurate determination. FTIR determined almost complete disappearance of the Si—H peak.

Following consumption of the silane, the reaction solution was cooled to room temperature for removal of volatiles by vacuum transfer. For this step the reflux condenser and thermocouple were replaced by stoppers and the reaction flask connected to a supplemental trap cooled by dry ice/ethanol. The product was dried on that vacuum system for a couple of hours then the solids were broken by spatula before drying under vacuum at room temperature overnight. In the morning the product was divided up further with a spatula and the reaction flask was placed directly on the Schlenk line until a pressure of <50 mtorr was reached for 30 minutes. The product PSAW-1:1, a waxy semi-crystalline white solid (27.9 g, 5.26 mmoles or 84.2% yield) was stored in the glove box. $^1$H NMR (toluene-d$_8$, δ): 0.2 to 0.5 (broad m, 90H, SiCH$_3$), 0.6 to 1.0 (broad m, 84H, SiCH$_2$CH$_2$CH$_2$NH$_2$, SiCH$_2$(CH$_2$)$_{16}$CH$_3$), 1.2 to 1.7 (broad m, 216H, SiCH$_2$CH$_2$CH$_2$NH$_2$, SiCH$_2$(CH$_2$)$_{16}$CH$_3$), 2.5 to 2.8 (broad m, 24H, SiCH$_2$CH$_2$CH$_2$NH$_2$) 3.4 to 3.6 (broad m, 24H, SiCH$_2$CH$_2$CH$_2$NH$_2$). IR (cm$^{-1}$, diamond): 2958 sh, 2916 s, 2849 s (sp$^3$ C—H), 1467 w (sp$^3$ C—H), 1257 m (Si—CH$_3$), 1074 sh, 1015 (Si—O—Si) and 784 sh, 767 s (Si—CH$_3$).

Determination of Ratio of Alkyl Amine to Long-Chain Alkyl.

The amine to C18 ratio was determined by the stoichiometry of the two sequential reactions in the synthesis. For example in PSAW-1:1, the first hydroslation with 1-octadecene was driven to completion. The stoichiometry (i.e. 1-octadecene added) determined that half the siloxy repeat units (or initial Si—H bonds) are attached to octadecenyl groups. Even though the second hydrosilation uses 4 times the amount of allylamine compared to the number of Si—H bonds that remain, only one quarter that amounts reacts with the polymer leaving three quarters in the reaction solution. Once the remaining Si—H bonds were reacted with allylamine, the left-over allylamine was removed by precipitation into methanol. The excess allylamine is soluble in methanol and was washed away from the product in the work up.

Example 2

Preparation of Polymeric Silicone Amine Wax (PSAW-1:2)

This example provides a method for making polymeric silicone amine wax (PSAW) with a 1:2 ratio of alkyl amine (aminopropyl) to long-chain alkyl (octadecyl), using the procedure described above in Example 1. For example, silane polymer HMS-991 (10 g, 10.2 mL, 6.25 mmoles of polymer strands with 150 mmoles of silane) used 1-octadecene (25.3 g, 32.0 mL, 100 mmoles) and allylamine (11.4 g, 15.0 mL, 200 mmoles). Karstedt's catalyst was also scaled accordingly, using platinum for 20,000 turnovers in the first step (0.0050 mmoles) and then 1000 turnovers in the second step (0.050 mmoles). (302-071)

Analysis of Polymeric Silicone Amine Wax PSAW-1:2.

$^1$H NMR (toluene-d$_8$, δ): 0.2 to 0.5 (broad m, 90H, SiCH$_3$), 0.6 to 1.0 (broad m, 96H, SiCH$_2$CH$_2$CH$_2$NH$_2$, SiCH$_2$(CH$_2$)$_{16}$CH$_3$), 1.1 to 1.7 (broad m, 528H, SiCH$_2$CH$_2$CH$_2$NH$_2$, SiCH$_2$(CH$_2$)$_{16}$CH$_3$), 2.5 to 2.8 (broad m, 16H, SiCH$_2$CH$_2$CH$_2$NH$_2$) 3.4 to 3.7 (broad m, 16H, SiCH$_2$CH$_2$CH$_2$NH$_2$). IR (cm$^{-1}$, diamond): 2958 sh, 2916 s, 2849 s (sp$^3$ C—H), 1467 w (sp$^3$ C—H), 1257 m (Si—CH$_3$), 1074 sh, 1015 (Si—O—Si) and 784 sh, 767 s (Si—CH$_3$).

Example 3

Preparation of Polymeric Silicone Amine Wax (PSAW-2:1)

This example provides a method for making polymeric silicone amine wax (PSAW) with a 2:1 ratio of alkyl amine (aminopropyl) to long-chain alkyl (octadecyl), using the procedure described above in Example 1. For example, silane polymer HMS-991 (10 g, 10.2 mL, 6.25 mmoles of polymer strands with 150 mmoles of silane) used 1-octadecene (12.6 g, 16.0 mL, 50 mmoles) and allylamine (22.8 g, 30.0 mL, 400 mmoles). Karstedt's catalyst was also scaled accordingly, using platinum for 20,000 turnovers in the first step (0.0025 mmoles) and then 1000 turnovers in the second step (0.10 mmoles). (302-075)

Analysis of Polymeric Silicone Amine Wax PSAW-2:1. $^1$H NMR (toluene-d$_8$, δ): 0.2 to 0.6 (broad m, 90H, SiCH$_3$), 0.6 to 1.0 (broad m, 72H, SiCH$_2$CH$_2$CH$_2$NH$_2$, SiCH$_2$(CH$_2$)$_{16}$CH$_3$), 1.0 to 1.8 (broad m, 288H, SiCH$_2$CH$_2$CH$_2$NH$_2$, SiCH$_2$(CH$_2$)$_{16}$CH$_3$), 2.5 to 2.9 (broad m, 32H, SiCH$_2$CH$_2$CH$_2$NH$_2$) 3.3 to 3.7 (broad m, 16H, SiCH$_2$CH$_2$CH$_2$NH$_2$). IR (cm$^{-1}$, diamond): 2958 sh, 2916 s, 2849 s (sp$^3$ C—H), 1467 w (sp$^3$ C—H), 1257 m (Si—CH$_3$), 1074 sh, 1015 (Si—O—Si) and 784 sh, 767 s (Si—CH$_3$).

Example 4

Preparation of Oligomeric Silicone Amine Wax (OSAW)

This examples describes the preparation of oligomeric silicone amine wax (OSAW) having both the long-chain alkyl group and the alkyl-amine group on each monomer unit.

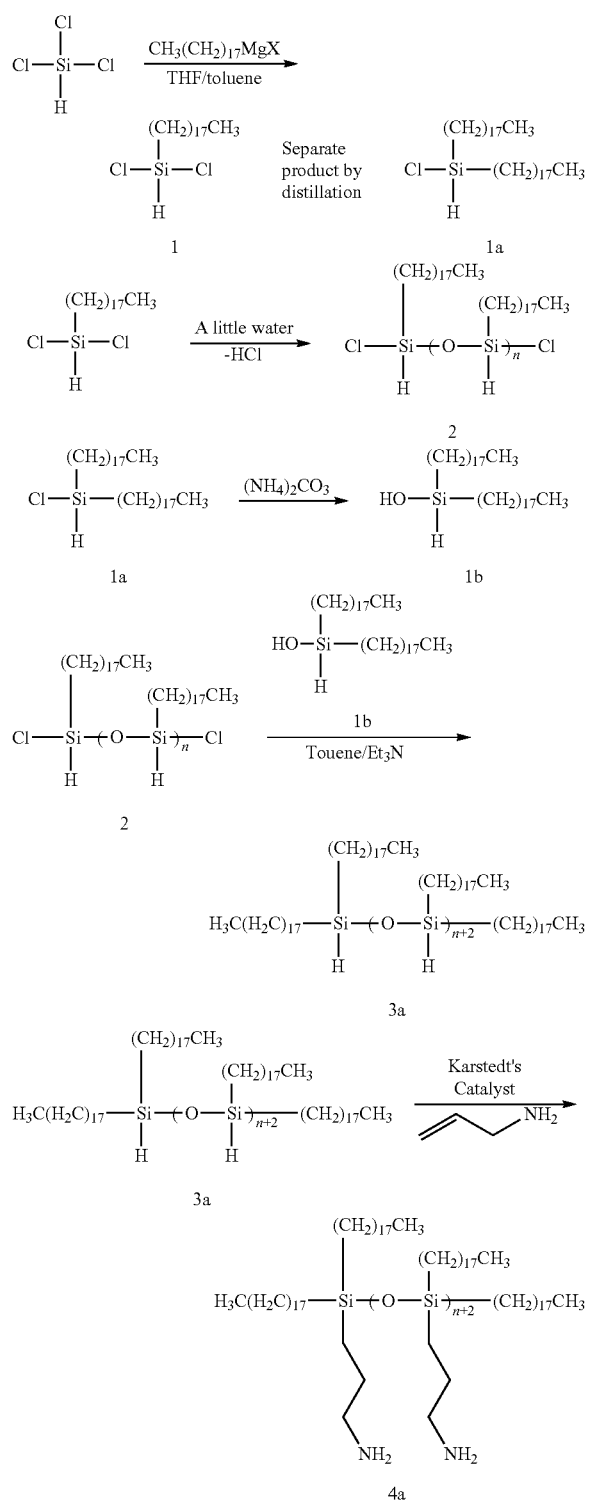

Synthesis of Octadecyl Dichloro Silane (1)

The apparatus, a 2 L 3-neck RBF, was equipped with nitrogen inlet adapter (Teflon valve/stopper), thermocouple positioned to measure reaction solution temperature directly (with temperature controller) and 500 mL addition funnel. The addition funnel was placed on the center neck to allow the drops of Grignard reagent into the most efficiently mixed portion of the reaction solution. Toluene (370 mL) was added to the reaction flask after measurement of solution volume in the addition funnel, followed by trichlorosilane (100 g, 74.4 mL, 738 mmoles) from a syringe directly into the reaction solution. Octadecylmagnesium chloride in THF (369 mL of a 0.50 M solution or 185 mmoles) was transferred into the addition funnel. The Grignard reagent addition was started and the reaction solution temperature was allowed to warm with the slightly exothermic reaction. Upon completion of the addition the reaction solution was cloudy grey with microscopic salts but upon warming to 60 C the reaction solution became white as macroscopic crystals appeared in solution. The volatiles were removed by vacuum transfer using a dry ice/ethanol cooled receiver overnight. The resulting white slurry was extracted with hexane (1×80 mL, 2×20 mL) and transferred through a filter tip cannula equipped with Fisherbrand P8 (particle retention 20-25 um) into a separate flask. The filtrate was clear and colorless. The volatiles were removed to a pressure of <100mtorr which produced a viscous colorless oil. The oil was distilled trap-to-trap using an inverted 'U' shaped connector between the pot and receiver with the receiver cooled with dry ice/ethanol bath. To remove the product from the higher boiling bis-addition by-product a pot temperature of 300 C (thermocouple between the heating mantle and flask) was used with a pressure of less than 100 mtorr. During the distillation the inverted 'U' tube was also heated with a heat gun to drive over the distillate. The product is a clear colorless oil. This synthesis produced 48.6 g, 155 mmoles and 84.0% yield. $^1$H NMR (toluene-d$_8$, δ): 0.77 (t, 2H, Si—CH$_2$), 0.89 (t, 3H, octadecyl CH$_3$), 1.1-1.4 (m, 32H, CH$_2$), 5.30 (s, 1H, Si—H). IR (cm$^{-1}$, diamond): 2919 s, 2852 s (sp$^3$ C—H), 2203 in (Si—H), 1466 m (sp$^3$ C—H) and 553, 501 m (symm and asymm Si—Cl).

Please note: The trap contents (or trapped reaction volatiles) from the reaction solution contain excess trichlorosilane because a three fold excess was used in the reaction. The thawed trap material should be slowly added to water (to produce silicates and hydrochloric acid) or a solution of alcohol and quartenary amine (to produce alkoxy silicone and ammonium hydrochloride) to decompose the chlorosilane before pouring the solution into the waste.

Synthesis of Oligomeric Silane (3)

A 1 L, 3 neck RBF was equipped with a nitrogen inlet adapter (Teflon valve/stopper), thermocouple positioned to measure the reaction solution temperature directly (with temperature controller) and another inlet adapter attached to an oil filled bubbler. The apparatus was configured so nitrogen gas could be passed into the flask, across the surface of the reaction solution and out through the bubbler. Then toluene (300 mL) was added followed by octadecyl dichloro silane (1) (60 g, 192 mmoles) by syringe. Then water (2.59 g, 2.59 mL, 144 mmoles) was added to a 50 mL Schlenk flask and dissolved in THF (15 mL) before being pulled into a syringe. The reaction solution was stirred rapidly and nitrogen was flowing across the reaction surface as the solution of water/THF was added drop-wise to the center of the reaction vortex over 20 minutes. The reaction solution temperature did not increase significantly during water/THF addition. Then the reaction solution was stirred at RT for 15 minutes before being heated to 60 C for 5 minutes.

Oligo dichlorosilane (2) has been formed at this point, and while not isolated, was characterized as follows: $^1$H NMR (toluene-d$_8$, δ): 0.7 to 1.0 (broad m, 35H, SiCH$_2$ (CH$_2$)$_{16}$CH$_3$), 1.2 to 1.7 (broad m, 224H, SiCH$_2$(CH$_2$)$_{16}$ $CH_3$), 5.0 to 5.2 (broad m, 7H, SiH). IR (cm$^{-1}$, diamond): 2916 s, 2849 s (sp$^3$ C—H), 2163 m (Si—H), 1466 (sp$^3$ C—H), 1079 m, 1030 sh (Si—O—Si) and 464 m (Si—Cl).

After 5 minutes at about 60 C the sodium trimethylsilanolate solution was added (48.0 mL of a 1.0 M solution or 48.0 mmoles) by syringe. After another 5 minutes at about 60 C, triethyl amine (29.1 g, 40.4 mL, 288 mmoles) was added quickly by syringe into the center of the reaction solution vortex which turned the clear reaction solution opaque white. Then the reaction solution was stirred at 60 C for another 10 minutes before being allowed to cool toward RT. The volatiles were removed by vacuum transfer using a dry ice/ethanol cooled receiver (overnight) which produced a white paste. The product was isolated by extraction with hexane (1×80 mL and 2×40 mL) and each extract was transferred by cannula using a filter tip cannula equipped with Fisherbrand P8 filter paper (particle retention 20-25 um) into a separate Schlenk flask. The volatiles were removed from the clear colorless filtrate by vacuum transfer to produce a white solid. After preliminary vacuum, the solids were broken up before final vacuum to a pressure of <50 mtorr. The product, a white powder, weighed 50.7 g. The formula weight was determined by using end group analysis with proton NMR by comparing the integration of octadecyl methylenes against the silicon methyl groups. It was determined that n=7.2 repeat units so the formula weight was calculated to be 2312 so 50.7 g was 21.9 mmoles with reaction yield of 82.1%. $^1$H NMR (toluene-d$_8$, δ): 0.1 to 0.3 (broad m, 18H, SiCH$_3$), 0.7 to 1.0 (broad m, 35H, SiCH$_2$(CH$_2$)$_{16}$CH$_3$), 1.2 to 1.7 (broad m, 224H, SiCH$_2$(CH$_2$)$_{16}$CH$_3$), 5.0 to 5.2 (broad m, 7H, Si—H). IR (cm$^{-1}$, diamond): 2917 s, 2848 s (sp$^3$ C—H), 2161 m (Si—H), 1468 m (sp$^3$ C—H), 1075 m (Si—O—Si).

Synthesis of Oligomeric Silicone Amine Wax or OSAW (4)

A 250 mL, 3-neck RBF equipped with a nitrogen inlet adapter (Teflon valve/stopper), reflux condenser and suba seal was placed under vacuum to <200 mtorr and back flushed with nitrogen. Then oilgo silane (3) (10 g, 3.36 mmoles of polymer strands, n=9.4 formula weight of 2974 but containing 33.5 mmoles of silane) was added from a vial through the 'suba seal' orifice and the orifice fitted with a thermocouple positioned to measure the reaction solution temperature directly (with temperature controller). Toluene (6 mL) was added and the reaction solution was heated to 60 C. Allylamine (7.65 g, 10.0 mL, 134 mmoles) was added by syringe followed by a Karstedt's Catalyst (0.296 mL, 0.0335 mmoles platinum or enough for 1000 turnovers) which heated the solution slightly. Then the reaction solution was heated at 65 C for 2 days. Following sample analysis by FTIR that revealed a small Si—H peak at 2160 cm$^{-1}$, a little more allylamine (1.52 g, 2 mL, 26.7 mmoles) was added and the reaction solution was heated at 65 C for another day. Sample analysis by FTIR did not show an Si—H peak so the reaction solution was allowed cooled toward RT. Toluene (2 mL) was added as the reaction solution was cooling to RT to prevent solidification. Then the reaction solution was added drop-wise over 10 minutes to a separate Schlenk flask containing methanol (100 mL). Methanol precipitated the product as a white solid. The supernatant was removed by a filter tip cannula equipped with Fishebrand P8 filter paper (particle retention 20-25 um) and the precipitate was rinsed with methanol 2×100 mL before placing the product under vacuum to a pressure of <100 mtorr. The product (with n=9.4 and formula weight of 3510) is a white somewhat granular powder (8.97 g, 3.02 mmoles, 89.9% yield). $^1$H NMR (toluene-d$_8$, δ): 0.2 to 0.4 (broad m, 18H, SiCH$_3$), 0.7 to 1.0 (broad m, 49H, SiCH$_2$CH$_2$CH$_2$NH$_2$ and SiCH$_2$(CH$_2$)$_{16}$CH$_3$), 1.2 to 1.8 (broad m, 126H, SiCH$_2$(CH$_2$)$_{16}$CH$_3$ and SiCH$_2$CH$_2$CH$_2$NH$_2$), 2.6 to 2.9 (broad m, 14H, SiCH$_2$CH$_2$CH$_2$NH$_2$), 3.6 to 3.7 (broad m, 14H, CH$_2$NH$_2$). IR (cm$^{-1}$, diamond): 2917 s, 2849 s (sp$^3$ C—H), 1467 m (sp$^3$ C—H), 1066 s, 1036 s (Si—O—Si).

Example 5

Compositions of Quantum Dots with PSAW-1:1

Ligand exchange was accomplished by dissolving nanocrystals/quantum dots in hexane or toluene, adding an amino functional silicone, heating at 50° to 60° C. for 16 to 36 h, and removing the volatiles by vacuum transfer. (In general, ligand exchange is typically accomplished at 50° to 130° C. for 2 to 72 h.) The quantum yield and other parameters were maintained, and the nanocrystals were left in silicone as a clear oil.

In the glove box CdSe/CdS/ZnS nanocrystals (NCs), dissolved in toluene from the shell synthesis, were washed by precipitation with 2 volumes of ethanol, mixing by vortex mixer followed by centrifugation for 10 minutes. The supernatant was decanted and the NCs were dissolved in the same volume of toluene as the NC shell solution. Then the optical density (OD) was determined by dissolving a small amount of NC/ligand/toluene solution in toluene, measuring the OD at 460 nm then extrapolating back to the OD of the stock solution. The amount of PSAW used in the exchange was based upon the concentration of NCs dissolved in PSAW, as if the PSAW was the solvent. A NC concentration of between 25 and 400 was the normal range. Then the amount of toluene was calculated to produce a solution of 6 OD. The amount of toluene above the amount that was solubilizing the NCs was used to dissolve PSAW in a flask and was heated to 100 C. Then the solution of NCs/ligand/toluene was added drop-wise over 15 to 30 minutes followed by heating the exchange solution for 2 h at 100 C. The volatiles were removed by vacuum transfer to a pressure of less than 100 mtorr. The NCs/ligand is now a waxy solid that was dissolved into Part B epoxy (Locktite CL30) by THINKY mixer and then to produce a epoxy mixture capable of thermal cure mixed into Part A. The amount of Part A to B used was 2:1 weight ratio.

For example: NCs in shell growth solution (15 mL) were precipitated by combination with ethanol (30 mL), mixed and centrifuged for 10 minutes. The supernatant was decanted and the pellet was dissolved in toluene (15 mL). The optical density (OD) was measured by dissolution of a 0.1 mL sample into 4.0 mL toluene and the absorbance measured at 460 nm. An absorbance of 0.236 calculated an OD of 9.68. A portion of the washed NCs in toluene (6.2 mL) was to be used for ligand exchange with 0.60 g of PSAW to make 100 OD in PSAW. The total volume of toluene to be used was 10 mL and the exchange OD was projected occur at OD 6.0. Then to a flask was added PSAW (0.60 g) and toluene (3.8 mL) and the solution was heated to 100 C. The washed NCs in toluene (6.2 mL) were added drop-wise over 20 minutes and the solution was heated at 100 C for 120 minutes longer. Following ligand exchange the solution was cooled to room temperature and the volatiles removed by vacuum transfer to a pressure of less that 100 mtorr. The amount of NCs/ligand to be used in the formulation depends upon a number of other factors such as film thickness and desired white point and will not be described.

Example 6

Preparation of PSCAW

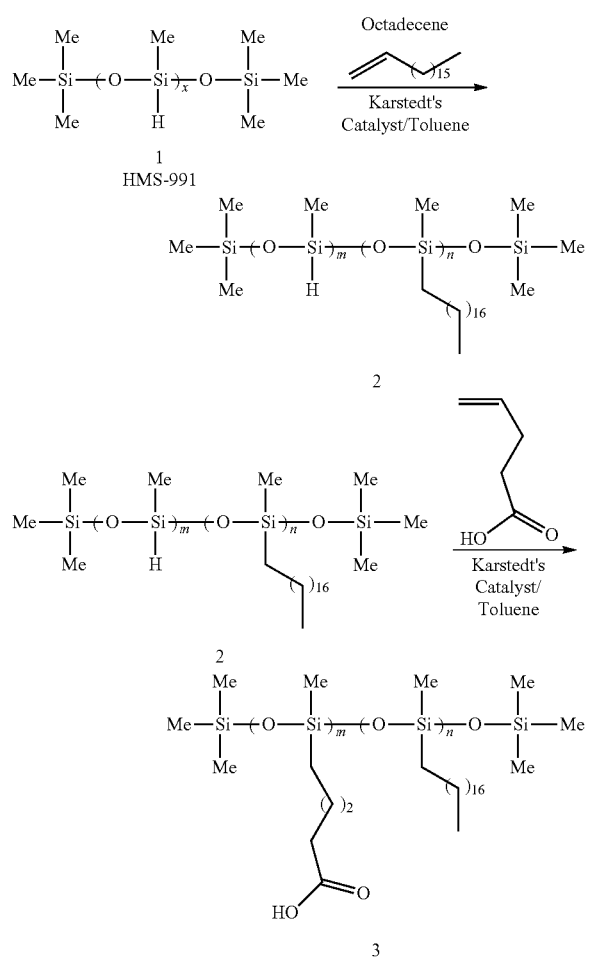

General Methods. All manipulations were performed under a dry, oxygen-free, nitrogen atmosphere using standard Schlenk technique. Dry, deoxygenated toluene, methanol, 4-pentenoic acid, and 1-octadecene (>95% by GC) were purchased from Aldrich and used without further purification. Karstedt's catalyst, 2.1 to 2.4 wt % in xylenes was obtained from Gelest, used without further purification, stored and handled inside the glove box. A 100× dilution of Karstedt's catalyst was produced by dissolving 0.10 mL of stock solution into 10 mL of toluene. (The stock solution contains 0.113 moles of platinum per mL so the 100× dilution contains 0.00113 mmoles platinum per mL solution.) The polysilane HMS-991 (1) was purchased from Gelest. The silane was purified by vacuum overnight to P<50 mtorr at room temperature (RT) and then handled inside the glove box. NMR chemical shift data were recorded with a Bruker FT NMR at 400 MHz for proton or 100 MHz for $^{13}$C {$^1$H} and are listed in ppm. IR analysis was obtained on a Nicolet 7200 FTIR equipped with an attenuated total reflectance (ATR) sampling accessory.

Synthesis of Polymeric Silicone Carboxylic Acid Wax (3). The apparatus was set up with a 100 mL, 3-neck RBF equipped with nitrogen inlet adapter (Teflon valve/stopper), thermocouple positioned to measure reaction solution temperature directly (with temperature controller) and short path distillation head with receiver. Additionally the distillation head was attached to a bubbler containing a one-way valve. The apparatus was configured so that upon attachment of a Schlenk line to the hose adapter, nitrogen gas could be passed into the reaction flask, across the surface of the reaction solution and out the bubbler attached to the distillation head. Also, the one way valve on the bubbler allowed vacuum to be applied to the whole apparatus, from the bubbler to the hose adapter.

After attachment to the Schlenk line, polysilane 1 (7.00 g, 4.38 mmoles of polymer strands with 100 mmoles of silane) was added followed by 1-octadecene (13.0 g, 16.0 mL, 50.0 mmoles) by syringe. The reaction apparatus was placed under vacuum until a pressure of less than 100 mtorr was reached and back flushed with nitrogen once. This vacuum step was preformed with the valve between the distillation head and bubbler open. Then toluene (30 mL) was added, nitrogen gas flow was adjusted to slowly pass through the apparatus and out the bubbler. Also coolant was circulated through the distillation head condense and the reaction solution temperature was set to 120° C. Distillation was continued until about half the toluene was collected or about 15 mL. Then toluene (15 mL) was added, the reaction solution was cooled to 60° C. and the distillation head was replaced by a nitrogen filled reflux condenser connected to the Schlenk line. The reaction solution was heated to 60° C. and Karstedt's catalyst (2.2 mL of a 100× dilution of stock solution with 2.50×10$^{-3}$ mmoles platinum or enough for 20,000 turnovers) was added by syringe. The reaction was exothermic and reached 130 C, and after the temperature dropped was heated at 90° C. for 3 h then the reaction solution was sampled and the volatiles removed for analysis. Analysis by FTIR and proton NMR indicated that the olefin had been consumed and the silane peak had been reduced in size by around 50%. The next step in the synthesis was performed without isolation of intermediate 2. IR (cm$^{-1}$, diamond): 2957 sh, 2916 s, 2850 s (sp3 C—H), 2160 m (Si—H).

The reaction solution was then cooled to 60° C. and 4-pentenoic acid (10.0 g, 10.19 mL, 100 mmoles) was added by syringe. The reaction experienced an exotherm, self heating to above 140° C., upon which the reaction mixture gelled and bumped gelled product into the condenser. The gelled product would slowly dissolve into toluene over a few days. IR (cm$^{-1}$, diamond): 3600 to 2300 broad (carboxylic acid OH), 2956 sh, 2916 s, 2849 s (sp2 C—H), 1709 s (carboxylic acid C=O), 1077 sh, 1015 s (Si—O—Si).

Example 7

Preparation of PS2CAW

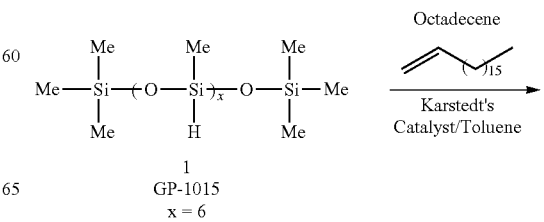

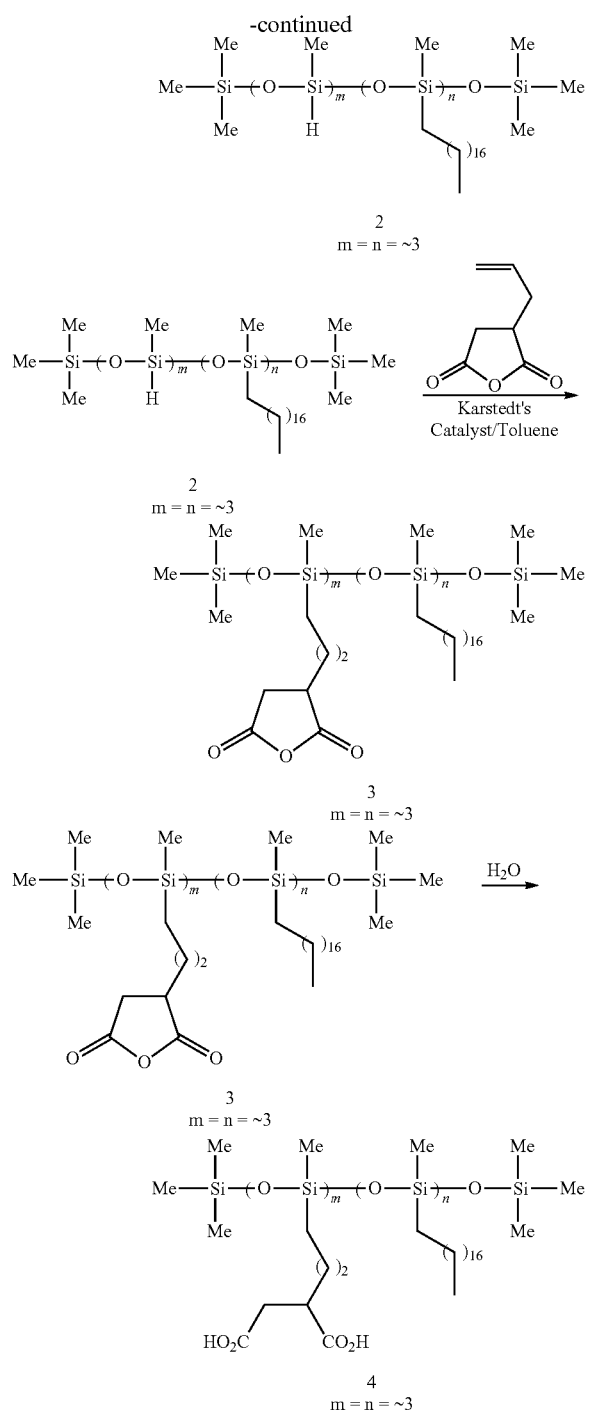

General Methods.

All manipulations were performed under a dry, oxygen-free, nitrogen atmosphere using standard Schlenk technique. Dry, deoxygenated toluene, methanol and 1-octadecene (>95% by GC) were purchased from Aldrich and used without further purification. Allyl succinic anhydride was purchased from TCI America and distilled before use. Karstedt's catalyst, 2.1 to 2.4 wt % in xylenes was obtained from Gelest, used without further purification, stored and handled inside the glove box. A 100× dilution of Karstedt's catalyst was produced by dissolving 0.10 mL of stock solution into 10 mL of toluene. (The stock solution contains 0.113 moles of platinum per mL.) The polysilane (1) or "polyMethylHydrosiloxanes, Trimethylsilyl terminated" with n of about 6 was purchased as a special order from Genesee Polymers Corp in Burton, Mich. The silane was purified by vacuum overnight to P<50 mtorr at room temperature (RT) and then handled inside the glove box. NMR chemical shift data were recorded with a Bruker FT NMR at 400 MHz for proton or 100 MHz for $^{13}C$ {$^{1}H$} and are listed in ppm. IR analysis was obtained on a Nicolet 7200 FTIR equipped with an attenuated total reflectance (ATR) sampling accessory. The polysilane silicone (1) was characterized as follows: $^{1}H$ NMR (toluene-$d_8$, δ): 0.16 (m, 36H, SiMe), 4.93 (m, 6H, Si—H); IR (cm$^{-1}$, diamond): 2961 w (sp3 C—H), 2161 m (Si—H), 1257 m (sp3 C—H), 1039 s (Si—O—Si).

Synthesis of Polymeric Silicone Carboxylic Acid Wax (4)

The apparatus was set up with a 50 mL, 3-neck RBF equipped with nitrogen inlet adapter (Teflon valve/stopper), thermocouple positioned to measure reaction solution temperature directly (with temperature controller) and short path distillation head with receiver. Additionally the distillation head was attached to a bubbler containing a one-way valve. The apparatus was configured so that upon attachment of a Schlenk line to the hose adapter, nitrogen gas could be passed into the reaction flask, across the surface of the reaction solution and out the bubbler attached to the distillation head. Also, the one way valve on the bubbler allowed vacuum to be applied to the whole apparatus, from the bubbler to the hose adapter.

After attachment to the Schlenk line, polysilane 1 (5.00 g, 9.56 mmoles of polymer strands with 57.4 mmoles of silane) was added followed by 1-octadecene (7.42 g, 9.17 mL, 28.7 mmoles) by syringe. The reaction apparatus was placed under vacuum until a pressure of less than 100 mtorr was reached and back flushed with nitrogen once. This vacuum step was preformed with the valve between the distillation head and bubbler open. Then toluene (15 mL) was added, nitrogen gas flow was adjusted to slowly pass through the apparatus and out the bubbler. Also coolant was circulated through the distillation head condenser, the receiver was cooled with dry ice/ethanol and the reaction solution temperature was set to 120 C. Distillation was continued until about half the toluene was collected or about 12 to 13 mL. Then toluene (15 mL) was added, the reaction solution was cooled to 60 C and the distillation head was replaced by a nitrogen filled reflux condenser connected to the Schlenk line. The reaction solution was heated to 60 C and Karstedt's catalyst (1.27 mL of a 100× dilution of stock solution with 1.43×10$^{-3}$ mmoles platinum or enough for 20,000 turnovers) was added by syringe. The reaction exothermed to 130 C and after the temperature dropped was heated at 90 C for 3 h. then the reaction solution was sampled and the volatiles removed for analysis. Analysis by FTIR and proton NMR indicated that the olefin had been consumed and the silane peak had been reduced in size by around 50%. The next step in the synthesis was performed without isolation of intermediate 2.

The reaction solution was then cooled to 60 C and allyl succinic anhydride (4.02 g, 3.43 mL, 28.7 mmoles) was added by syringe. Immediately following allyl succinic anhydride, Karstedt's catalyst (2.54 mL of a 100× dilution of the stock solution or 2.86×10$^{-3}$ mmoles of platinum, enough for 10,000 turnovers) was added by syringe. The solution temperature was then set to 110 C and the solution heated overnight. A sample was prepared for analysis by addition of a 0.3 mL sample drop-wise to a rapidly stirring solution of 2 mL methanol. Following precipitation the supernatant was decanted and the white waxy sample washed with methanol (2 mL) before being prepared for analysis by removal of the volatiles by vacuum transfer. Proton NMR indicated a significant reduction of the Si—H peak with lumpy resonances integrating to about 0.25 of the analysis of intermediate 2. Therefore, since other peaks obscure integration in the Si—H region due to a small amount of double bond migration, FTIR analysis was used to provide an accurate determination. FTIR determined almost complete disappearance of the Si—H peak. However the reaction solution was heated at 120 C overnight once again to insure that the reaction had been driven to completion. Subsequent sample preparation and analysis determined that the reaction was complete.

Following consumption of the silane, toluene (2 mL) was added and the reaction solution was cooled to room temperature. The reaction solution was transferred into methanol (280 mL) dropwise by cannula in a 500 mL Schlenk flask which formed a white precipitate. Stirring was ceased after 5 minutes and the precipitate allowed to settle. Then the supernatant was removed by filter tip cannula equipped with Fisherbrand P8 filter paper (particle retention 20-25 um) and the precipitate washed with methanol (40 mL). Although the anhydride product 3 was not hydrolyzed to succinic acid in the next step, analysis of polymeric silicone anhydride wax 3 was available in the analytical section. $^1$H NMR (toluene-$d_8$, δ): 0.15 to 0.40 (m, 36H, SiMe), 0.55 to 0.95 (m, 21H, SiCH$_2$CH$_2$, (CH$_2$)$_{16}$CH$_3$), 1.25 to 1.75 (m, 114H, SiCH$_2$(CH$_2$)$_{16}$CH$_3$, SiCH$_2$CH$_2$CH$_2$CH), 1.8 to 2.8 (m, 9H, CH$_2$CH(CO$_2$H)CH$_2$CO$_2$H). IR (cm$^{-1}$, diamond): 2958 sh, 2917 s, 2849 s (sp3 C—H), 1863 m, 1782 s (anhydride symm & asymm), 1257 m (sp3 C—H), 1062 sh, 1021 s (Si—O—Si).

Water (16 mL, 888 mmoles) was added to the reaction flask and a thin wire thermocouple was positioned between the flask and heating mantle to roughly measure the reaction solution temperature. The reaction solution was heated at 130 C under nitrogen overnight which produced a goopy white opaque solution. After volatiles were removed using a dry ice/ethanol cooled supplementary trap the volatiles were broken up before ultimate volatiles removal by vacuum on the Schlenk line until a pressure of <50 mtorr was reached for 30 minutes. The product, a semi-crystalline white solid (9.79 g, 5.75 mmoles or 60.2% yield) was stored in the glove box. $^1$H NMR (CDCl$_3$, δ): −0.05 to 0.15 (m, 36H, SiMe), 0.35 to 0.60 (m, 12H, SiCH$_2$CH$_2$), 0.86 (t, 9H, (CH$_2$)$_{16}$CH$_3$), 1.15 to 1.80 (m, 108H, SiCH$_2$(CH$_2$)$_{16}$CH$_3$, SiCH$_2$CH$_2$CH$_2$CH), 2.20 to 3.10 (m, 9H, CH$_2$CH(CO$_2$H)CH$_2$CO$_2$H). IR (cm$^{-1}$, diamond): 3600 to 2300 broad (carboxylic acid OH), 2958 sh, 2921 s, 2849 s (sp2 C—H), 1707 s (carboxylic acid C=O), 1257 m (sp3 C—H), 1074 sh, 1021 s (Si—O—Si).

Example 8

Preparation of OSCAW

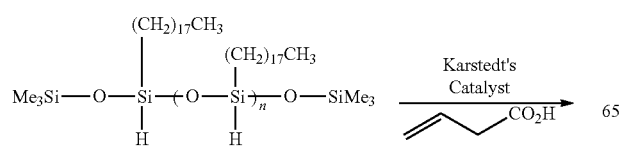

General Methods.

All manipulations were performed under a dry, oxygen-free, nitrogen atmosphere using standard Schlenk technique. The reagents octadecyl magnesium chloride (0.5 M in tetrahydrofuran or THF), trichlorosilane, sodium trimethylsilanolate (1.0 M in THF) and triethylamine were obtained from Sigma-Aldrich and stored in the glove box before being used without further purification. The solvents THF, toluene and hexanes were purchased dry and deoxygenated from Fisher Chemical, used without further purification and handled by Schlenk technique. The 4-pentenoic acid was obtained from Sigma-Aldrich and stored in the glove box before being used without further purification. Karstedt's catalyst, 2.1 to 2.4 wt % in xylenes was obtained from Gelest and used without further purification. (The stock solution contains 0.113 moles of platinum per mL.) NMR chemical shift data were recorded with a Bruker FT NMR at 400 MHz for $^1$H and are listed in ppm. IR analysis was obtained on a Nicolet 7200 FTIR equipped with an attenuated total reflectance (ATR) sampling accessory.

Synthesis of Oligomeric Silane

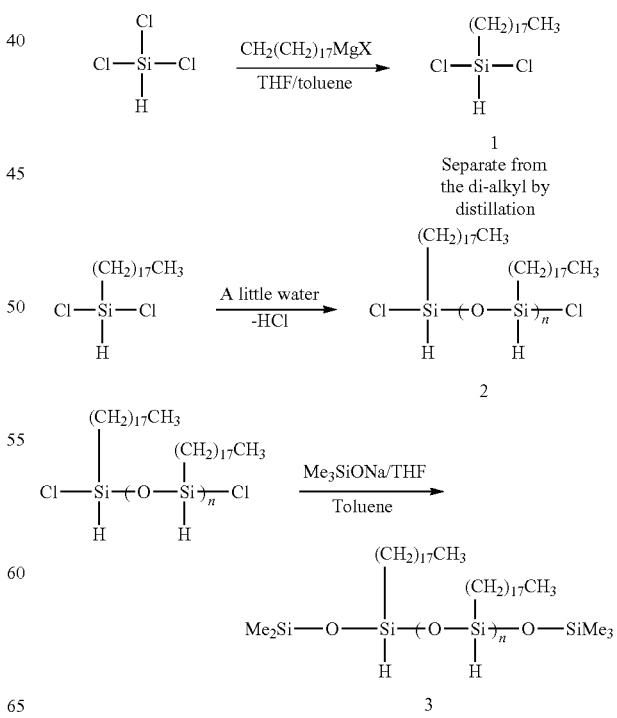

Synthesis of Octadecyl Dichloro Silane (1)

The apparatus, a 2 L 3-neck RBF, was equipped with nitrogen inlet adapter (Teflon valve/stopper), thermocouple positioned to measure reaction solution temperature directly (with temperature controller) and 500 mL addition funnel. The addition funnel was placed on the center neck to allow the drops of Grignard reagent into the most efficiently mixed portion of the reaction solution. Toluene (370 mL) was added to the reaction flask after measurement of solution volume in the addition funnel, followed by trichlorosilane (100 g, 74.4 mL, 738 mmoles) from a syringe directly into the reaction solution. Octadecylmagnesium chloride in THF (369 mL of a 0.50 M solution or 185 mmoles) was transferred into the addition funnel. The Grignard reagent addition was started and the reaction solution temperature was allowed to warm with the slightly exothermic reaction. Upon completion of the addition the reaction solution was cloudy grey with microscopic salts but upon warming to 60 C the reaction solution became white as macroscopic crystals appeared in solution. The volatiles were removed by vacuum transfer using a dry ice/ethanol cooled receiver overnight. The resulting white slurry was extracted with hexane (1×80 mL, 2×20 mL) and transferred through a filer tip cannula equipped with Fisherbrand P8 (particle retention 20-25 um) into a separate flask. The filtrate was clear and colorless. The volatiles were removed to a pressure of <100 mtorr which produced a viscous colorless oil. The oil was distilled trap-to-trap using an inverted 'U' shaped connector between the pot and receiver with the receiver cooled with dry ice/ethanol bath. To remove the product from the higher boiling bis-addition by-product a pot temperature of 300 C (thermocouple between the heating mantle and flask) was used with a pressure of less than 100 mtorr. During the distillation the inverted 'U' tube was also heated with a heat gun to drive over the distillate. The product is a clear colorless oil. This synthesis produced 48.6 g, 155 mmoles and 84.0% yield. $^1$H NMR (toluene-$d_8$, δ): 0.77 (t, 2H, Si—CH$_2$), 0.89 (t, 3H, octadecyl CH$_3$), 1.1-1.4 (m, 32H, CH$_2$), 5.30 (s, 1H, Si—H). IR (cm$^{-1}$, diamond): 2921 s, 2852 s (sp$^3$ C—H), 2205 m (Si—H), 1466 m (sp$^3$ C—H) and 553, 501 m (symm and asymm Si—Cl).

Please note: The trap contents (or trapped reaction volatiles) from the reaction solution contain excess trichlorosilane because a three fold excess was used in the reaction. The thawed trap material should be slowly added to water (to produce silicates and hydrochloric acid) or a solution of alcohol and quaternary amine (to produce alkoxy silicone and ammonium hydrochloride) to decompose the chlorosilane before pouring the solution into the waste.

Synthesis of Oligomeric Silane (3)

A 1 L, 3 neck RBF was equipped with a nitrogen inlet adapter (Teflon valve/stopper), thermocouple positioned to measure the reaction solution temperature directly (with temperature controller) and another inlet adapter attached to an oil filled bubbler. The apparatus was configured so nitrogen gas could be passed into the flask, across the surface of the reaction solution and out through the bubbler. Then toluene (300 mL) was added followed by octadecyl dichloro silane (1) (60 g, 192 mmoles) by syringe. Then water (2.59 g, 2.59 mL, 144 mmoles) was added to a 50 mL Schlenk flask and dissolved in THF (15 mL) before being pulled into a syringe. The reaction solution was stirred rapidly and nitrogen was flowing across the reaction surface as the solution of water/THF was added drop-wise to the center of the reaction vortex over 20 minutes. The reaction solution temperature did not increase significantly during water/THF addition. Then the reaction solution was stirred at RT for 15 minutes before being heated to 60 C for 5 minutes.

Oligo dichlorosilane (2, n=7) has been formed at this point but was not isolated in this procedure. However, analysis for this species is included (vide infra) $^1$H NMR (toluene-$d_8$, δ): 0.7 to 1.0 (broad m, 35H, SiCH$_2$(CH$_2$)$_{16}$CH$_3$), 1.2 to 1.7 (broad m, 224H, SiCH$_2$(CH$_2$)$_{16}$CH$_3$), 5.0 to 5.2 (broad m, 7H, SiH). IR (cm$^{-1}$, diamond): 2916 s, 2849 s (sp$^3$ C—H), 2163 m (Si—H), 1466 (sp$^3$ C—H), 1079 m, 1030 sh (Si—O—Si) and 464 m (Si—Cl).

After 5 minutes at about 60 C the sodium trimethylsilanolate solution (48.0 mL of a 1.0 M solution or 48.0 mmoles) was added by syringe. After another 5 minutes at about 60 C, triethyl amine (29.1 g, 40.4 mL, 288 mmoles) was added quickly by syringe into the center of the reaction solution vortex which turned the clear reaction solution opaque white. Then the reaction solution was stirred at 60 C for another 10 minutes before being allowed to cool toward RT. The volatiles were removed by vacuum transfer using a dry ice/ethanol cooled receiver (overnight) which produced a white paste. The product was isolated by extraction with hexane (1×80 mL and 2×40 mL) and each extract was transferred by cannula using a filter tip cannula equipped with Fisherbrand P8 filter paper (particle retention 20-25 um) into a separate Schlenk flask. The volatiles were removed from the clear colorless filtrate by vacuum transfer to produce a white solid. After preliminary vacuum, the solids were broken up before final vacuum to a pressure of <50 mtorr. The product, a white powder, weighed 50.7 g. The formula weight was determined by using end group analysis with proton NMR by comparing the integration of octadecyl methylenes against the silicon methyl groups. It was determined that n=7.2 repeat units so the formula weight was calculated to be 2312 so 50.7 g was 21.9 mmoles with reaction yield of 82.1%. $^1$H NMR (toluene-$d_8$, δ): 0.1 to 0.3 (broad m, 18H, SiCH$_3$), 0.6 to 0.9 (broad m, 35H, SiCH$_2$(CH$_2$)$_{16}$CH$_3$), 1.2 to 1.7 (broad m, 224H, SiCH$_2$(CH$_2$)$_{16}$CH$_3$), 4.8 to 5.0 (broad m, 7H, Si—H). IR (cm$^{-1}$, diamond): 2956 sh, 2917 s, 2848 s (sp$^3$ C—H), 2161 m (Si—H), 1468 m (sp$^3$ C—H), 1065 m, 1075 sh (Si—O—Si).

Synthesis of Oligomeric Silicone Carboxylic Acid Wax or OSCAW

A 100 mL 3-neck RBF was set up on the Schlenk line with a reflux condenser, thermocouple positioned to measure the reaction solution temperature connected to a temperature controller and nitrogen inlet adapter. After vacuum and back flush with nitrogen 3 times, polysilane 3 was added (5 g, 16.7 mmoles estimated by using a polymer repeat unit fwt of 298.51) from a vial after storage and weighing in the glove box. Then reaction flask was vac again once to less than 100 mtorr and back flushed with nitrogen gas. Toluene (2 mL) and 4-pentanoic acid (2.77 g, 2.93 mL, 27.7 mmoles) were added and the reaction solution was heated to 60 C. Karstedt's catalyst (0.739 ml or 8.35×10$^{-4}$ mmoles of a 100× dilution of the stock solution or enough for 20,000 turnovers) was added and the solution was heated at 60 C for a couple of hours. Then the temperature was increased by 20 C incrementally and the reaction solution was heated at 120 C overnight. Following sample analysis by FTIR and $^1$H NMR, indicating the silane had been consumed, toluene (2 mL) was added before the reaction solution was cooled to room temperature to prevent solidification. Then the reaction solution was added dropwise to a separate RBF containing MeOH (45 mL) to precipitate the product. (Please note that 4-pentanoic acid is soluble in MeOH.) The supernatant was removed by a filter tip cannula equipped with Fisherbrand filter paper (particle retention 20-25 um) and the precipitate rinsed with MeOH (10 mL). The volatiles were removed and the solids broken up to facilitate drying before final vacuum to p<50 mtorr to leave a slightly off white powder, 4.17 g, 1.37 mmoles, 63.7% yield (based upon a silane with n=7.2). $^1$H NMR (toluene-$d_8$, δ): 0.25 to 0.50 (broad m, 18H, SiMe), 0.70 to 1.20 (broad m, 49H, SiCH$_2$CH$_2$CH$_2$CH$_2$CO$_2$H and SiCH$_2$(CH$_2$)$_{16}$CH$_3$), 1.20 to 1.75 (broad m, 252H, SiCH$_2$(CH$_2$)$_{16}$CH$_3$, SiCH$_2$CH$_2$CH$_2$CH$_2$CO$_2$H and SiCH$_2$CH$_2$CH$_2$CH$_2$CO$_2$H), 2.2 to 2.7 (broad m, 14H, SiCH$_2$CH$_2$CH$_2$CO$_2$H) and 13.5 to 15.5 (broad m, 14H, CH$_2$CO$_2$H). IR (cm$^{-1}$, diamond): 2500 to 3500 (broad CO$_2$H), 2917 s, 2849 s (sp$^3$ C—H), 1711 m (C=O), 1467 s (sp$^3$ C—H), 1077 s, 1036 sh (Si—O—Si).

Example 9

Preparation of OS2CAW

The Oligomeric Silicone Di-Carboxylic Acid Wax (OS2CAW) was prepared by two methods.

General Methods.

All manipulations were performed under a dry, oxygen-free, nitrogen atmosphere using standard Schlenk technique. The solvents toluene and methanol were purchased from Fisher already deoxygenated and dry in 1 L containers and used without further purification. Dimethoxyethane (DME) was purchased from Aldrich already dry and deoxygenated in 1 L containers also and used without further purification. Allyl succinic anhydride was purchased from TCI America and distilled before use. Platinum (II) acetylacetonate [Pt(acac)2] was purchased from Strem Chemical and used without further purification. In the glove box 50 mg of Pt(acac)$_2$ was dissolved in 10 mL of DME to produce a solution containing 1.27×10$^{-2}$ mmoles Pt/mL solution. Speier's catalyst, hexachloro platinic acid hydrate was purchased from Aldrich and used without further purification. (To make a stock solution 55 mg was dissolved in 10.0 mL of DME producing 1.34×10$^{-2}$ mmoles Pt/mL catalyst solution.). NMR chemical shift data were recorded with a Bruker FT NMR at 400 MHz for $^1$H and are listed in ppm. IR analysis was obtained on a Nicolet 7200 FTIR equipped with an attenuated total reflectance (ATR) sampling accessory.

The octadecyl dichloro silane (1) is characterized as follows: $^1$H NMR (toluene-$d_8$, δ): 0.77 (t, 2H, Si—CH$_2$), 0.89 (t, 3H, octadecyl CH$_3$), 1.1-1.4 (m, 32H, CH$_2$), 5.30 (s, 1H, Si—H); IR (cm$^{-1}$, diamond): 2919 s, 2852 s (sp$^3$ C—H), 2203 m (Si—H), 1466 m (sp$^3$ C—H) and 553, 501 m (symm and asymm Si—Cl).

Method 1

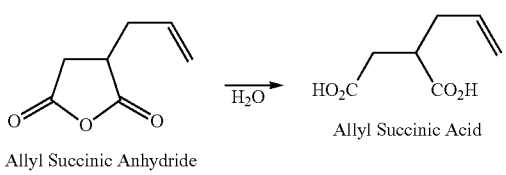

Allyl Succinic Anhydride → Allyl Succinic Acid

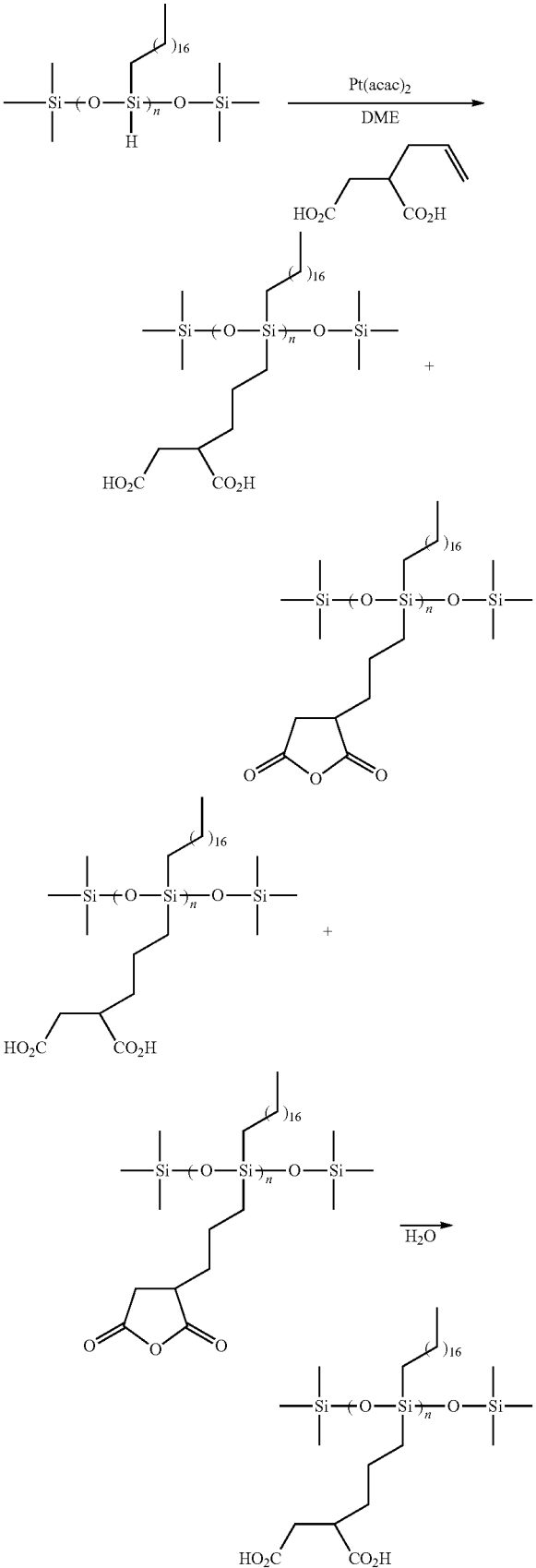

Synthesis of Allyl Succinic Acid

Water (321 g, 321 mL, 1.78 moles) was placed in a 1 L, 3-neck RBF and briefly vacuumed to remove oxygen. Then allyl succinic anhydride (50 g, 42.7 mL, 357 mmoles) was added and the reaction solution heated to 110 C overnight. The reaction solution was then cooled to room temperature and the volatiles removed from a sample to prepare for FTIR analysis. After confirming the anhydride had been converted to carboxylic acid, the volatiles were removed by vacuum transfer while stirring the reaction solution at 30 C. The reaction flask temperature was maintained with a temperature controller while being monitored using a thin wire thermocouple placed between the heating mantle and reaction flask. As the product began to solidify, the solids were broken up to facilitate drying. After the majority of the water had been removed, the flask was connected directly to the Schlenk line to achieve a pressure <20 mtorr overnight. The product is a white solid (55.6 g, 352 mmoles, 98.5% yield). $^1$H NMR (DMSO-$d_6$, δ): 2.07 to 2.35 and 2.42 to 2.52 (m, 4H, $CH_2$=$CHCH_2CH(CO_2H)CH_2CO_2H$), 2.66 to 2.74 (m, 1H, $CH_2CH(CO_2H)CH_2$), 5.00 to 5.09 (m, 2H, $CH_2$=$CHCH_2$) 5.6 to 5.78 (m, 1H, $CH_2$=$CHCH_2CH$). IR (cm$^{-1}$, diamond): 2300 to 3700 (broad $CO_2H$), 3029 w (sp2 C—H), 2978w, 2921w (sp3 C—H), 1689 s (C=O).

Synthesis of Oligomeric Silicone Di-Carboxylic Acid Wax or OS2CAW

To a 250 mL, 4-neck RBF in the glove box was added oligomeric silane (34.2 g, 114 mmoles estimated of silane repeat units by using a fwt of 298.51; from Example 8) and allyl succinic acid (19 g, 120 mmoles) as dry powders. Before removal from the glove box the flask was equipped with a nitrogen inlet adapter and three Suba-seal stoppers. Upon attachment to the Schlenk line, the flask was equipped with a reflux condenser and thermocouple positioned to measure the reaction solution temperature directly. Also a heating mantle and temperature controller was connected to the thermocouple. Then DME (20 mL) was added which formed a slurry. While the mixture was being heated to 80 C the slurry transformed to a solution at about 60 C and was mixing easily at 80 C. However the reaction solution was turbid and separated into two phases when the stirring was ceased. Then the catalyst solution (0.189 mL of Pt(acac)$_2$/DME, or 2.40×10$^{-3}$ mmoles or enough for 50,000 turnovers) was added to the reaction solution and after about 15 minutes the temperature was set to 100 C to gently reflux overnight.

After being heated at for about 16 h the reaction solution was homogenous. To prevent solidification during sample withdrawal, about 0.3 ml of toluene was pulled into the syringe before the 0.3 mL sample was withdrawn. Vacuum transfer of the volatiles produced a waxy solid. FTIR analysis determined that the silane had been consumed which was confirmed by $^1$H NMR. Then the reaction solution was diluted with 20 mL DME before cooling to room temperature to prevent solidification. The reaction solution was transferred drop-wise into MeOH (300 mL) in a 1 L Schlenk flask which precipitated the product. After stirring for 10 minutes the supernatant was removed by filter tip cannula equipped with Fisherbrand P8 filter paper (20-25 um particle retention). The volatiles were removed from the product to p<100 mtorr before water (540 mL, 30 moles) was added to the reaction flask to hydrolyze the product to back to succinic acid. Then the reaction flask was fitted with a reflux condenser and heated at 100 C using a temperature controller with thermocouple between flask and heating mantle. The reaction solution was heated overnight under nitrogen.

After confirmation by FTIR of conversion to acid the product was isolated by removal of volatiles using a supplementary trap cooled with dry ice. As the water was removed the solids were broken up to facilitate drying. Eventually product was vacuumed to p<20 mtorr overnight. The product was a white powder 37.3 g, 119 mmoles, 73.6% yield with n=6.5 repeat units for the oligomer. $^1$H NMR (toluene-$d_8$, δ): 0.2 to 0.5 (broad m, 18H, SiCH$_3$), 0.7 to 1.1 (broad m, 49H, SiCH$_2$CH$_2$CH$_2$ and SiCH$_2$(CH$_2$)$_{16}$CH$_3$), 1.2 to 1.8 (broad m, 126H, SiCH$_2$(CH$_2$)$_{16}$CH$_3$ and SiCH$_2$CH$_2$CH$_2$CHCO$_2$H), 2.2 to 2.7 (broad m, 21H, SiCH$_2$CH$_2$ CH$_2$CH(CO$_2$H)CH$_2$CO$_2$H) and 13.5 to 15.5 (broad m, 14H, CO$_2$H). IR (cm$^{-1}$, diamond): 2500 to 3500 (broad CO$_2$H), 2958 sh, 2916 s, 2849 s (sp$^3$ C—H), 1711 m (C=O), 1467 s (sp$^3$ C—H), 1066 s, 1020 sh (Si—O—Si).

Method 2

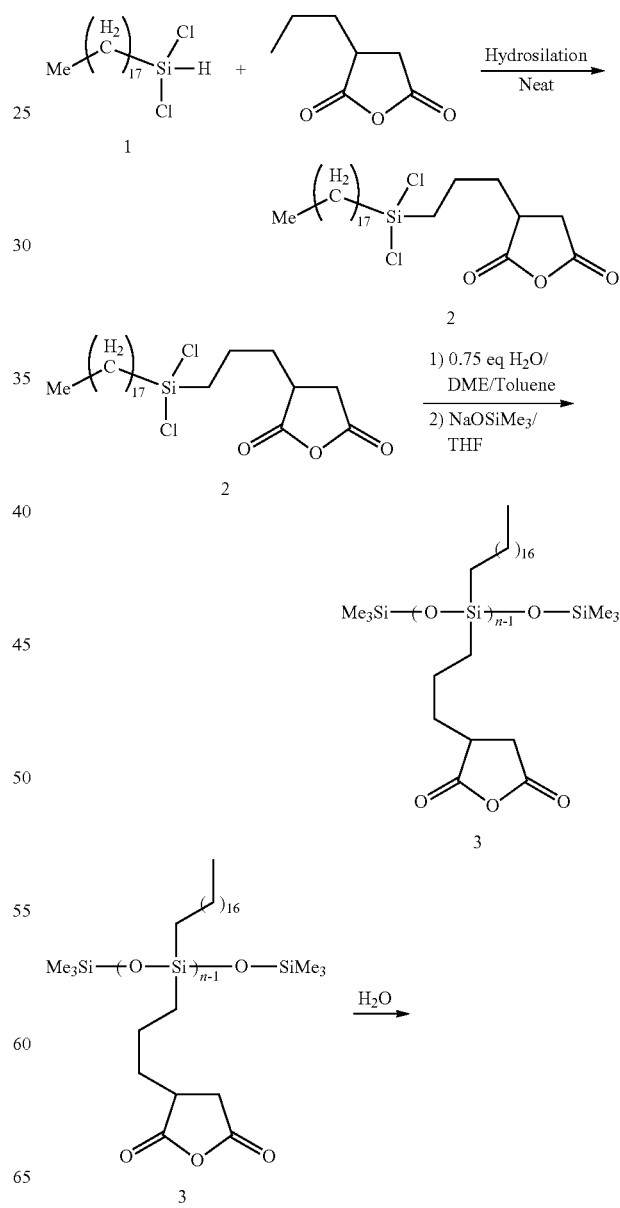

Synthesis of Succinic Anhydride Wax (2)

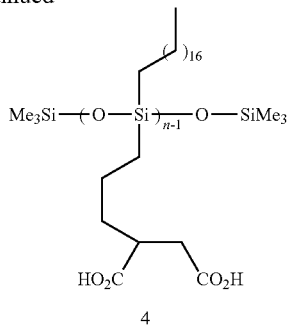

To a 100 mL, 4-neck RBF equipped with a nitrogen inlet adapter and thermocouple with temperature controller was added dichlorosilane 1 (10.0 g, 31.9 mmoles) and allyl succinic anhydride (4.48 g, 3.82 mL, 31.9 mmoles) which formed a turbid solution. The turbid solution separated into 2 phases when the stirring was ceased. The reaction solution was heated to 80 C and the Speir's catalyst (0.955 mL, 1.28× 10-4 mmoles platinum of a 100× dilution of the stock solution or enough for 250,000 turnovers) was added all at once in a stream. No exothermic reaction was observed but the reaction solution was heated overnight at 80 C. After about 16 h at 80 C the reaction solution was clear light yellow and remained in one phase when the stirring was ceased. A sample 0.2 mL was withdrawn into a long 18 Ga needle using a syringe containing 0.3 mL of toluene to prevent solidification of the sample in the needle. The volatiles were removed and the sample analyzed by FTIR and 1H NMR and determined the reaction was complete. This product was not isolated but taken to the next reaction directly. Analysis for the succinic anhydride wax 2 is provided. $^1$H NMR (CDCl$_3$, δ): 0.55 to 0.95 (m, 7H, CH$_3$(CH$_2$)$_{16}$CH$_2$SiCH$_2$CH$_2$), 1.05 to 1.50 (m, 36H, CH$_3$(CH$_2$)$_{16}$CH$_2$SiCH$_2$CH$_2$CH$_2$CH), 1.70 to 2.00 (m, 3H, CH$_2$Si(CH$_2$)$_3$CH(CO$_2$H)CH$_2$CO$_2$H). IR (cm$^{-1}$, diamond): 2958 sh, 2915 s, 28449 s (sp3 C—H), 1856 m, 1774 s (symm and asymm anhydride C=O), 522 s, 472 m (Si—Cl).

Synthesis of Oligomeric Silicone Succinic Anhydride Wax (3)

Toluene (25 mL) was added to the reaction flask and the reaction solution cooled to RT. Water (0.287 g, 16.0 mmoles) was weighed on an analytical balance and then dissolved in DME (2 mL) in the glove box before being withdrawn into a syringe. The reaction apparatus was modified under positive nitrogen pressure, by connection of a nitrogen filled bubbler to the standard taper that was on the opposite side from the nitrogen inlet adapter of the reaction flask. The nitrogen gas was adjusted to gently flow across the reaction solution and out the bubbler by slightly increasing nitrogen pressure above atmospheric pressure. The stopper in the center of the flask was changed for a suba seal and the water/DME filled syringe was positioned on the center opening so the water solution could be dropped directly into the vortex of the reaction solution. Then the water/DME solution was added drop-wise while stirring to reaction solution over 20 minutes. The reaction solution was stirred at RT for 15 more minutes before sodium trimethyl silenolate (16.0 mL, 16 mmoles) was added in a stream all at once. Again the reaction solution was stirred for 15 minutes at RT then heated to 60 C for 5 minutes before cooling to RT. The thermocouple and bubbler were replaced with stoppers and the volatiles were removed by vacuum transfer using a supplementary trap cooled with dry ice/ethanol overnight. After about 16 h under vacuum the reaction flask was connected directly to the vacuum line until a pressure of less than 500 mtorr was attained. FTIR and $^1$H NMR analysis show the Si—Cl bonds have been hydrolyzed to Si—O—Si bonds. Also the product had between 6 and 8 repeat units by end group analysis. The product was not isolated but was taken directly to the next step without purification. 3 (n=7): $^1$H NMR (toluene-d$_8$, δ): 0.05 to 0.15 (m, 18H, SiMe), 0.40 to 0.65 (m, 28H, CH$_2$CH$_2$SiCH$_2$CH$_2$), 0.86 (t, 21H, CH$_3$CH$_2$), 1.15 to 1.95 m, 252H, CH$_3$(CH$_2$)$_{16}$CH$_2$SiCH$_2$CH$_2$CH$_2$CH), 2.4 to 3.2 (m, 21H, CH$_2$Si(CH$_2$)$_3$CH(CO$_2$H)CH$_2$CO$_2$H); IR (cm$^{-1}$, diamond): 2858 sh, 2917 s, 2849 s (sp$^3$ C—H), 1862 m, 1781 s symm & asymm anhydride), 1466 m (sp$^3$ C—H), 1066 s, 1010 sh (Si—O—Si).

Synthesis of Oligomeric Silicone Di-Carboxylic Acid Wax or OS2CAW (4)

The reaction flask was equipped with a thermocouple positioned to measure the temperature of the reaction solution and water (25 mL, 1.39 moles) was added for the hydrolysis reaction. The reaction solution was heated to 60 C for 2 h. Then the volatiles were removed from a reaction sample which produced a white powder that was insoluble in toluene, chloroform and DMSO. FTIR analysis indicated that the reaction was finished and that the anhydride had been converted to acid. Then the thermocouple was replaced with a stopper before the volatiles were removed by vacuum transfer using a supplementary trap cooled with dry ice/ethanol overnight. After being subjected to vacuum for about 16 h most of the water had been removed so the large chunks of solids were broken up before the product vacuumed on the Schlenk line to a pressure of less than 50 mtorr overnight. The product (n=7) is a white solid 9.93 g, 3.89 mmoles or 97.7% yield. IR (cm$^{-1}$, diamond): 2500 to 3500 broad (carboxylic acid OH), 2958 sh, 2916 s, 2849 s (sp3 C—H), 1704 s (carboxylic acid C=O), 1077 sh, 1009 s (Si—O—Si).

Example 10

Preparation of EO-PS2CAW

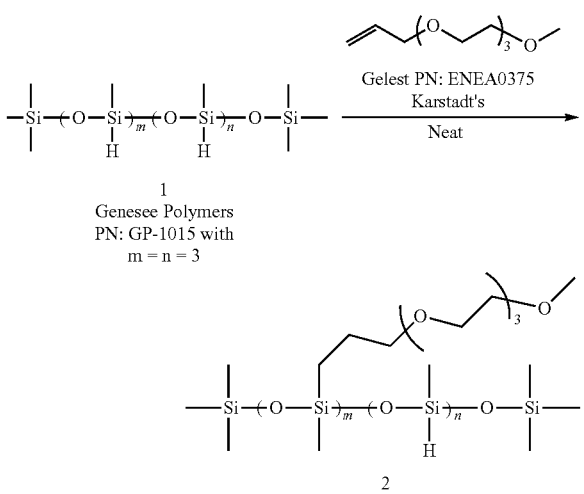

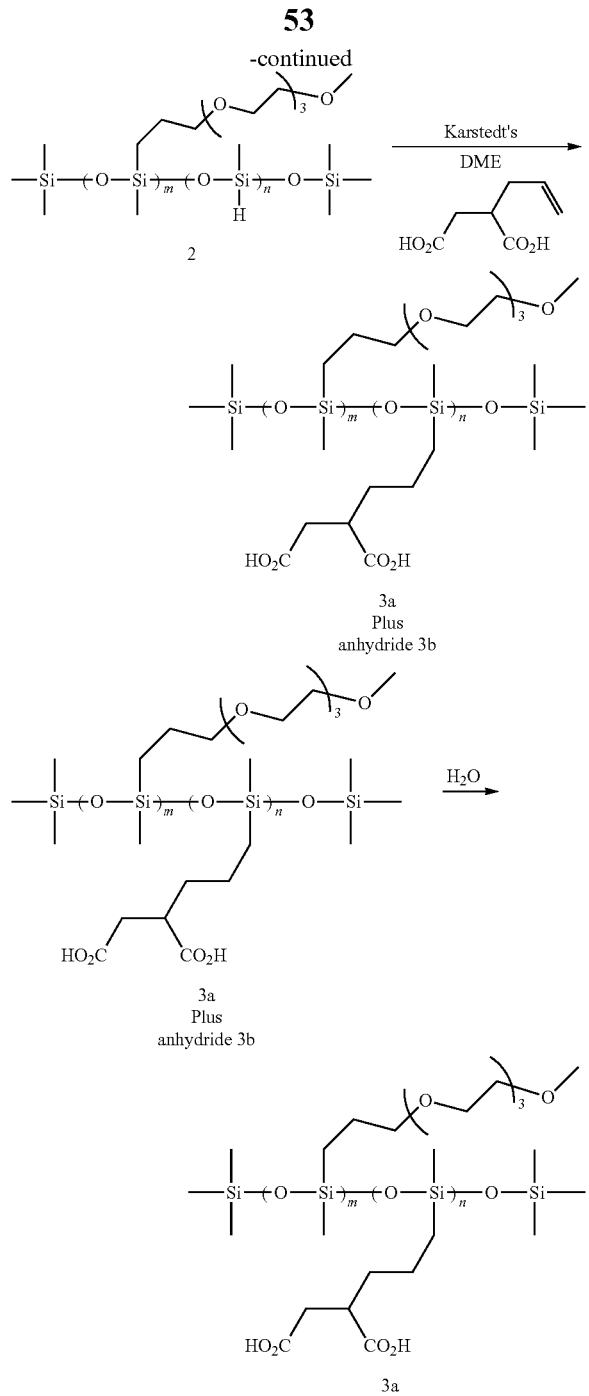

3a
Plus
anhydride 3b

3a
Plus
anhydride 3b

3a

General Methods.

All manipulations were performed under a dry, oxygen-free, nitrogen atmosphere using standard Schlenk technique. Dry, deoxygenated toluene was purchased from Fisher and used without further purification. Dry, deoxygenated dimethoxyethane (DME) was purchased from Aldrich and used without further purification. Allyloxy(triethylene oxide), methyl ether, 95% (Mn=3) was purchased from Gelest and used without further purification. Karstedt's catalyst, 2.1 to 2.4 wt % in xylenes was obtained from Gelest, used without further purification, stored and handled inside the glove box. A 100× dilution of Karstedt's catalyst was produced by dissolving 0.10 mL of stock solution into 10 mL of toluene. (The stock solution contains 0.113 moles of platinum per mL.) The polysilane (1) or "polyMethylHydrosiloxanes, Trimethylsilyl terminated" with Mn of about 6 was purchased as a special order from Genesee Polymers Corp in Burton, Mich. The silane was purified by vacuum overnight to P<50 mtorr and then handled inside the glove box. NMR chemical shift data were recorded with a Bruker FT NMR at 400 MHz for proton or 100 MHz for $^{13}$C {$^{1}$H} and are listed in ppm. IR analysis was obtained on a Nicolet 7200 FTIR equipped with an attenuated total reflectance (ATR) sampling accessory. Polysilane silicone (GP-1015 with n=6)) (1) is characterized as follows: $^{1}$H NMR (toluene-d$_8$, δ): 0.16 (m, 36H, SiMe), 4.93 (m, 6H, Si—H); IR (cm$^{-1}$, diamond): 2961 w (sp3 C—H), 2161 m (Si—H), 1257 m (sp2 C—H), 1039 s (Si—O—Si).

Synthesis of Polymeric Silicone Amine Wax (4)

A 500 mL, 4-neck RBF was equipped with a nitrogen inlet adapter, distillation head with receiver and thermocouple was attached to the Schlenk line. Additionally the distillation head was attached to a bubbler containing a one-way valve. The apparatus was configured so that upon attachment of a Schlenk line to the hose adapter, nitrogen gas could be passed into the reaction flask, across the surface of the reaction solution and out the bubbler attached to the distillation head. Also, the one way valve on the bubbler allowed vacuum to be applied to the whole apparatus, from the bubbler to the hose adapter. The thermocouple was attached to a heating mantle with temperature controller to maintain the desired reaction solution temperature. The apparatus was placed under vacuum to a pressure of less than 100 mtorr before being back flushed with nitrogen. This vacuum step was preformed with the valve between the distillation head and bubbler open.

Then polysilane 1 (34.2 g, 65.3 mmoles of polymer strands with n=6) was added followed by allyloxy(triethylene oxide), methyl ether (40 g, 196 mmoles) along with toluene (160 mL). The receiver was cooled in a dry ice/ethanol bath and the reaction flask was heated to 130 C while nitrogen was passed across the surface of the reaction solution from the inlet adapter and out through the distillation head and bubbler. After collection of about 150 mL of distillate the reaction solution was sampled for analysis. The volatiles were removed from the sample for analysis by 1H NMR in toluene-D8. (To determine the relative amounts of reactants, the OMe peak at 3.1 pm was set to integrate at 9 which was measured against the Si—H peak at 4.9 ppm. Unfortunately the Si—H peak splits one of the protons of that terminal allyl multiplet and can not be integrated directly. The two terminal allyl protons are well separated and along with the other allyl proton can be used to determine the amount of allyloxy(triethylene oxide) in the reaction mixture. The multiplet from non-overlapped terminal allyl proton at 5.2 ppm was averaged with the other non-overlapped allyl proton multiplet at 5.7 ppm to determine the integration for terminal one allyl proton. Then the silane was the difference between the allyl proton and silane combined with the other terminal allyl proton. The analysis demonstrated that the stoichiometry of the poly silane and allyloxy(triethylene oxide) was close enough to continue to the hydrosilation reaction.

After heating the reaction solution to 60 C Karstedt's catalyst (1.72 mL of a 100× dilution of the stock solution with 1.94×10$^{-3}$ mmoles platinum or enough for 100,000 turnovers) was added to the reaction solution. The solution temperature mildly exothermed and was then heated at 100 C overnight. Analysis of reaction solution sample determined the reaction was 90% complete so another aliquot of Karstedt's catalyst (0.86 mL, 9.72×10$^{-4}$ moles of platinum a 100× dilution or enough for 200,000 turnovers) was added and the reaction solution heated overnight at 100 C. Analysis after volatiles removal the reaction was complete as determined by consumption of allyl.

A 12.9 mL portion of the reaction solution (12.0 g or 10.5 mmoles of polysilane 2) was used in the next reaction. In the glove box allyl succinic acid (5 g, 31.6 mmoles) was added to a 100 mL 3-neck RBF equipped with thermocouple and nitrogen adapter. Then on the Schlenk line polysilane 2 was added by syringe and the reaction solution was heated to 80 C before Karstedt's Catalyst (0.316 mL, 3.57×10$^{-6}$ mmoles platinum from a 10,000× dilution or enough for 1,000,000 turnovers was added. The reaction solution slightly exothermed and then the temperature was set to 100 C overnight. Since analysis determined the reaction was still incomplete, the reaction solution temperature was reduced to 80 C and DME (3.0 mL) was added to allow the reaction solution to stir efficiently. Then Karstedt's Catalyst (1.27 mL, 1.43×10$^{-4}$ moles platinum of the 1000× dilution or enough for 20,000 turnovers) was added and the reaction solution heated at 100 C overnight. After sample preparation analysis determined the silane had been consumed but the succinic acid had been partially converted to anhydride, i.e. it was a mixture of 3a and 3b. $^1$H NMR (toluene-d$_8$, δ): 0.05 to 0.25 (m, 36H, SiMe), 0.50 to 0.70 (m, 6H, SiCH$_2$CH$_2$), 1.50 to 1.70 (m, 6H, SiCH$_2$CH$_2$CH$_2$O), 3.10 (s, 9H, OCH$_3$), 3.25 to 3.65 (m, 42H, CH$_2$CH$_2$CH$_2$OCH$_2$CH$_2$O)$_n$, 4.80 to 4.90 (m, 3H, SiH). IR (cm$^{-1}$, diamond): 2958 w, 2921 sh, 2870 m (sp3 C—H), 2151 m, (Si—H), 1258 m (sp3 C—H), 1089 s, 1029 s (Si—O—Si).

The product was dissolved in toluene (20 mL), DME (20 mL) and water (142 mL, 142 g, 7.9 moles) and heated at 100 C for 2 h. Then the volatiles are removed by vacuum transfer using a supplementary trap cooled with dry ice/ethanol overnight. To facilitate drying the product, a clear almost colorless oil was slowly stirred, while placed under vacuum while directly attached to a high vacuum line overnight. The product was maintained under vacuum until a pressure of <20 mtorr had been attained overnight. $^1$H NMR (CDCl$_3$, δ): 0.05 to 0.60 (m, 36H, SiMe), 0.60 to 0.85 (m, 12H, SiCH$_2$CH$_2$), 1.40 to 1.90 (m, 18H, SiCH$_2$CH$_2$CH$_2$O, SiCH$_2$CH$_2$CH$_2$CH), 2.15 to 2.85 (m, 9H, CH$_2$CH(CO$_2$H)CH$_2$CO$_2$H), 3.15 to 3.75 (m, 51H, CH$_2$(OCH$_2$CH$_2$)OCH$_3$) 9 to 11 (broad m, 6H, CO$_2$H). IR (cm$^{-1}$, diamond): 2958 sh, 2929 sh, 2874 m (sp3 C—H), 1709 s, (carboxylic acid C=O), 1858 m, (sp3 C—H), 1082 s, 1019 s (Si—O—Si).

Example 11

Preparation of PSAW-Si(R)$_3$

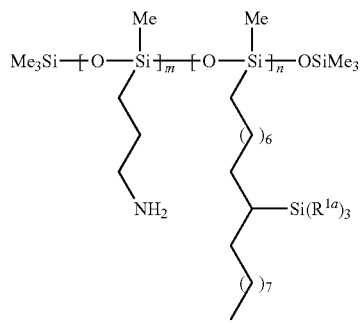

Figure 5:
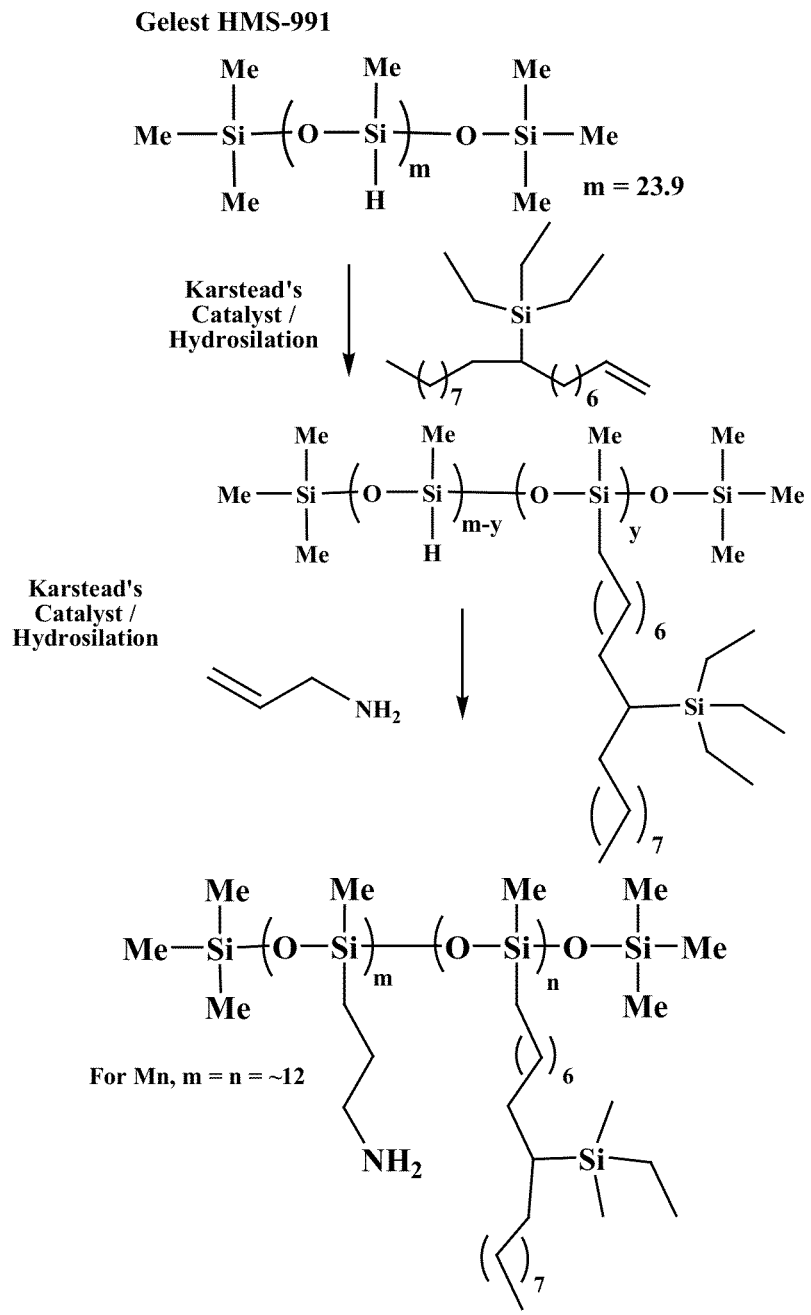
FIG. 5 shows the synthesis of a silyl-modified binding ligand by hydrosilylation of a siloxane polymer with the trialkylsilyl-modified alkene, following by hydrosilylation with an alkene-amine to afford the trialkylsilyl-modified siloxane polymer.
Figure 6:
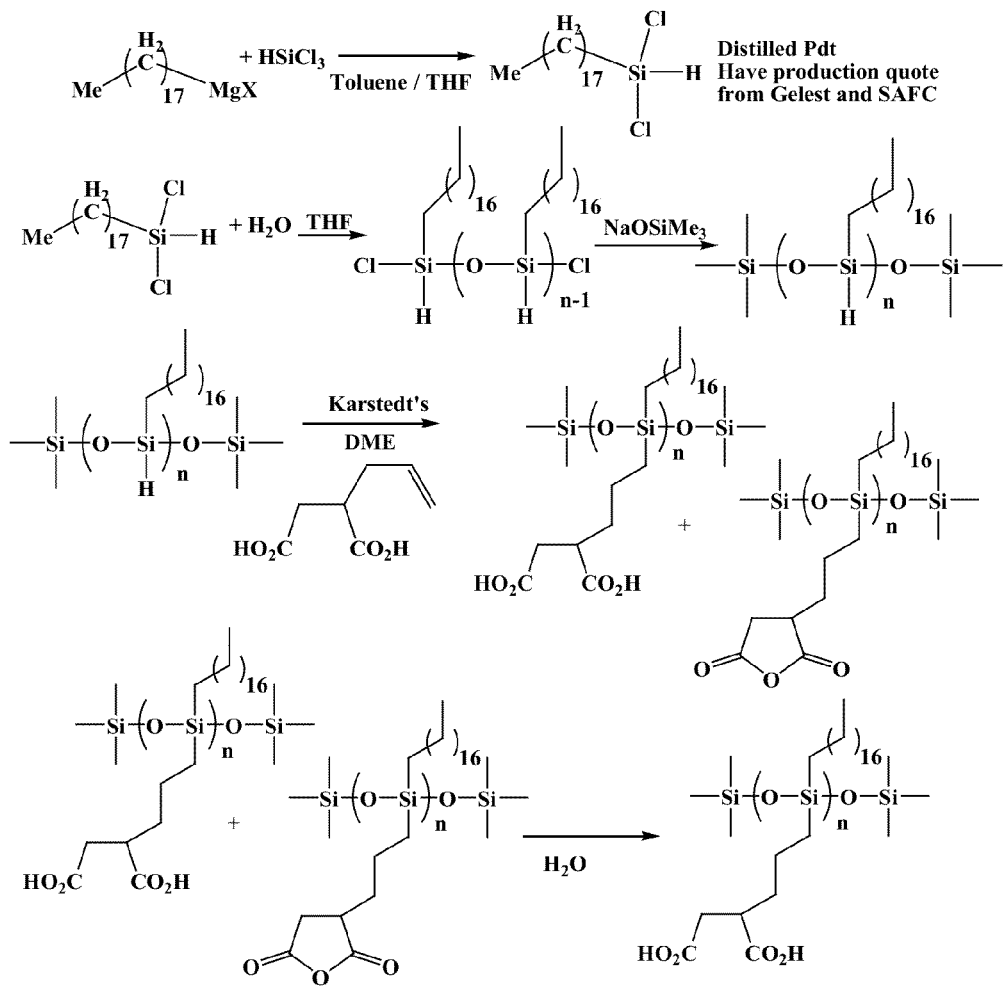
FIG. 6 shows the synthesis of a siloxane homopolymer having both the carboxylic acid binding group and the long-alkyl solubilizing group on a single monomer. First, trichlorosilane is modified with a long-chain alkyl via a Grignard reaction. The product is then polymerized under condensation conditions to afford a polysilane, which is then modified with the carboxylic acid binding group via hydrosilylation with Karstedt's catalyst.

The preparation of PSAW-Si(R)$_3$ is described in FIG. 5, and follows the procedure for preparation of PSAW described in Example 1 using triethyl(octadec-1-en-9-yl)silane in place of octadecene.

Example 12

Preparation of PS2AW

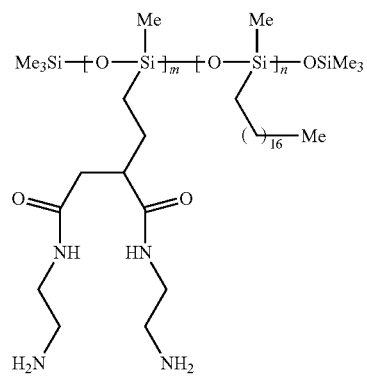

Figure 8:
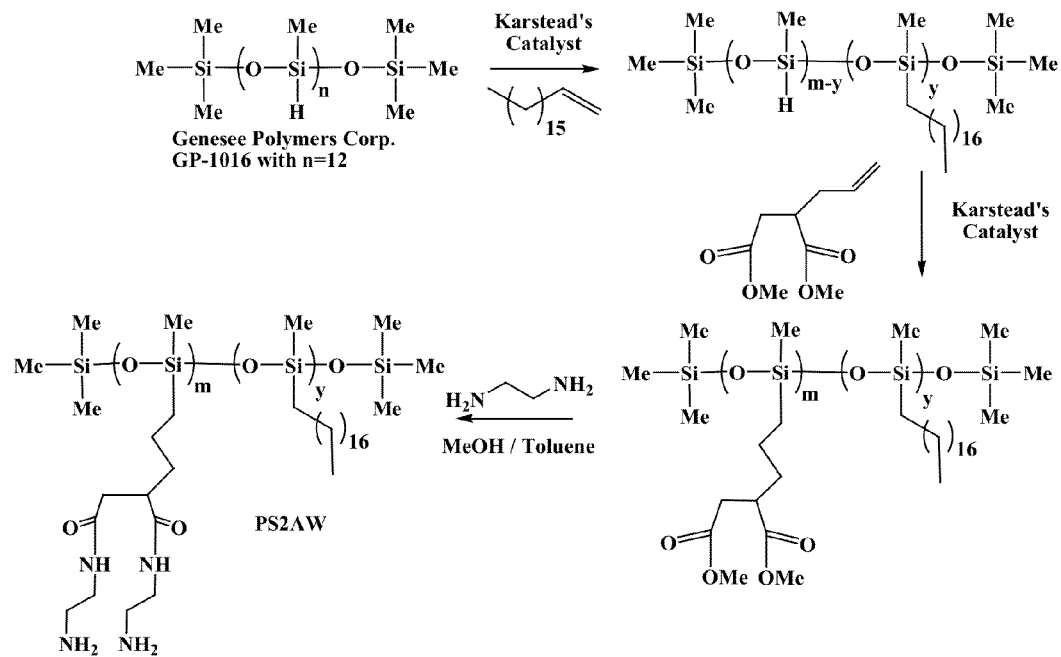
FIG. 8 shows the synthesis of a siloxane copolymer with a bis-amine binding group on one monomer and an alkyl solubilizing group on the second monomer. The siloxane polymer is prepared starting with a polysilane that is partially modified with a long-chain alkene via hydrosilylation. The remaining silyl groups are reacted with a precursor to the bis-amine binding group (allyl dimethyl succinate), again via hydrosilylation with Karstedt's catalyst. The dimethyl succinate is then converted to an amine by reaction with 1,2-diaminoethane to afford the product ligand.
Figure 9:
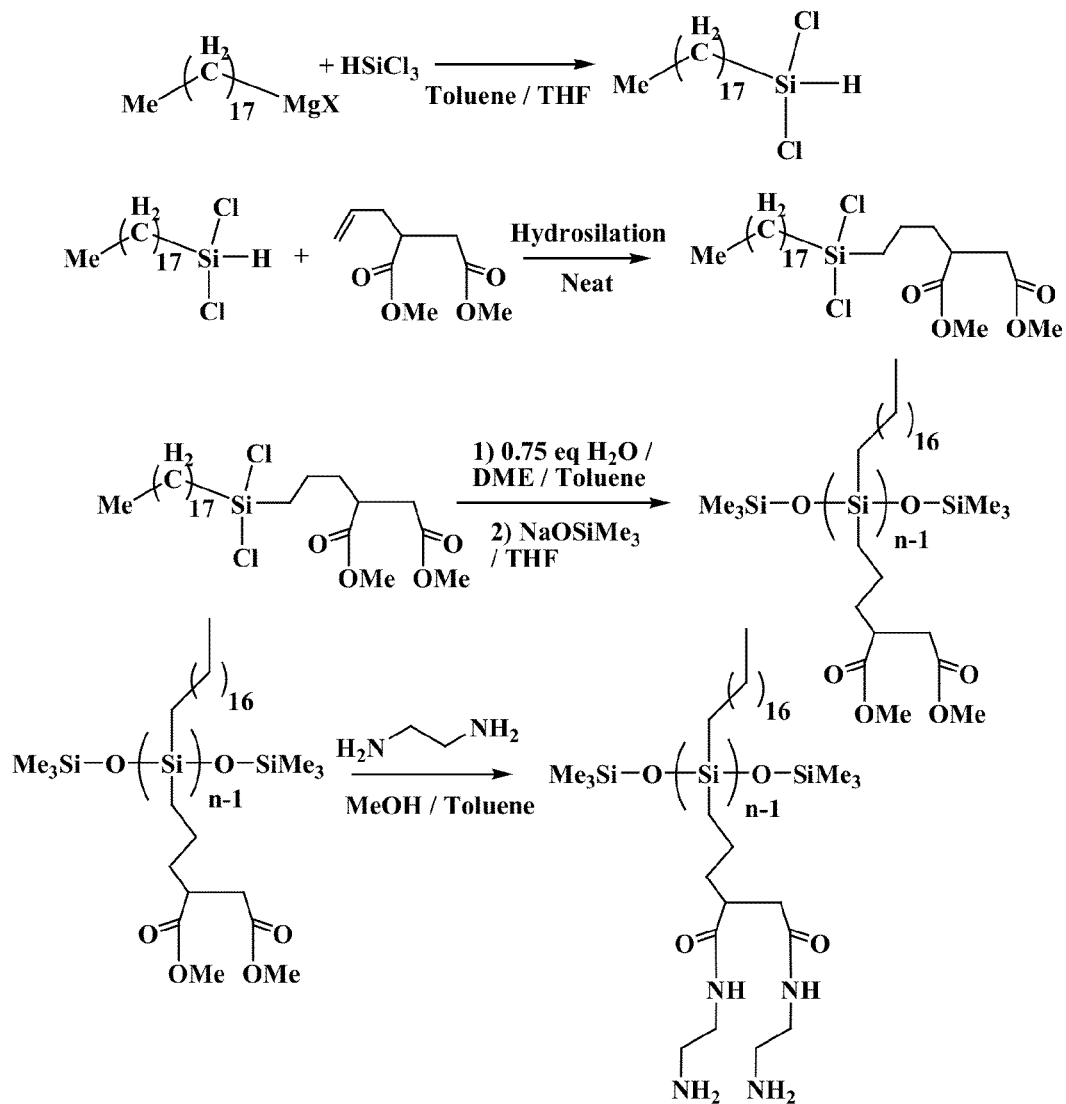
FIG. 9 shows the synthesis of a siloxane homopolymer having both the bis-amine binding group and the long-alkyl solubilizing group on a single monomer. The synthesis follows that described above for FIG. 8, with the additional step of converting the dimethyl succinate to an amine by reaction with 1,2-diaminoethane.

The preparation of polymeric silicone di-amine (PS2AW) follows the synthesis of PS2CAW above in Example 7, using allyl dimethyl succinate to modify the siloxane (see FIG. 8). Allyl dimethyl maleate and allyl dimethyl itaconate can also be used. After conjugation to the siloxane polymer via hydrosilylation using a catalyst such as Karstedt's catalyst, Speier's catalyst or Pt(acac)$_2$, the esters can be reacted with 1,2-diaminoethane to form the desired product.

Example 13

Preparation of OS2AW

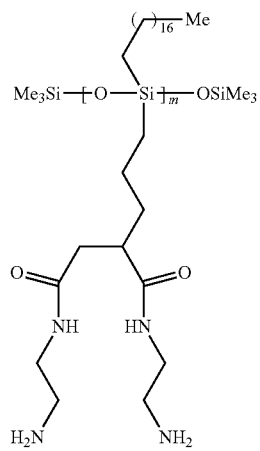

Figure 7:
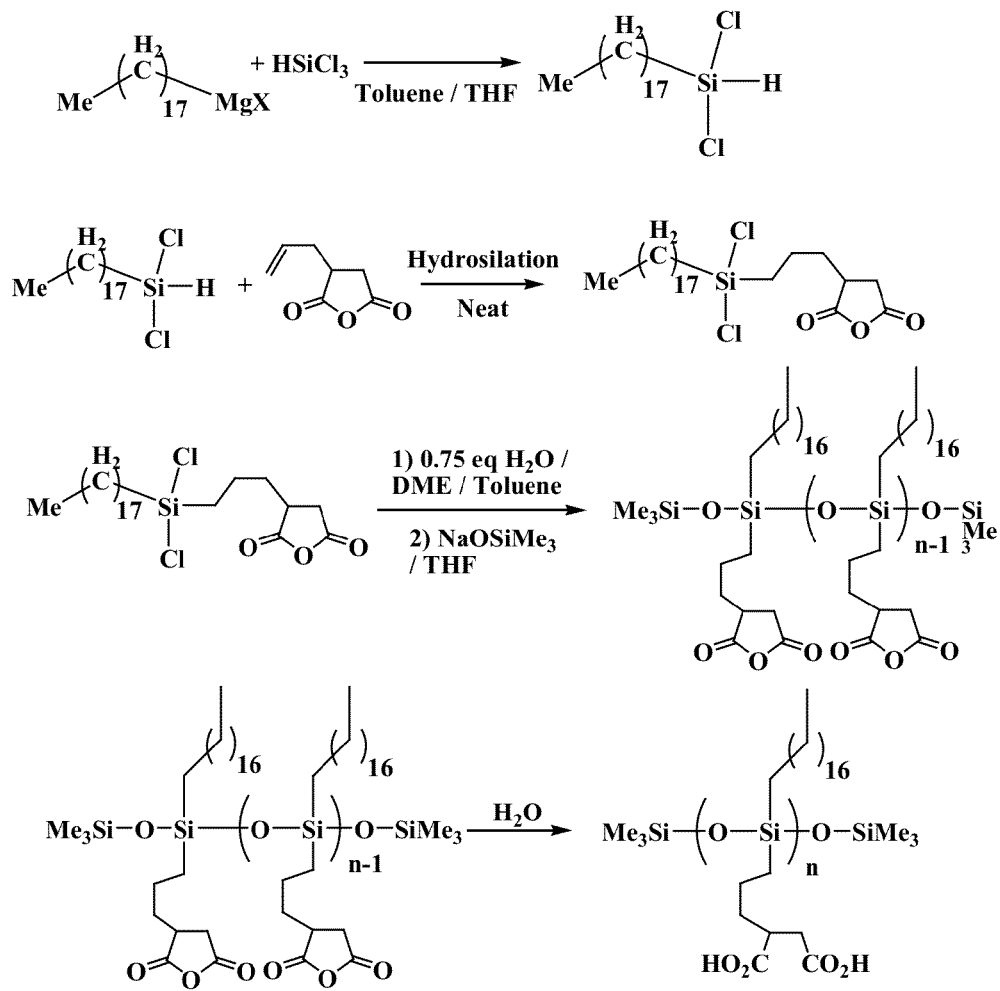
FIG. 7 shows an alternative synthesis to the compound shown in FIG. 7. After modifying the trichlorosilane with the alkyl solubilizing group, the silyl group is reacted with a precursor to the bis-carboxylic acid binding group under hydrosilylation conditions using Karstedt's catalyst. The resulting dichlorosilane is polymerized under condensation conditions to form the product homopolymer.

The preparation of oligomeric silicone di-amine (OS2AW) follows the procedure described above in Example 9, using allyl dimethyl succinate to modify the siloxane (see FIG. 7). After conjugation to the siloxane polymer via hydrosilylation using a catalyst such as Karstedt's catalyst, Speier's catalyst or Pt(acac)$_2$, the esters can be reacted with 1,2-diaminoethane to form the desired product.

Example 14

Preparation of PS3CAW

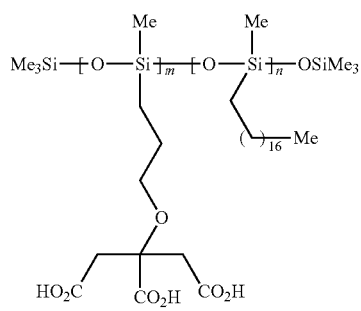

The preparation of polymeric silicone tricarboxylic acid (PS3CAW) is described below and follows the procedure above in Example 7. The commercially available starting material is triethyl citrate from Aldrich. The alcohol group can be converted to a tosylate leaving group by p-toluene sulfonyl chloride using known methods. Then the tosyl leaving group can be displaced with the allyl alkoxide to form a terminal olefin as shown below.

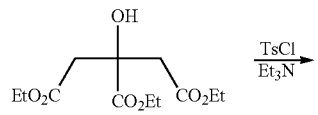

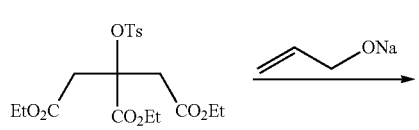

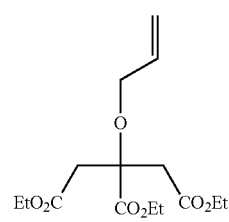

The allyl modified tris-ester can then be reacted with the siloxane polymer 2 from Example 7 via hydrosilylation with a suitable catalyst such as Karstedt's catalyst, Speier's catalyst or Pt(acac)$_2$, to form the siloxane monomer. The final polymer can then be prepared by saponification of the esters, such as via lipase enzyme.

Example 15

Preparation of OS3CAW

The preparation of oligomeric silicone tricarboxylic acid (OS3CAW) is described below.

The commercially available starting material is triethyl citrate from Aldrich. The alcohol functionality is converted to a tosylate leaving group by p-toluene sulfonyl chloride. Then the tosyl leaving group can be displaced with the allyl alkoxide to form a terminal olefin as shown below.

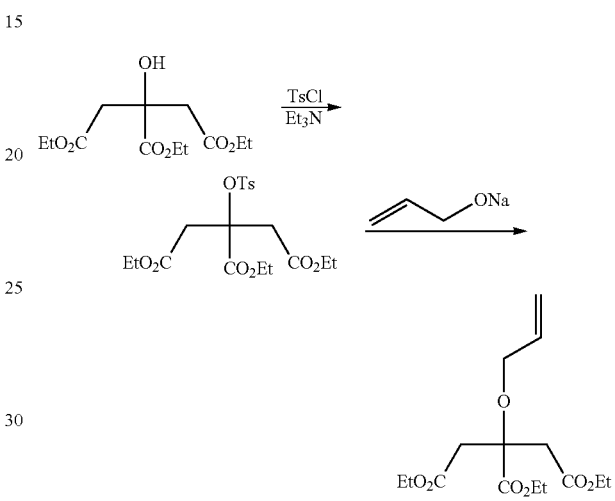

The allyl modified tris-ester can then be reacted with diethoxyoctadecylsilane via hydrosilylation with a suitable catalyst such as Karstedt's catalyst, Speier's catalyst or Pt(acac)$_2$, to form the siloxane monomer:

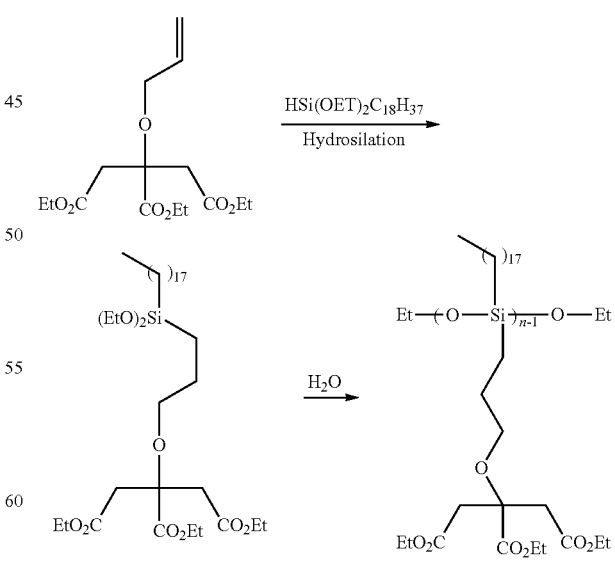

The final polymer can then be prepared by condensation of the siloxane monomer to form the polymer and then saponification of the esters, such as via lipase enzyme:

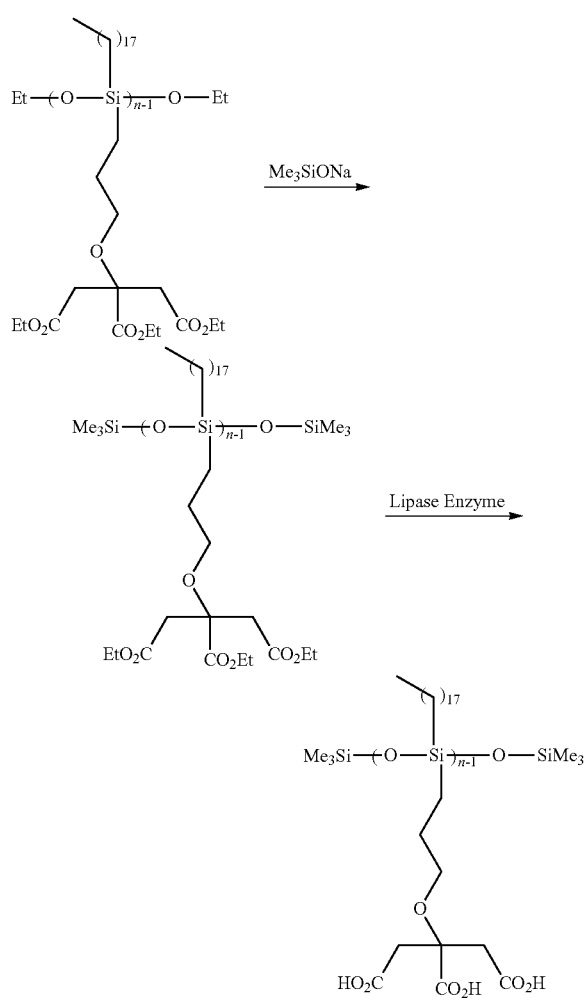

Example 16

Laser HALT Accelerated Lifetime Test

Nanocrystal compositions with PSAW-1:1 were prepared as described above.

Preparation of Comparative Nanocrystal/Silicone Composition

Another exemplary composite was produced, this one having CdSe/CdS/ZnS nanocrystals in a matrix formed from pendant amine functional silicones. Separate batches of red and green CdSe/CdS/ZnS nanocrystals dissolved in toluene (two batches with different sizes and emission peaks for each color) were exchanged with amino silicone (50:50 mixture of degassed AMS-242 and AMS-233, Gelest, Inc.) at 50° C. for about 66 h. Nanocrystal concentration was between about 3 and 50 OD in toluene, with the amino silicone at 0.01-0.1 ml per ml toluene. The solutions were then cooled to 30° C. and the volatiles removed to p<60 mtorr for about 90 min. Samples were dissolved in toluene at 25 mg (nanocrystals plus amino silicone)/mL. The OD/g (at 1 cm path length) was determined for each batch of red and green nanocrystals at 460 nm using a UV-Vis instrument. The neat solution was calculated by assuming the density of neat nanocrystals in aminosilicone was 1 (i.e., multiplied by 40), to ensure the ODs measured were close to the projected values. Then nanocrystals from the two batches of red and two of green nanocrystals in amino silicone were combined, along with additional amino silicone. The amount of red nanocrystals added from the two red batches was adjusted to obtain a final OD of about 10, and the amount of green nanocrystals added from the two green batches was adjusted to obtain a final OD of about 30. In this example, 6.8 mL of each batch of green nanocrystals and 2.5 mL of each batch of red nanocrystals were combined, along with an additional 11.49 g of the amino silicone (again a 50:50 mixture of degassed AMS-242 and AMS-233). An equal volume of toluene (30 mL) was also added. Ligand exchange was performed on the mixture at 60° C. for 16 h. After heating the mixture was cooled to 30° C. and the volatiles removed to p<35 mtorr for 2 h. After volatiles removal the product was an orange paste.

Preparation of Matrix 0.5 g of the QD/aminosilicone or QD/PSAW composition was then added to 9.5 g of uncured Loctite E-30cl epoxy in a 10 ml plastic cup. The cup was then placed in a a planetary mixer (THINKY ARV-310) and run for 4 minutes at 2000 rpm until homogeneous. The cup was then brought into a glove box. The contents were poured onto a 50 um thick polyester film (3M, Ultrabarrier). A second piece of film was placed on top of the epoxy pool and then the stack was passed through a set of precision rolls to squeeze it down so that the epoxy/quantum dot layer was 100 um in thickness. The stack was then placed in a 100 C oven for 15 min to cure the epoxy.

Laser Procedure.

Figure 4:
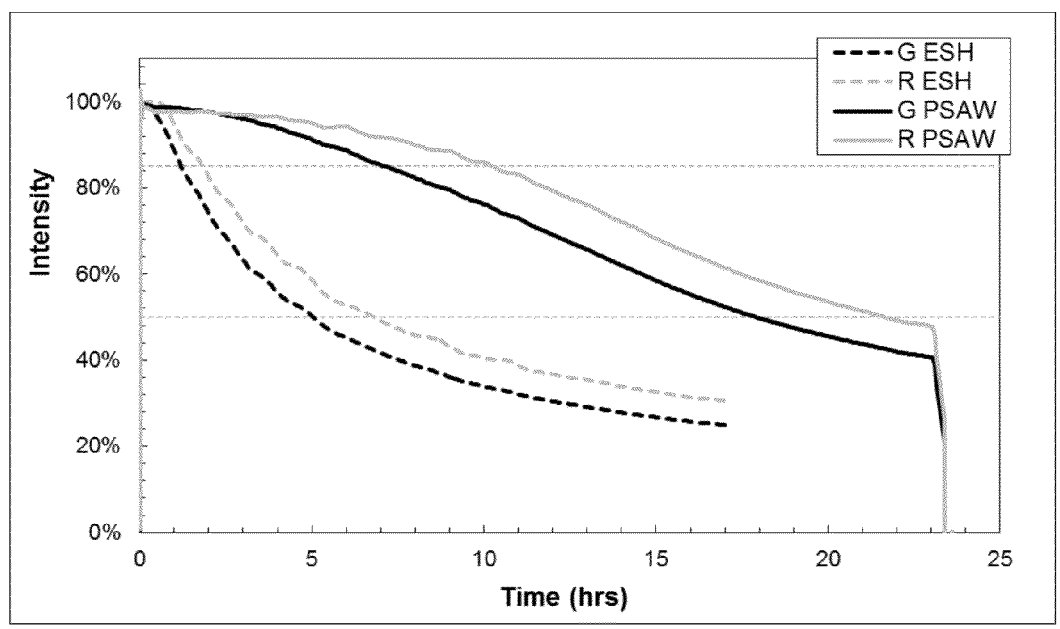
FIG. 4 shows the Laser HALT data for PSAW-1:1 versus epoxy silicone hybrid (ESH) quantum dot compositions, demonstrating improved lifetime for the PSAW-1:1-QD compositions for both red (R) and green (G) light.

From the film cast above, a 20 mm diameter is cut using a steel punch. The sample is then clamped between two sapphire plates and mounted into the beam path. The sapphires are coupled to a heating element and maintained at a temperature of 60+/−5° C. The blue laser (450 nm) is attenuated to 60 W/cm2 and has a spot size of approximately 1 mm. A shutter is opened and the beam passes through the film sample. The resulting emission spectra are collected continuously using a spectrophotometer (Ocean Optics, Inc.) with a fiber optic probe. FIG. 4 plots the red and green emission from the film sample as a function of time. Table 2 summarizes the emission data for the films.

TABLE 2

Laser HALT Lifetime Study Data

| Sample | Temp. (° C.) | Flux (W/cm$^2$) | 85% Lifetime/POR Standard | | 50% Lifetime/POR Standard | | 85% Lifetime (hrs) | | 50% Lifetime (hrs) | |
|---|---|---|---|---|---|---|---|---|---|---|
| | | | Green | Red | Green | Red | Green | Red | Green | Red |
| ESH standard | 57 | 60 | 1.0 | 1.0 | 1.0 | 1.0 | 1.2 | 1.8 | 5.0 | 6.8 |
| PSAW-1:1 | 62 | 60 | 5.9 | 5.6 | 3.6 | 3.2 | 7.1 | 10.2 | 17.9 | 21.6 |

Although the foregoing invention has been described in some detail by way of illustration and example for purposes of clarity of understanding, one of skill in the art will appreciate that certain changes and modifications may be practiced within the scope of the appended claims. In addition, each reference provided herein is incorporated by reference in its entirety to the same extent as if each reference was individually incorporated by reference. Where a conflict exists between the instant application and a reference provided herein, the instant application shall dominate.

What is claimed is:

1. A quantum dot binding-ligand comprising:
a siloxane polymer comprising a plurality of monomer repeat units;
a plurality of amine or carboxy binding groups each covalently attached to one of the monomer repeat units, thereby forming a first population of monomer repeat units; and
a plurality of solubilizing groups each covalently attached to one of the monomer repeat units, thereby forming a second population of monomer repeat units, and wherein each solubilizing group is independently selected from the group consisting of a long-chain alkyl group, a long-chain alkenyl group, a long-chain alkynyl group, a cycloalkyl and an aryl.

2. The quantum dot binding ligand of claim 1, wherein each solubilizing group is independently selected from the group consisting of a $C_{8-20}$ long-chain alkyl group, a $C_{8-20}$ long-chain alkenyl group, a $C_{8-20}$ long-chain alkynyl group, a $C_{3-12}$ cycloalkyl and a $C_{6-16}$ aryl.

3. The quantum dot binding ligand of claim 2, wherein each long-chain alkyl group is independently selected from the group consisting of octane, nonane, decane, undecane, dodecane, tridecane, tetradecane, pentadecane, hexadecane, heptadecane, octadecane, nonadecane, and icosane.

4. The quantum dot binding ligand of claim 3, wherein each long-chain alkyl group is independently selected from the group consisting of hexadecane, heptadecane, octadecane, nonadecane, and icosane.

5. The quantum dot binding ligand of claim 3, wherein each long-chain alkyl group is independently selected from the group consisting of hexadecane, octadecane, and icosane.

6. The quantum dot binding ligand of claim 3, wherein each long-chain alkyl group is octadecane.

7. The quantum dot binding ligand of claim 1, wherein the first population of monomer repeat units is about the same number as the second population of monomer repeat units.

8. The quantum dot binding ligand of claim 1, wherein each monomer repeat unit is covalently linked to both the amine or carboxy binding group and the solubilizing group, such that the first and second populations of monomer repeat units are the same.

9. The quantum dot binding ligand of claim 1, comprising the structure of formula I:

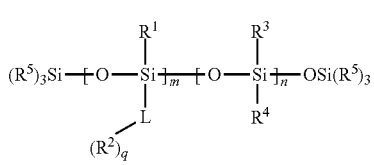

(I)

wherein
each $R^1$ is independently selected from the group consisting of $C_{1-20}$ alkyl, $C_{2-20}$ alkenyl, $C_{2-20}$ alkynyl, cycloalkyl and aryl;
each L is independently selected from the group consisting of $C_{3-8}$ alkylene, $C_{3-8}$ heteroalkylene, $C_{3-8}$ alkylene-O—$C_{2-8}$ alkylene, $C_{3-8}$ alkylene-(C(O)NH—$C_{2-8}$ alkylene)$_q$, $C_{3-8}$ heteroalkylene-(C(O)NH—$C_{2-8}$ alkylene)$_q$, and $C_{3-8}$ alkylene-O—$C_{1-8}$ alkylene-(C(O)NH—$C_{2-8}$ alkylene)$_q$;
each $R^2$ is independently selected from the group consisting of $NR^{2a}R^{2b}$ and C(O)OH; each of $R^{2a}$ and $R^{2b}$ are independently selected from the group consisting of H and $C_{1-6}$ alkyl;
each $R^3$ is independently selected from the group consisting of $C_{1-20}$ alkyl, $C_{2-20}$ alkenyl, $C_{2-20}$ alkynyl, cycloalkyl and aryl;
each $R^4$ is a solubilizing ligand independently selected from the group consisting of $C_{8-20}$ alkyl, cycloalkyl and aryl;
each $R^5$ is independently selected from the group consisting of $C_{1-20}$ alkyl, $C_{2-20}$ alkenyl, $C_{2-20}$ alkynyl, -L-($R^2$)$_q$, cycloalkyl and aryl;
subscript m is an integer from 5 to 50;
subscript n is an integer from 0 to 50; and
subscript q is an integer from 1 to 10;
wherein when subscript n is 0, then $R^1$ is selected from the group consisting of $C_{8-20}$ alkyl, $C_{8-20}$ alkenyl, $C_{8-20}$ alkynyl, cycloalkyl and aryl.

10. The quantum dot binding ligand of claim 9, wherein
each $R^1$ is independently selected from the group consisting of $C_{1-20}$ alkyl, $C_{2-20}$ alkenyl, $C_{2-20}$ alkynyl, cycloalkyl and aryl;
each L is independently $C_{3-8}$ alkylene;
each $R^2$ is independently selected from the group consisting of $NR^{2a}R^{2b}$ and C(O)OH; each of $R^{2a}$ and $R^{2b}$ are independently selected from the group consisting of H and $C_{1-6}$ alkyl;
each $R^3$ is independently selected from the group consisting of $C_{1-20}$ alkyl, $C_{2-20}$ alkenyl, $C_{2-20}$ alkynyl, cycloalkyl and aryl;
each $R^4$ is a solubilizing ligand independently selected from the group consisting of $C_{8-20}$ alkyl, cycloalkyl and aryl;
each $R^5$ is independently selected from the group consisting of $C_{1-20}$ alkyl, $C_{2-20}$ alkenyl, $C_{2-20}$ alkynyl, -L-($R^2$)$_q$, cycloalkyl and aryl;
subscript m is an integer from 5 to 50;
subscript n is an integer from 0 to 50; and
subscript q is an integer from 1 to 10;
wherein when subscript n is 0, then $R^1$ is selected from the group consisting of $C_{8-20}$ alkyl, $C_{8-20}$ alkenyl, $C_{8-20}$ alkynyl, cycloalkyl and aryl.

11. The quantum dot binding ligand of claim 9, wherein each L is independently selected from the group consisting of $C_{3-8}$ alkylene, $C_{3-8}$ alkylene-O—$C_{2-8}$ alkylene, $C_{3-8}$ alkylene-(C(O)NH—$C_{2-8}$ alkylene)$_2$, and $C_{3-8}$ alkylene-O—$C_{1-8}$ alkylene-(C(O)NH—$C_{2-8}$ alkylene)$_3$.

12. The quantum dot binding ligand of claim 9, wherein each L is independently selected from the group consisting of propylene, butylene, pentylene, n-propylene-O-i-propylene, and pentylene-(C(O)NH-ethylene)$_2$.

13. The quantum dot binding ligand of claim 9, wherein each L-($R^2$)$_q$ group is independently selected from the group consisting of $C_{3-8}$ alkylene-C(O)OH, $C_{3-8}$ alkylene-(C(O)

OH)$_2$, C$_{3-8}$ alkylene-NR$^{2a}$R$^{2b}$, C$_{3-8}$ alkylene-O—C$_{2-8}$ alkylene-(C(O)OH)$_3$, and C$_{3-8}$ alkylene-(C(O)NH—C$_{2-8}$ alkylene-NR$^{2a}$R$^{b2}$)$_2$.

14. The quantum dot binding ligand of claim 9, wherein each L-(R$^2$)$_q$ group is independently selected from the group consisting of C$_{3-8}$ alkylene-C(O)OH, C$_{3-8}$ alkylene-(C(O)OH)$_2$, and C$_{3-8}$ alkylene-NR$^{2a}$R$^{2b}$.

15. The quantum dot binding ligand of claim 9, wherein each -L-(R$^2$)$_q$ group is independently selected from the group consisting of:

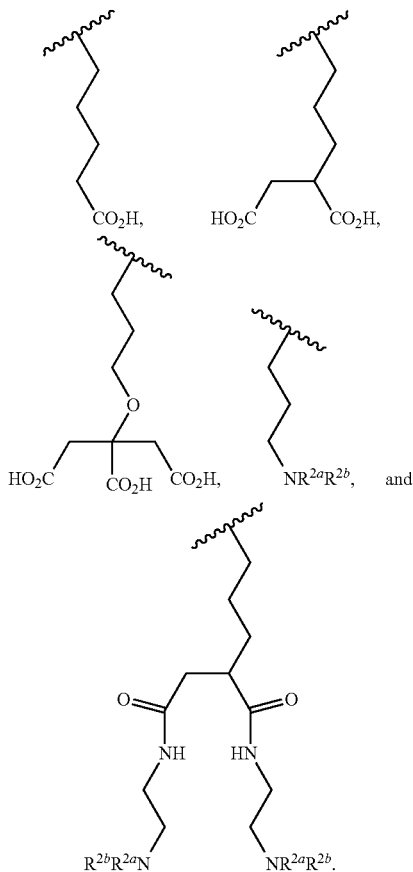

16. The quantum dot binding ligand of claim 9, wherein at least one of R$^1$ and R$^4$ is C$_{8-20}$ alkyl.

17. The quantum dot binding ligand of claim 9, wherein at least one of R$^1$ and R$^4$ is selected from the group consisting of C$_{16}$ alkyl, C$_{18}$ alkyl, and C$_{20}$ alkyl.

18. The quantum dot binding ligand of claim 9, wherein
each R$^5$ is independently selected from the group consisting of C$_{1-20}$ alkyl, C$_{2-20}$ alkenyl, C$_{2-20}$ alkynyl, cycloalkyl and aryl;
subscript m is an integer from 5 to 50; and
subscript n is an integer from 1 to 50.

19. The quantum dot binding ligand of claim 18, wherein the ratio of subscript m to subscript n is about 2:1.

20. The quantum dot binding ligand of claim 18, wherein the ratio of subscript m to subscript n is about 1:1.

21. The quantum dot binding ligand of claim 18, wherein the ratio of subscript m to subscript n is about 1:2.

22. The quantum dot binding ligand of claim 18, wherein
R$^1$ and R$^3$ are each independently C$_{1-3}$ alkyl;
each R$^{1a}$ is independently C$_{1-6}$ alkyl;
each R$^4$ is independently C$_{8-20}$ alkyl;
each R$^5$ is independently C$_{1-3}$ alkyl; and
subscript q is an integer from 1 to 3.

23. The quantum dot binding ligand of claim 22, having the structure:

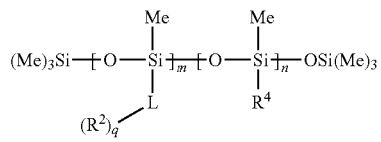

wherein subscripts m and n are each an integer from 10 to 14.

24. The quantum dot binding ligand of claim 18, having the structure selected from the group consisting of:

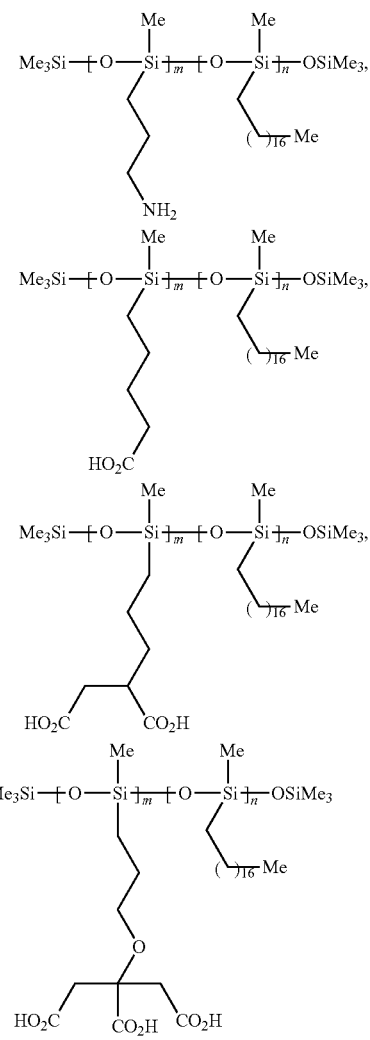

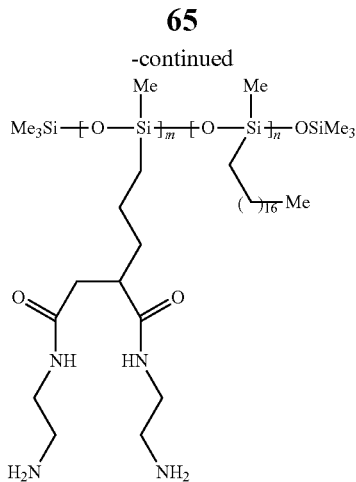

wherein
subscripts m and n are each an integer from 10 to 14.

25. The quantum dot binding ligand of claim 9, wherein
each $R^5$ is independently selected from the group consisting of $C_{1-20}$ alkyl, $C_{2-20}$ alkenyl, $C_{2-20}$ alkynyl, cycloalkyl and aryl, wherein the alkyl group is optionally substituted with one —Si($R^{1a}$)$_3$ group;
subscript m is an integer from 5 to 50; and
subscript n is 0.

26. The quantum dot binding ligand of claim 25, wherein
each $R^1$ is independently $C_{8-20}$ alkyl;
each $R^5$ is independently $C_{1-3}$ alkyl; and
subscript q is an integer from 1 to 3.

27. The quantum dot binding ligand of claim 26, having the structure:

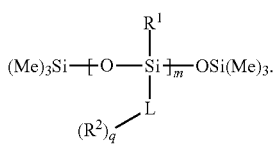

28. The quantum dot binding ligand of claim 27, wherein $R^1$ is $C_{8-20}$ alkyl.

29. The quantum dot binding ligand of claim 25, having the structure selected from the group consisting of:

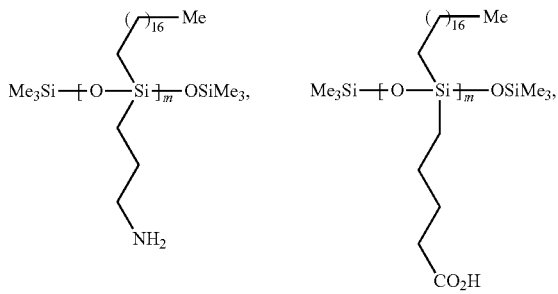

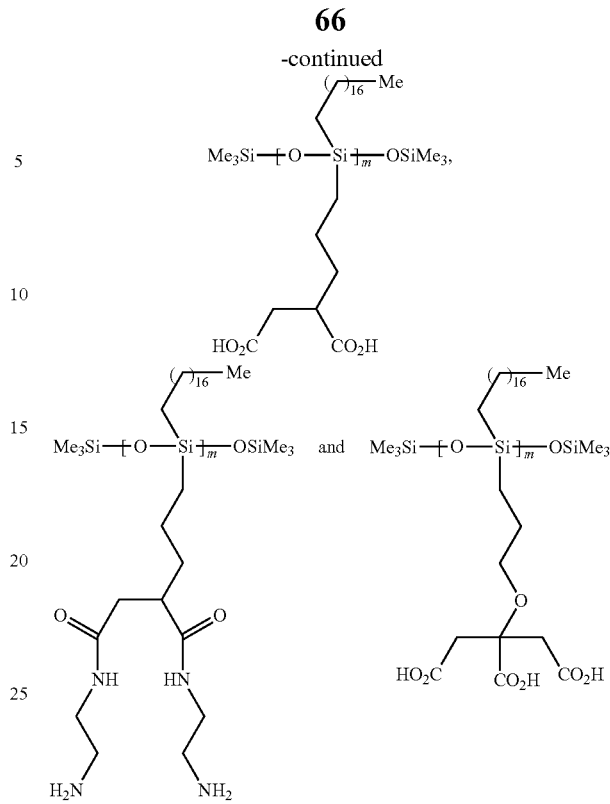

wherein subscript m is an integer from 5 to 50.

30. A composition comprising:
  (a) a quantum dot binding-ligand of claim 1; and
  (b) a first population of light emitting quantum dots (QDs).

31. The composition of claim 30, wherein the quantum dot binding-ligand comprises the structure of formula I:

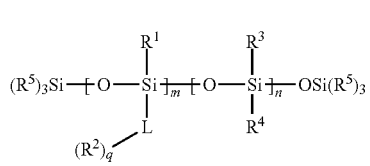

wherein
  each $R^1$ is independently selected from the group consisting of $C_{1-20}$ alkyl, $C_{2-20}$ alkenyl, $C_{2-20}$ alkynyl, cycloalkyl and aryl;
  each L is independently selected from the group consisting of $C_{3-8}$ alkylene, $C_{3-8}$ heteroalkylene, $C_{3-8}$ alkylene-O—$C_{2-8}$ alkylene, $C_{3-8}$ alkylene-(C(O)NH—$C_{2-8}$ alkylene)$_q$, $C_{3-8}$ heteroalkylene-(C(O)NH—$C_{2-8}$ alkylene)$_q$, and $C_{3-8}$ alkylene-O—$C_{1-8}$ alkylene-(C(O)NH—$C_{2-8}$ alkylene)$_q$;
  each $R^2$ is independently selected from the group consisting of NR$^{2a}$R$^{2b}$ and C(O)OH; each of R$^{2a}$ and R$^{2b}$ are independently selected from the group consisting of H and $C_{1-6}$ alkyl;
  each $R^3$ is independently selected from the group consisting of $C_{1-20}$ alkyl, $C_{2-20}$ alkenyl, $C_{2-20}$ alkynyl, cycloalkyl and aryl;
  each $R^4$ is a solubilizing ligand independently selected from the group consisting of $C_{8-20}$ alkyl, cycloalkyl and aryl;

each $R^5$ is independently selected from the group consisting of $C_{1-20}$ alkyl, $C_{2-20}$ alkenyl, $C_{2-10}$ alkynyl cycloalkyl and aryl;

subscript m is an integer from 5 to 50;

subscript n is an integer from 0 to 50; and subscript q is an integer from 1 to 10;

wherein when subscript n is 0, then $R^1$ is selected from the group consisting of $C_{8-20}$ alkyl, $C_{8-20}$ alkenyl, $C_{8-20}$ alkynyl, cycloalkyl and aryl.

32. The composition of claim 31, wherein the quantum dot binding-ligand comprises the structure of formula I:

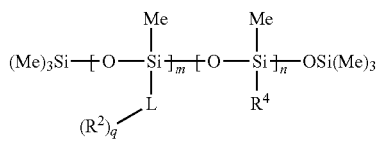

wherein subscripts m and n are each an integer from 10 to 14.

33. The composition of claim 31, wherein the quantum dot binding-ligand comprises the structure:

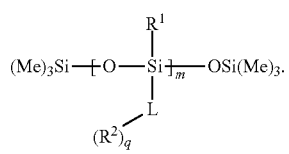

34. The composition of claim 31, wherein each -L-$(R^2)_q$ group is independently selected from the group consisting of:

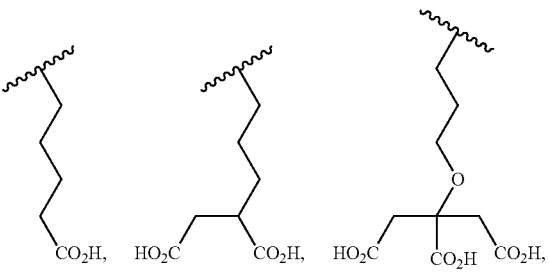

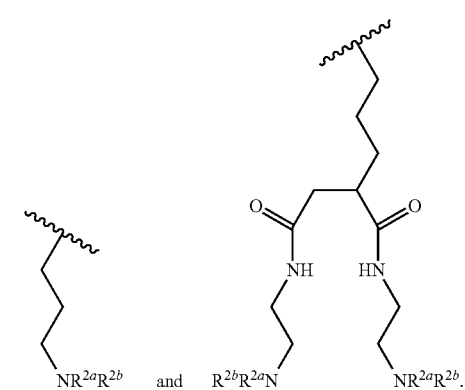

* * * * *